United States Patent
Folse et al.

(10) Patent No.: US 10,873,786 B2
(45) Date of Patent: Dec. 22, 2020

(54) RECORDING AND BROADCASTING APPLICATION VISUAL OUTPUT

(71) Applicant: Apple Inc., Cupertino, CA (US)

(72) Inventors: Jennifer L. C. Folse, San Francisco, CA (US); Elbert D. Chen, Cupertino, CA (US); Graham R. Clarke, Mountain View, CA (US); Lucas Martin, Daly City, CA (US); William M. Bachman, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/614,121

(22) Filed: Jun. 5, 2017

(65) Prior Publication Data

US 2017/0359623 A1    Dec. 14, 2017

Related U.S. Application Data

(60) Provisional application No. 62/349,041, filed on Jun. 12, 2016.

(51) Int. Cl.
| | |
|---|---|
| *H04N 21/47* | (2011.01) |
| *A63F 13/497* | (2014.01) |
| *H04N 21/472* | (2011.01) |
| *H04N 21/433* | (2011.01) |
| *H04N 21/81* | (2011.01) |
| *H04N 21/437* | (2011.01) |

(Continued)

(52) U.S. Cl.
CPC .......... *H04N 21/47* (2013.01); *A63F 13/497* (2014.09); *H04N 21/2743* (2013.01); *H04N 21/4126* (2013.01); *H04N 21/4143* (2013.01); *H04N 21/41407* (2013.01); *H04N 21/437* (2013.01); *H04N 21/4333* (2013.01); *H04N 21/4334* (2013.01); *H04N 21/472* (2013.01); *H04N 21/4781* (2013.01); *H04N 21/8173* (2013.01); *A63F 13/86* (2014.09)

(58) Field of Classification Search
CPC .................................................... H04N 21/47
See application file for complete search history.

(56) References Cited

U.S. PATENT DOCUMENTS

| | | |
|---|---|---|
| 5,815,657 A | 9/1998 | Williams et al. |
| 6,097,371 A | 8/2000 | Siddiqui et al. |

(Continued)

FOREIGN PATENT DOCUMENTS

| | | |
|---|---|---|
| AU | 2016100796 A4 | 6/2016 |
| CN | 1443427 A | 9/2003 |

(Continued)

OTHER PUBLICATIONS

Advisory Action received for U.S. Appl. No. 14/869,877, dated Jan. 5, 2017, 3 pages.

(Continued)

*Primary Examiner* — Seth A Silverman
(74) *Attorney, Agent, or Firm* — Dentons US LLP

(57) ABSTRACT

The present disclosure generally relates to sharing application visual output. In some examples, a user of a first electronic device selects a second electronic device with which to share visual out data of an application task. In some examples, a user selects a broadcast application from one or more broadcast applications identified by the electronic device for broadcasting the visual output of an application task.

48 Claims, 23 Drawing Sheets

US 10,873,786 B2
Page 2

(51) Int. Cl.
*H04N 21/478* (2011.01)
*H04N 21/41* (2011.01)
*H04N 21/2743* (2011.01)
*H04N 21/414* (2011.01)
*H04N 21/4143* (2011.01)
*A63F 13/86* (2014.01)

(56) References Cited

U.S. PATENT DOCUMENTS

| | | |
|---|---|---|
| 6,416,471 B1 | 7/2002 | Kumar et al. |
| 6,662,023 B1 | 12/2003 | Helle |
| 6,912,694 B1 | 6/2005 | Harrison et al. |
| 7,302,650 B1 | 11/2007 | Allyn et al. |
| 7,305,350 B1 | 12/2007 | Bruecken |
| 7,773,460 B2 | 8/2010 | Holt |
| 7,970,827 B1 | 6/2011 | Cumberbatch et al. |
| 8,105,208 B2 | 1/2012 | Oleson et al. |
| 8,121,945 B2 | 2/2012 | Rackley et al. |
| 8,453,940 B2 | 6/2013 | Diamond |
| 8,462,997 B2 | 6/2013 | Pettit et al. |
| 8,467,770 B1 | 6/2013 | Ben Ayed |
| 8,543,081 B2 | 9/2013 | Scott et al. |
| 8,554,694 B1 | 10/2013 | Ward et al. |
| 8,566,403 B2 | 10/2013 | Pascal et al. |
| 8,595,798 B2 | 11/2013 | Anand et al. |
| 8,624,836 B1 | 1/2014 | Miller et al. |
| 8,666,361 B2 | 3/2014 | Chu et al. |
| 8,700,158 B2 | 4/2014 | Mass et al. |
| 8,706,628 B2 | 4/2014 | Phillips |
| 8,825,445 B2 | 9/2014 | Hoffman et al. |
| 8,931,703 B1 | 1/2015 | Mullen et al. |
| 9,338,242 B1 | 5/2016 | Suchland et al. |
| 9,904,906 B2 | 2/2018 | Kim et al. |
| 10,051,103 B1 | 8/2018 | Gordon et al. |
| 10,425,284 B2 | 9/2019 | Dellinger et al. |
| 2001/0031622 A1 | 10/2001 | Kivela et al. |
| 2002/0029169 A1 | 3/2002 | Oki et al. |
| 2002/0068600 A1 | 6/2002 | Chihara et al. |
| 2002/0142734 A1 | 10/2002 | Wickstead |
| 2003/0002391 A1 | 1/2003 | Biggs |
| 2003/0182628 A1 | 9/2003 | Lira |
| 2004/0077462 A1 | 4/2004 | Brown et al. |
| 2004/0168107 A1 | 8/2004 | Sharp et al. |
| 2004/0218472 A1 | 11/2004 | Narayanaswami et al. |
| 2004/0225966 A1 | 11/2004 | Besharat et al. |
| 2004/0246607 A1 | 12/2004 | Watson et al. |
| 2005/0156873 A1 | 7/2005 | Walter et al. |
| 2005/0197063 A1 | 9/2005 | White |
| 2005/0202846 A1* | 9/2005 | Glass ............... G06F 1/1626 455/557 |
| 2006/0000900 A1 | 1/2006 | Fernandes et al. |
| 2006/0122748 A1 | 6/2006 | Nou |
| 2006/0155578 A1 | 7/2006 | Eisenberger et al. |
| 2006/0173749 A1 | 8/2006 | Ward et al. |
| 2006/0217104 A1 | 9/2006 | Cho |
| 2006/0271605 A1 | 11/2006 | Petruzzo |
| 2007/0067733 A1 | 3/2007 | Moore et al. |
| 2007/0096765 A1 | 5/2007 | Kagan |
| 2007/0101279 A1 | 5/2007 | Chaudhri et al. |
| 2007/0135043 A1 | 6/2007 | Hayes et al. |
| 2007/0194110 A1 | 8/2007 | Esplin et al. |
| 2007/0194113 A1 | 8/2007 | Esplin et al. |
| 2007/0254712 A1 | 11/2007 | Chitti |
| 2007/0261537 A1 | 11/2007 | Eronen et al. |
| 2007/0271340 A1 | 11/2007 | Goodman et al. |
| 2008/0040265 A1 | 2/2008 | Rackley, III et al. |
| 2008/0076637 A1 | 3/2008 | Gilley et al. |
| 2008/0077936 A1 | 3/2008 | Goel et al. |
| 2008/0183909 A1 | 7/2008 | Lim et al. |
| 2008/0259829 A1 | 10/2008 | Rosenblatt |
| 2009/0037326 A1 | 2/2009 | Chitti et al. |
| 2009/0057396 A1 | 3/2009 | Barbour et al. |
| 2009/0060170 A1 | 3/2009 | Coughlan et al. |
| 2009/0113315 A1 | 4/2009 | Fisher et al. |
| 2009/0195497 A1 | 8/2009 | Fitzgerald et al. |
| 2009/0205041 A1 | 8/2009 | Michalske |
| 2009/0216556 A1 | 8/2009 | Martin et al. |
| 2009/0231960 A1 | 9/2009 | Hutcheson |
| 2009/0276463 A1 | 11/2009 | Miller |
| 2009/0311993 A1 | 12/2009 | Horodezky |
| 2009/0313579 A1 | 12/2009 | Poulson |
| 2009/0319467 A1 | 12/2009 | Berg et al. |
| 2010/0054519 A1 | 3/2010 | Mulvey et al. |
| 2010/0064255 A1 | 3/2010 | Rottler et al. |
| 2010/0082481 A1 | 4/2010 | Lin et al. |
| 2010/0151908 A1 | 6/2010 | Skarby et al. |
| 2010/0151918 A1 | 6/2010 | Annambhotla et al. |
| 2010/0157742 A1 | 6/2010 | Relyea et al. |
| 2010/0190468 A1 | 7/2010 | Scott et al. |
| 2010/0198453 A1 | 8/2010 | Dorogusker et al. |
| 2010/0202368 A1 | 8/2010 | Hans |
| 2010/0211685 A1 | 8/2010 | McDowall et al. |
| 2010/0223145 A1 | 9/2010 | Dragt |
| 2010/0223563 A1 | 9/2010 | Green |
| 2010/0225962 A1 | 9/2010 | Okigami et al. |
| 2010/0226213 A1 | 9/2010 | Drugge et al. |
| 2010/0281374 A1 | 11/2010 | Schulz et al. |
| 2010/0299601 A1 | 11/2010 | Kaplan et al. |
| 2011/0004835 A1 | 1/2011 | Yanchar et al. |
| 2011/0010195 A1 | 1/2011 | Cohn |
| 2011/0059769 A1 | 3/2011 | Brunolli |
| 2011/0061010 A1 | 3/2011 | Wasko |
| 2011/0074699 A1 | 3/2011 | Marr et al. |
| 2011/0078025 A1 | 3/2011 | Shrivastav |
| 2011/0083111 A1 | 4/2011 | Forutanpour et al. |
| 2011/0088086 A1 | 4/2011 | Swink et al. |
| 2011/0098928 A1 | 4/2011 | Hoffman et al. |
| 2011/0106954 A1 | 5/2011 | Chatterjee et al. |
| 2011/0137678 A1 | 6/2011 | Williams |
| 2011/0159959 A1 | 6/2011 | Mallinson et al. |
| 2011/0167369 A1 | 7/2011 | Van Os |
| 2011/0193878 A1 | 8/2011 | Seo et al. |
| 2011/0197165 A1 | 8/2011 | Filippov et al. |
| 2011/0202883 A1 | 8/2011 | Oh et al. |
| 2011/0205851 A1 | 8/2011 | Harris et al. |
| 2011/0218765 A1 | 9/2011 | Rogers et al. |
| 2011/0234152 A1 | 9/2011 | Frossen et al. |
| 2011/0251892 A1 | 10/2011 | Laracey |
| 2011/0271223 A1 | 11/2011 | Cruz Moreno et al. |
| 2011/0296324 A1 | 12/2011 | Goossens et al. |
| 2011/0304685 A1 | 12/2011 | Khedouri et al. |
| 2012/0001922 A1 | 1/2012 | Escher et al. |
| 2012/0015779 A1 | 1/2012 | Powch et al. |
| 2012/0036029 A1 | 2/2012 | Esplin et al. |
| 2012/0044062 A1 | 2/2012 | Jersa et al. |
| 2012/0059787 A1 | 3/2012 | Brown et al. |
| 2012/0060092 A1 | 3/2012 | Hill et al. |
| 2012/0066628 A1 | 3/2012 | Ens et al. |
| 2012/0079122 A1 | 3/2012 | Brown et al. |
| 2012/0083258 A1 | 4/2012 | Rabii |
| 2012/0084210 A1 | 4/2012 | Farahmand |
| 2012/0092383 A1 | 4/2012 | Hysek et al. |
| 2012/0101887 A1 | 4/2012 | Harvey et al. |
| 2012/0116550 A1 | 5/2012 | Hoffman et al. |
| 2012/0117507 A1 | 5/2012 | Tseng et al. |
| 2012/0131441 A1 | 5/2012 | Jitkoff et al. |
| 2012/0136780 A1 | 5/2012 | El-awady et al. |
| 2012/0191603 A1 | 7/2012 | Nuzzi |
| 2012/0197523 A1 | 8/2012 | Kirsch et al. |
| 2012/0209829 A1 | 8/2012 | Thomas et al. |
| 2012/0258684 A1 | 10/2012 | Franz et al. |
| 2012/0310674 A1 | 12/2012 | Faulkner et al. |
| 2012/0310760 A1 | 12/2012 | Phillips et al. |
| 2012/0324390 A1 | 12/2012 | Tao |
| 2013/0027341 A1 | 1/2013 | Mastandrea |
| 2013/0031490 A1 | 1/2013 | Joo et al. |
| 2013/0044072 A1 | 2/2013 | Kobayashi et al. |
| 2013/0047034 A1 | 2/2013 | Salomon et al. |
| 2013/0050263 A1 | 2/2013 | Khoe et al. |
| 2013/0055147 A1 | 2/2013 | Vasudev et al. |
| 2013/0063383 A1 | 3/2013 | Anderssonreimer et al. |
| 2013/0069893 A1 | 3/2013 | Brinda et al. |
| 2013/0103814 A1 | 4/2013 | Carrasco et al. |
| 2013/0111579 A1 | 5/2013 | Newman et al. |

(56) References Cited

U.S. PATENT DOCUMENTS

| | | |
|---|---|---|
| 2013/0117696 A1 | 5/2013 | Robertson et al. |
| 2013/0137073 A1 | 5/2013 | Nacey et al. |
| 2013/0143512 A1 | 6/2013 | Hernandez et al. |
| 2013/0190083 A1* | 7/2013 | Toy ............... A63F 13/2145 463/31 |
| 2013/0205210 A1 | 8/2013 | Jeon et al. |
| 2013/0222270 A1 | 8/2013 | Winkler et al. |
| 2013/0225118 A1 | 8/2013 | Jang et al. |
| 2013/0246202 A1 | 9/2013 | Tobin |
| 2013/0254685 A1 | 9/2013 | Batraski et al. |
| 2013/0254705 A1 | 9/2013 | Mooring et al. |
| 2013/0260896 A1* | 10/2013 | Miura ............... A63F 13/12 463/42 |
| 2013/0262155 A1 | 10/2013 | Hinkamp |
| 2013/0290013 A1 | 10/2013 | Forrester |
| 2013/0295872 A1 | 11/2013 | Guday et al. |
| 2013/0304276 A1 | 11/2013 | Flies |
| 2013/0320080 A1 | 12/2013 | Olson et al. |
| 2014/0022183 A1 | 1/2014 | Ayoub et al. |
| 2014/0025737 A1 | 1/2014 | Kruglick |
| 2014/0058860 A1 | 2/2014 | Roh et al. |
| 2014/0058935 A1 | 2/2014 | Mijares |
| 2014/0059493 A1 | 2/2014 | Kim et al. |
| 2014/0068520 A1 | 3/2014 | Missig et al. |
| 2014/0073298 A1* | 3/2014 | Rossmann ............... H04W 4/00 455/414.2 |
| 2014/0074407 A1 | 3/2014 | Hernandez-Silveira et al. |
| 2014/0074717 A1 | 3/2014 | Evans |
| 2014/0081854 A1 | 3/2014 | Sanchez et al. |
| 2014/0094124 A1 | 4/2014 | Dave et al. |
| 2014/0134947 A1 | 5/2014 | Stouder-Studenmund |
| 2014/0143145 A1 | 5/2014 | Kortina et al. |
| 2014/0143678 A1 | 5/2014 | Mistry et al. |
| 2014/0149198 A1 | 5/2014 | Kim et al. |
| 2014/0164241 A1 | 6/2014 | Neuwirth |
| 2014/0176475 A1 | 6/2014 | Myers et al. |
| 2014/0181205 A1 | 6/2014 | Sherrets et al. |
| 2014/0187323 A1* | 7/2014 | Perry ............... A63F 13/10 463/31 |
| 2014/0189584 A1 | 7/2014 | Weng et al. |
| 2014/0244495 A1 | 8/2014 | Davis et al. |
| 2014/0245177 A1 | 8/2014 | Maklouf et al. |
| 2014/0250391 A1 | 9/2014 | Jong et al. |
| 2014/0282103 A1 | 9/2014 | Crandall |
| 2014/0287821 A1 | 9/2014 | Barclay et al. |
| 2014/0289660 A1 | 9/2014 | Min et al. |
| 2014/0293755 A1 | 10/2014 | Geiser et al. |
| 2014/0304738 A1 | 10/2014 | Nakaoka et al. |
| 2014/0310618 A1 | 10/2014 | Venkatesh |
| 2014/0317543 A1 | 10/2014 | Kim |
| 2014/0325384 A1 | 10/2014 | Kobayashi |
| 2014/0325408 A1 | 10/2014 | Leppanen et al. |
| 2014/0337207 A1 | 11/2014 | Zhang et al. |
| 2014/0337450 A1 | 11/2014 | Choudhary et al. |
| 2015/0006376 A1 | 1/2015 | Nuthulapati et al. |
| 2015/0012425 A1 | 1/2015 | Mathew |
| 2015/0039494 A1 | 2/2015 | Sinton et al. |
| 2015/0066758 A1 | 3/2015 | DeNardis et al. |
| 2015/0067513 A1 | 3/2015 | Zambetti et al. |
| 2015/0098309 A1 | 4/2015 | Adams et al. |
| 2015/0100982 A1 | 4/2015 | Sirpal et al. |
| 2015/0121405 A1 | 4/2015 | Ekselius et al. |
| 2015/0130830 A1 | 5/2015 | Nagasaki et al. |
| 2015/0160856 A1 | 6/2015 | Jang et al. |
| 2015/0180980 A1 | 6/2015 | Welinder et al. |
| 2015/0185995 A1 | 7/2015 | Shoemaker et al. |
| 2015/0205509 A1 | 7/2015 | Scriven et al. |
| 2015/0217163 A1 | 8/2015 | Amis et al. |
| 2015/0256491 A1 | 9/2015 | Eatough et al. |
| 2015/0269848 A1 | 9/2015 | Yuen et al. |
| 2015/0286391 A1 | 10/2015 | Jacobs et al. |
| 2015/0295901 A1 | 10/2015 | Woodward et al. |
| 2015/0301506 A1 | 10/2015 | Koumaiha |
| 2015/0334546 A1 | 11/2015 | Diamond |
| 2015/0347711 A1 | 12/2015 | Soli et al. |
| 2015/0348009 A1 | 12/2015 | Brown et al. |
| 2015/0350861 A1 | 12/2015 | Soli et al. |
| 2016/0004393 A1 | 1/2016 | Faaborg et al. |
| 2016/0014266 A1 | 1/2016 | Bhatt |
| 2016/0022202 A1 | 1/2016 | Peterson et al. |
| 2016/0027420 A1 | 1/2016 | Eronen |
| 2016/0028869 A1 | 1/2016 | Bhatt |
| 2016/0044269 A1 | 2/2016 | Kang |
| 2016/0058336 A1 | 3/2016 | Blahnik et al. |
| 2016/0065505 A1 | 3/2016 | Iskander |
| 2016/0066005 A1* | 3/2016 | Davis ............... H04N 21/25808 725/19 |
| 2016/0098137 A1 | 4/2016 | Kim et al. |
| 2016/0150063 A1* | 5/2016 | Choi ............... H04M 1/274516 455/414.1 |
| 2016/0188181 A1 | 6/2016 | Smith et al. |
| 2016/0202889 A1 | 7/2016 | Shin et al. |
| 2016/0226713 A1 | 8/2016 | Dellinger et al. |
| 2016/0239724 A1 | 8/2016 | Arfvidsson et al. |
| 2016/0253864 A1 | 9/2016 | Weber et al. |
| 2016/0261675 A1 | 9/2016 | Block et al. |
| 2016/0327911 A1 | 11/2016 | Eim et al. |
| 2016/0357363 A1 | 12/2016 | Decker et al. |
| 2016/0358133 A1 | 12/2016 | Van Os et al. |
| 2016/0358134 A1 | 12/2016 | Van Os et al. |
| 2016/0358180 A1 | 12/2016 | Van Os et al. |
| 2017/0004507 A1 | 1/2017 | Henderson et al. |
| 2017/0063753 A1 | 3/2017 | Probasco et al. |
| 2017/0093780 A1 | 3/2017 | Lieb et al. |
| 2017/0123571 A1 | 5/2017 | Huang et al. |
| 2017/0134321 A1 | 5/2017 | Ushio et al. |
| 2017/0269792 A1 | 9/2017 | Xu et al. |
| 2017/0344257 A1 | 11/2017 | Gnedin et al. |
| 2017/0354845 A1 | 12/2017 | Williams et al. |
| 2018/0034765 A1 | 2/2018 | Keszler et al. |
| 2018/0039406 A1 | 2/2018 | Kong et al. |
| 2018/0081515 A1 | 3/2018 | Block et al. |
| 2018/0143761 A1 | 5/2018 | Choi et al. |
| 2019/0220243 A1 | 7/2019 | Decker et al. |
| 2019/0232110 A1 | 8/2019 | Williams |
| 2019/0232111 A1 | 8/2019 | Williams |
| 2019/0250813 A1 | 8/2019 | Block et al. |
| 2019/0334782 A1 | 10/2019 | Dellinger et al. |
| 2019/0339822 A1 | 11/2019 | Devine et al. |
| 2019/0349463 A1 | 11/2019 | Soli et al. |
| 2020/0213437 A1 | 7/2020 | Bhatt |

FOREIGN PATENT DOCUMENTS

| | | |
|---|---|---|
| CN | 1536511 A | 10/2004 |
| CN | 1782685 A | 6/2006 |
| CN | 1997050 A | 7/2007 |
| CN | 101061484 A | 10/2007 |
| CN | 101505320 A | 8/2009 |
| CN | 101822020 A | 9/2010 |
| CN | 101827363 A | 9/2010 |
| CN | 101828411 A | 9/2010 |
| CN | 102646081 A | 8/2012 |
| CN | 102989159 A | 3/2013 |
| CN | 103154954 A | 6/2013 |
| CN | 103297610 A | 9/2013 |
| CN | 103581456 A | 2/2014 |
| CN | 104288983 A | 1/2015 |
| EP | 1705883 A1 | 9/2006 |
| EP | 2426902 A1 | 3/2012 |
| EP | 2632139 A2 | 8/2013 |
| GB | 2550639 A | 11/2017 |
| JP | 2003-296246 A | 10/2003 |
| JP | 2004-258738 A | 9/2004 |
| JP | 2005-339017 A | 12/2005 |
| JP | 2008-272301 A | 11/2008 |
| JP | 2009-147889 A | 7/2009 |
| JP | 2010-12335 A | 1/2010 |
| JP | 2012-53642 A | 3/2012 |
| JP | 2012-533117 A | 12/2012 |
| JP | 2014-44724 A | 3/2014 |
| JP | 2014-216868 A | 11/2014 |
| JP | 2015-531916 A | 11/2015 |
| KR | 10-2004-0067514 A | 7/2004 |

(56) References Cited

FOREIGN PATENT DOCUMENTS

| KR | 10-2014-0105309 A | 9/2014 |
|---|---|---|
| TW | 498240 B | 8/2002 |
| TW | 200512616 A | 4/2005 |
| TW | 201210368 A | 3/2012 |
| TW | 201240499 A | 10/2012 |
| WO | 2007/000012 A1 | 1/2007 |
| WO | 2007/142703 A1 | 12/2007 |
| WO | 2007/149731 A1 | 12/2007 |
| WO | 2014/002711 A1 | 1/2014 |
| WO | 2014/022711 A1 | 2/2014 |
| WO | 2014/074407 A1 | 5/2014 |
| WO | 2016/126733 A1 | 8/2016 |

OTHER PUBLICATIONS

Advisory Action received for U.S. Appl. No. 14/870,793, dated Apr. 13, 2017, 3 pages.
Final Office Action received for U.S. Appl. No. 14/599,425, dated May 19, 2017, 24 pages.
Final Office Action received for U.S. Appl. No. 14/599,425, dated Oct. 8, 2015, 20 pages.
Final Office Action received for U.S. Appl. No. 14/869,877, dated Aug. 3, 2016, 13 pages.
Final Office Action received for U.S. Appl. No. 14/870,726, dated Apr. 19, 2017, 17 pages.
Final Office Action received for U.S. Appl. No. 14/870,793, dated Jan. 19, 2017, 16 pages.
International Preliminary Report on Patentability received for PCT Patent Application No. PCT/US2015/032474, dated Dec. 15, 2016, 7 pages.
International Preliminary Report on Patentability received for PCT Patent Application No. PCT/US2016/016216, dated May 4, 2017, 14 pages.
International Search Report and Written Opinion received for PCT Patent Application No. PCT/US2016/014997, dated Aug. 31, 2016, 21 pages.
International Search Report and Written Opinion received for PCT Patent Application No. PCT/US2015/032474, dated Aug. 19, 2015, 8 pages.
International Search Report and Written Opinion received for PCT Patent Application No. PCT/US2015/053353, dated May 9, 2016, 21 pages.
International Search Report and Written Opinion received for PCT Patent Application No. PCT/US2016/016216, dated Jun. 27, 2016, 18 pages.
International Search Report and Written Opinion received for PCT Patent Application No. PCT/US2016/021403, dated May 12, 2016, 23 pages.
International Search Report and Written Opinion received for PCT Patent Application No. PCT/US2016/034175, dated Oct. 7, 2016, 17 pages.
Invitation to Pay Addition Fees and Partial International Search Report received for PCT Patent Application No. PCT/US2016/014997, dated May 2, 2016, 5 pages.
Invitation to Pay Addition Fees and Partial International Search Report received for PCT Patent Application No. PCT/US2016/016216, dated Apr. 20, 2016, 6 pages.
Invitation to Pay Addition Fees received for PCT Patent Application No. PCT/US2017/036608, dated Aug. 14, 2017, 2 pages.
Invitation to Pay Additional Fees received for PCT Patent Application No. PCT/US2016/034175, dated Aug. 11, 2016, 3 pages.
Invitation to Pay Additional fees received for PCT Patent Application No. PCT/US2015/053353, dated Jan. 21, 2016, 7 pages.
Invitation to Pay Additional Fees received for PCT Patent Application No. PCT/US2017/035554, dated Jul. 20, 2017, 2 pages.
Invitation to Restrict or Pay Additional Fees received for PCT Patent Application No. PCT/US2016/016216, dated Dec. 19, 2016, 9 pages.

"IOS Security", White Paper, Available online at: https://web.archive.org/web/20150526223200/http://www.apple.com/business/docs/iOS_Security_Guide.pdf, Apr. 2015, 55 pages.
"iPhone User Guide for iOS 7.1 Software", Available online at: https://manuals.info.apple.com/MANUALS/1000/MA1681/en_US/iphone_ios7_user_guide.pdf, Mar. 10, 2014, pp. 1-162.
Non-Final Office Action received for U.S. Appl. No. 14/503,372, dated Dec. 5, 2014, 11 pages.
Non-Final Office Action received for U.S. Appl. No. 14/599,425, dated Mar. 17, 2015, 16 pages.
Non-Final Office Action received for U.S. Appl. No. 14/599,425, dated Oct. 26, 2016, 22 pages.
Non-Final Office Action received for U.S. Appl. No. 14/869,877, dated Jan. 29, 2016, 18 pages.
Non-Final Office Action received for U.S. Appl. No. 14/869,877, dated Jun. 16, 2017, 17 pages.
Non-Final Office Action received for U.S. Appl. No. 14/870,726, dated Sep. 16, 2016, 12 pages.
Non-Final Office Action received for U.S. Appl. No. 14/870,793, dated Apr. 19, 2016, 17 pages.
Notice of Allowance received for Chinese Patent Application No. 201520358505.5, dated Jan. 13, 2016, 3 pages (2 pages of English Translation and 1 page of Official Copy).
Notice of Allowance received for Taiwanese Patent Application No. 104117509, dated Mar. 31, 2017, 3 pages (Official Copy only) (see attached 37 CFR § 1.98(a) (3)).
Office Action received for Australian Patent Application No. 2015100734, dated Jul. 29, 2015, 5 pages.
Office Action received for Australian Patent Application No. 2015267240, dated Apr. 10, 2017, 5 pages.
Office Action received for Australian Patent Application No. 2016100796, dated Aug. 26, 2016, 6 pages.
Office Action received for Australian Patent Application No. 2016100796, dated Feb. 13, 2017, 4 pages.
Office Action received for Australian Patent Application No. 2017100231, dated Apr. 13, 2017, 3 pages.
Office Action received for Australian patent Application No. 2017100667, dated Aug. 3, 2017, 9 pages.
Office Action received for Chinese Patent Application No. 201620509515.9, dated Nov. 9, 2016, 2 pages (1 pages of English Translation and 1 page of Official Copy).
Office Action received for Danish Patent Application No. PA201670362, dated Jun. 1, 2017, 6 pages.
Office Action received for Danish Patent Application No. PA201670362, dated Nov. 21, 2016, 11 pages.
Office Action received for Danish Patent Application No. PA201670749, dated Jan. 30, 2017, 11 pages.
Office Action received for Danish Patent Application No. PA201670751, dated Jan. 13, 2017, 9 pages.
Office Action received for European Patent Application No. 15730890.9, dated Aug. 3, 2017, 4 pages.
Office Action received for Taiwanese Patent Application No. 104117509, dated Aug. 22, 2016, 6 pages (3 pages of English Translation and 3 pages of Official Copy).
Office Action received for Taiwanese Patent Application No. 104132636, dated Mar. 23, 2017, 25 pages (10 pages of English Translation and 15 pages of Official Copy).
Razykdreviews, "In Depth Review of Apple Watch Activity and Workout App", Available online at: <URL: https://wvvw.youtube.com/watch?v=GkKI3qIK0ow>, May 11, 2015, 1 page.
Rizknows, "Garmin Connect Mobile App—Review #2", Available online at: https://www.youtube.com/watch?v=7my3wMpeRbE, Oct. 22, 2015, 1 page.
Written Opinion Issued from International Preliminary Examining Authority for PCT Application No. PCT/US2016/016216, dated Feb. 20, 2017, 12 pages.
International Search Report and Written Opinion received for PCT Patent Application No. PCT/US2017/036608, dated Oct. 20, 2017, 15 pages.
Extended European Search Report received for European Patent Application No. 16804040.0, dated Feb. 26, 2018, 9 pages.
Office Action received for Australian Patent Application No. 2017101375, dated Feb. 19, 2018, 4 pages.

(56) References Cited

OTHER PUBLICATIONS

Final Office Action received for U.S. Appl. No. 14/841,606, dated Sep. 7, 2018, 34 pages.
Final Office Action received for U.S. Appl. No. 14/864,759, dated Sep. 4, 2018, 24 pages.
Office Action received for Chinese Patent Application No. 201510284850.3, dated Jul. 9, 2018, 11 pages. (2 pages of English Translation and 9 pages of Official Copy).
Summons to Attend Oral Proceedings received for European Patent Application No. 15730890.9, dated Sep. 10, 2018, 11 pages.
Non-Final Office Action received for U.S. Appl. No. 14/864,759, dated Mar. 20, 2018, 20 pages.
Office Action received for Australian Patent Application No. 2015267240, dated Mar. 21, 2018, 5 pages.
Office Action received for Australian Patent Application No. 2016215440, dated Mar. 13, 2018, 3 pages.
Office Action received for Chinese Patent Application No. 201510284850.3, dated Nov. 28, 2017, 15 pages (5 pages of English Translation and 10 pages of Official Copy).
Office Action received for Chinese Patent Application No. 201580028677.9, dated May 25, 2018, 14 pages (4 pages of English Translation and 10 pages of Official copy).
Certification of Examination received for Australian Patent Application No. 2018100158, dated Oct. 23, 2018, 2 pages.
Non Final Office Action received for U.S. Appl. No. 14/869,877, dated Oct. 5, 2018, 19 pages.
Office Action received for Japanese Patent Application No. 2017-545918, dated Sep. 14, 2018, 12 pages (7 pages of English Translation and 5 pages of Official copy).
Office Action received for Korean Patent Application No. 10-2017-7024570, dated Sep. 28, 2018, 14 pages (6 pages of English Translation and 8 pages of Official copy).
Office Action received for Danish Patent Application No. PA201670751, dated Nov. 13, 2017, 2 pages.
Codrington, "Intuitive Scrolling Interfaces with CSS Scroll Snap Points", Online Available at: https://www.sitepoint.com/intuitive-scrolling-interfaces-with-css-scroll-snap-points/, Published on Dec. 8, 2015, 14 pages.
Examiner's Answer to Appeal Brief received for U.S. Appl. No. 14/870,793, dated Apr. 16, 2018, 15 pages.
Final Office Action received for U.S. Appl. No. 14/869,877, dated Apr. 26, 2018, 18 pages.
"Mugs", Online Available: at https://web.archive.org/web/20151029034349/http://le-mugs.com/, Published on Oct. 29, 2015.
Notice of Acceptance received for Australian Patent Application No. 2015267240, dated Apr. 10, 2018, 3 pages.
Office Action received for Australian Patent Application No. 2018100158, dated Apr. 23, 2018, 5 pages.
Non-Final Office Action received for U.S. Appl. No. 14/599,424, dated Jan. 17, 2018, 13 pages.
Office Action received for Danish Patent Application No. PA201670362, dated Jan. 29, 2018, 3 pages.
Office Action received for Taiwanese Patent Application No. 104132636, dated Oct. 31, 2017, 10 pages (4 pages of English Translation and 6 pages of Official Copy).
Final Office Action received for U.S. Appl. No. 14/599,424, dated Jun. 28, 2018, 12 pages.
Final Office Action received for U.S. Appl. No. 14/599,425, dated Jun. 12, 2018, 45 pages.
Intention to Grant received for European Patent Application No. 16706081.3, dated Jun. 11, 2018, 7 pages.
Office Action received for Danish Patent Application No. PA201770423, dated Jun. 12, 2018, 7 pages.
Final Office Action received for U.S. Appl. No. 14/863,069, dated Jul. 5, 2018, 19 pages.
Intention to Grant received for European Patent Application No. 16706081.3, dated Jul. 18, 2018, 8 pages.
Office Action received for Australian Patent Application No. 2016229847, dated Jul. 3, 2018, 4 pages.

Block et al., U.S. Appl. No. 15/554,204 entitled "Sharing User-Configurable Graphical Constructs", filed Aug. 28, 2017, 247 pages.
International Preliminary Report on Patentability received for PCT Patent Application No. PCT/US2016/034175, dated Dec. 14, 2017, 14 pages.
International Search Report and Written Opinion received for PCT Patent Application No. PCT/US2017/035554, dated Sep. 22, 2017, 42 pages.
Non-Final Office Action received for U.S. Appl. No. 14/841,606, dated Dec. 7, 2017, 30 pages.
Office Action received for Australian Patent Application No. 2017101375, dated Dec. 1, 2017, 3 pages.
Office Action received for Japanese Patent Application No. 2016-569945, dated Nov. 10, 2017, 8 pages (4 pages of English Translation and 4 pages of Official Copy).
Search Report and Opinion received for Danish Patent Application No. PA201770423, dated Oct. 4, 2017, 10 pages.
Tweedie, Steven, "Create and Customize Your Own Emojis with 'Makemoji' For iPhone". Available online at: http://www.businessinsider.com/create-custom-emojis-with-makemoji-app-2014-8, Aug. 19, 2014, 6 pages.
Whitwam, Ryan, "Facer is Fast Becoming the De Facto Custom Watch Face Maker for Android Wear", Available online at: http://www.androidpolice.com/2014/09/19/facer-is-fast-becoming-the-de-facto-custom-watch-face-maker-for-android-wear, Sep. 19, 2014, 11 pages.
International Preliminary Report on Patentability received for PCT Patent Application No. PCT/US2016/014997, dated Dec. 21, 2017, 16 pages.
Non-Final Office Action received for U.S. Appl. No. 14/599,425, dated Jan. 11, 2018, 42 pages.
Notice of Acceptance received for Australian Patent Application No. 2016229847, dated Sep. 12, 2018, 3 pages.
Notice of Allowance received for U.S. Appl. No. 14/870,726, dated Sep. 11, 2018, 9 pages.
Office Action received for Japanese Patent Application No. 2016-569945, dated Sep. 10, 2018, 11 pages (6 pages of English Translation and 5 pages of Official Copy).
International Preliminary Report on Patentability received for PCT Patent Application No. PCT/US2015/053353, dated Sep. 21, 2017, 15 pages.
International Preliminary Report on Patentability received for PCT Patent Application No. PCT/US2016/021403, dated Sep. 21, 2017, 21 pages.
Non-Final Office Action received for U.S. Appl. No. 14/863,069, dated Oct. 5, 2017, 19 pages.
Office Action received for Danish Patent Application No. PA201670749, dated Oct. 3, 2017, 3 pages.
Decision to Grant received for European Patent Application No. 16706081.3, dated Nov. 29, 2018, 2 pages.
International Preliminary Report on Patentability received for PCT Patent Application No. PCT/US2017/035554, dated Dec. 20, 2018, 39 pages.
Notice of Allowance received for U.S. Appl. No. 14/599,424, dated Dec. 13, 2018, 6 pages.
Notice of Allowance received for U.S. Appl. No. 14/599,425, dated Dec. 19, 2018, 9 pages.
Notice of Allowance received for U.S. Appl. No. 14/864,759, dated Dec. 14, 2018, 10 pages.
Office Action received for Australian Patent Application No. 2016270323, dated Nov. 26, 2018, 4 pages.
Notice of Allowance received for U.S. Appl. No. 14/863,069, dated Feb. 6, 2019, 6 pages.
Office Action received for Australian Patent Application No. 2016215440, dated Jan. 22, 2019, 2 pages.
Office Action received for Chinese Patent Application No. 201610371774.4, dated Dec. 19, 2018, 13 pages (5 pages of English Translation and 8 pages of Official copy).
Office Action received for Korean Patent Application No. 10-2017-7034558, dated Dec. 15, 2018, 15 pages (7 pages of English Translation and 8 pages of Official Copy).

(56) References Cited

OTHER PUBLICATIONS

Office Action received for Taiwanese Patent Application No. 104132636, dated Dec. 13, 2018, 26 pages (9 pages of English Translation and 17 pages of Official Copy).
Advisory Action received for U.S. Appl. No. 14/841,606, dated Feb. 28, 2019, 3 pages.
Notice of Acceptance received for Australian Patent Application No. 2016215440, dated Feb. 28, 2019, 3 pages.
Office Action received for Australian Patent Application No. 2018101855, dated Feb. 22, 2019, 4 pages.
Office Action received for Japanese Patent Application No. 2017-562330, dated Jan. 18, 2019, 11 pages (6 pages of English Translation and 5 pages of Official Copy).
Preliminary Opinion received for European Patent Application No. 15730890.9, dated Mar. 7, 2019, 4 pages.
Supplemental Notice of Allowance received for U.S. Appl. No. 14/863,069, dated Mar. 1, 2019, 3 pages.
Supplemental Notice of Allowance received for U.S. Appl. No. 14/870,726, dated Mar. 6, 2019, 6 pages.
Extended European Search Report received for European Patent Application No. 16762356.0, dated Nov. 9, 2018, 10 Pages.
International Preliminary Report on Patentability received for PCT Patent Application No. PCT/US2017/036608, dated Dec. 27, 2018, 12 pages.
Notice of Allowance received for U.S. Appl. No. 15/616,480, dated Jan. 3, 2019, 8 pages.
Advisory Action received for U.S. Appl. No. 14/863,099, dated Sep. 8, 2016, 3 pages.
Dharmasena, Anusha, "iMessage—send as text message Option", YouTube, Available online at: https://www.youtube.com/watch?v=hXG-MdIW6FA, Feb. 18, 2013, 1 page.
Examiner's Answer to Appeal Brief received for U.S. Appl. No. 14/774,664, dated May 31, 2018, 28 pages.
Examiner's Answer to Appeal Brief received for U.S. Appl. No. 14/863,099, dated Jul. 28, 2017, 31 pages.
Extended European Search Report received for European Patent Application No. 18213157.3, dated Apr. 12, 2019, 8 pages.
Extended European Search Report received for European Patent Application No. 19163212.4, dated Jun. 25, 2019, 11 pages.
Final Office Action received for U.S. Appl. No. 14/774,664, dated Aug. 25, 2017, 23 pages.
Final Office Action received for U.S. Appl. No. 14/863,099, dated Apr. 21, 2016, 20 pages.
Final Office Action received for U.S. Appl. No. 14/869,877, dated Jun. 11, 2019, 35 pages.
International Preliminary Report on Patentability received for PCT Patent Application No. PCT/US2014/027882, dated Sep. 24, 2015, 8 pages.
International Search Report and Written Opinion received for PCT Patent Application No. PCT/US2013/032498, dated Feb. 10, 2014, 18 pages.
International Search Report and Written Opinion received for PCT Patent Application No. PCT/US2014/027882, dated Oct. 10, 2014, 11 pages.
Invitation to Pay Additional Fees received for PCT Patent Application No. PCT/US2014/027882, dated Aug. 5, 2014, 2 pages.
Non-Final Office Action received for U.S. Appl. No. 15/554,204, dated Apr. 17, 2019, 19 pages.
Non-Final Office Action received for U.S. Appl. No. 14/774,664, dated Mar. 7, 2017, 23 pages.
Non-Final Office Action received for U.S. Appl. No. 14/841,606, dated May 8, 2019, 28 pages.
Non-Final Office Action received for U.S. Appl. No. 14/863,099, dated Dec. 2, 2015, 12 pages.
Notice of Allowance received for Chinese Patent Application No. 201580028677.9, dated Apr. 2, 2019, 2 pages (1 page of English Translation and 1 page of Official Copy).
Notice of Allowance received for Japanese Patent Application No. 2017-545918, dated Jul. 22, 2019, 4 pages (1 page of English Translation and 3 pages of Official Copy).
Notice of Allowance received for U.S. Appl. No. 14/863,069, dated Jun. 18, 2019, 6 pages.
Office Action received for Australian Patent Application No. 2016270323, dated May 29, 2019, 4 pages.
Office Action received for Australian Patent Application No. 2018206772, dated Apr. 1, 2019, 4 pages.
Office Action received for Australian Patent Application No. 2018279037, dated Jun. 18, 2019, 5 pages.
Office Action received for Chinese Patent Application No. 201510284850.3, dated Jun. 21, 2019, 10 pages (4 pages of English Translation and 6 pages of Official Copy).
Office Action received for Chinese Patent Application No. 201610371774.4, dated Jul. 8, 2019, 6 pages (3 pages of English Translation and 3 pages of Official copy).
Office Action received for Danish Patent Application No. PA201770423, dated Mar. 29, 2019, 6 pages.
Office Action received for European Patent Application No. 16804040.0, dated May 13, 2019, 12 pages.
Office Action received for Korean Patent Application No. 10-2017-7024570, dated Jul. 10, 2019, 6 pages (3 pages of English Translation and 3 pages of Official Copy).
Office Action received for Korean Patent Application No. 10-2017-7034558, dated Jun. 4, 2019, 7 pages (3 pages of English Translation and 4 pages of Official Copy).
Partial Supplementary European Search Report received for European Patent Application No. 17810749.6, dated Apr. 25, 2019, 8 pages.
Search Report and Opinion received for Danish Patent Application No. PA201870385, dated Nov. 16, 2018, 10 pages.
Supplemental Notice of Allowance received for U.S. Appl. No. 14/863,069, dated Mar. 29, 2019, 3 pages.
Supplemental Notice of Allowance received for U.S. Appl. No. 15/616,480, dated Mar. 28, 2019, 2 pages.
Wikipedia, "Enhanced Multi-Level Precedence and Pre-emption Service", Available online at: https://de.wikipedia.org/w/index.php?%20title=Enhanced%20Multi%E3%83%BCLevel_Precedence_And_Pre-emption_Service&oldid=123047429, Oct. 2013, 2 pages (Official copy only) {See Communication under 37 CFR § 1.98(a) (3)}.
Decision on Appeal received for U.S. Appl. No. 14/863,099, dated Aug. 22, 2019, 9 pages.
Invitation to Pay Additional Fee received for PCT Patent Application No. PCT/US2019/024790, dated Jul. 18, 2019, 10 pages.
Office Action received for European Patent Application No. 17810749.6, dated Aug. 20, 2019, 9 pages.
Office Action received for Japanese Patent Application No. 2016-569945, dated Jul. 29, 2019, 5 pages (2 pages of English Translation and 3 pages of Official Copy).
Applicant Initiated Interview Summary received for U.S. Appl. No. 15/554,204, dated Oct. 11, 2019, 5 pages.
Notice of Allowance received for Japanese Patent Application No. 2017-562330, dated Sep. 20, 2019, 4 pages (1 page of English Translation and 3 pages of Official Copy).
Office Action received for Chinese Patent Application No. 201680008151.9, dated Aug. 27, 2019, 24 pages (11 pages of English Translation and 13 pages of Official Copy).
Office Action received for Korean Patent Application No. 10-2017-7034558, dated Sep. 25, 2019, 9 pages (4 pages of English Translation and 5 pages of Official Copy).
Decision on Appeal received for U.S. Appl. No. 14/774,664, dated Sep. 12, 2019, 8 pages.
International Search Report and Written Opinion received for PCT Patent Application No. PCT/US2019/024790, dated Sep. 11, 2019, 18 pages.
Office Action received for Danish Patent Application No. PA201870385, dated Aug. 23, 2019, 3 pages.
Certificate of Examination received for Australian Patent Application No. 2018101855, dated Aug. 6, 2019, 2 pages.
Office Action received for Australian Patent Application No. 2019100490, dated Jul. 26, 2019, 4 pages.
Supplementary European Search Report received for European Patent Application No. 17810749.6, dated Aug. 6, 2019, 6 pages.
Supplemental Notice of Allowance received for U.S. Appl. No. 14/863,069, dated Aug. 15, 2019, 3 pages.

(56) References Cited

OTHER PUBLICATIONS

Office Action received for Australian Patent Application No. 2017286296, dated May 8, 2019, 4 pages.
Extended European Search Report received for European Patent Application No. 17813824.4, dated Dec. 5, 2019, 7 pages.
"How to Send and Receive files over Bluetooth on an Android Phone", Online Available at: https://web.archive.org/web/20160529062240/http://www.androidtipsandhacks.com/android/send-receive-files-bluetooth-android-phone/, May 29, 2016, 7 pages.
"Kamcord—Wikipedia", Online Available at: https://en.wikipedia.org/w/index.php?title=Kamcord&oldid=712263010>, Mar. 28, 2016, 2 pages.
"Kamcord Developers", Online Available at: https://web.archive.org/web/20140827043641/http://www.kamcord.com/developers/>, Aug. 27, 2014, 7 pages.
"Kamcord Developers—Quick Start Guide", Online Available at: https://web.archive.org/web/20140801055705/https://www.kamcord.com/developers/docs/ios/features-and-settings/, Aug. 1, 2014, 10 pages.
Office Action received for Chinese Patent Application No. 201610371774.4, dated Dec. 2, 2019, 6 pages (3 pages of English Translation and 3 pages of Official Copy).
Office Action received for Chinese Patent Application No. 201811330077.X, dated Nov. 13, 2019, 14 pages (6 pages of English Translation and 8 pages of Official Copy).
Applicant-Initiated Interview Summary received for U.S. Appl. No. 15/554,204, dated Jan. 31, 2020, 3 pages.
Intention to Grant received for Danish Patent Application No. PA201870385, dated Jan. 24, 2020, 2 pages.
Notice of Allowance received for Japanese Patent Application No. 2016-569945, dated Jan. 7, 2020, 4 pages (1 page of English Translation and 3 pages of Official Copy).
Office Action received for Australian Patent Application No. 2018279037, dated Jan. 17, 2020, 4 pages.
Summons to Attend Oral Proceedings received for European Patent Application No. 16804040.0, dated Jan. 24, 2020, 11 pages.
Wikipedia, "Emoji", Available online at: https://en.wikipedia.org/w/index.php?title=Emoji&oldid=648831795, Feb. 25, 2015, 12 pages.
Wikipedia, "Emoticon", Available online at: https://en.wikipedia.org/w/index.php?title=Emoticon&oldid=648776142, Feb. 25, 2015, 9 pages.
Internet Blog Post, "[PC] Pre-Customization of Black Desert's Characters", Online Available at: https://blog.naver.com/hsh6051/220209813968, Dec. 14, 2014, 41 pages (21 pages of English translation and 20 pages of Official Copy).
Office Action received for Australian Patent Application No. 2018206772, dated Nov. 6, 2019, 4 pages.
Office Action received for Korean Patent Application No. 10-2019-7029673, dated Nov. 5, 2019, 10 pages (4 pages of English Translation and 6 pages of Official Copy).
Certificate of Examination received for Australian Patent Application No. 2019100490, dated Oct. 16, 2019, 2 pages.
Final Office Action received for U.S. Appl. No. 15/554,204, dated Oct. 31, 2019, 22 pages.
Brief Communication Regarding Oral Proceedings received for European Patent Application No. 16804040.0, dated May 28, 2020, 15 pages.
Notice of Allowance received for Chinese Patent Application No. 201610371774.4, dated Jun. 4, 2020, 2 pages (1 page of English Translation and 1 page of Official Copy).

Office Action received for Australian Patent Application No. 2017277971, dated Jun. 3, 2020, 3 pages.
Notice of Acceptance received for Australian Patent Application No. 2017286296, dated May 1, 2020, 3 pages.
Applicant Initiated Interview of Summary received for U.S. Appl. No. 16/389,722, dated Jul. 7, 2020, 5 pages.
Notice of Allowance reveived for U.S. Appl. No. 15/554,204, dated Jul. 13, 2020, 10 pages.
Office Action received for European Patent Application No. 19724963.4, dated Jul. 28, 2020, 6 pages.
Applicant-Initiated Interview Summary received for U.S. Appl. No. 16/145,033, dated Jun. 29, 2020, 5 pages.
Examiner's Answer to Appeal Brief received for U.S. Appl. No. 14/869,877, dated Jun. 26, 2020, 14 pages.
Notice of Allowance received for Chinese Patent Application No. 201680008151.9, dated Jun. 16, 2020, 2 pages (1 page of English Translation and 1 page of Official Copy).
Office Action received for Chinese Patent Application No. 201811330077.X, dated May 18, 2020, 9 pages (3 pages of English Translation and 6 pages of Official Copy).
Advisory Action received for U.S. Appl. No. 15/554,204, dated Mar. 12, 2020, 3 pages.
Applicant-Initiated Interview Summary received for U.S. Appl. No. 16/407,590, dated Jun. 5, 2020, 3 pages.
Decision to Grant received for Danish Patent Application No. PA201870385, dated Mar. 26, 2020, 2 pages.
Non-Final Office Action received for U.S. Appl. No. 16/145,033, dated Mar. 4, 2020, 50 pages.
Non-Final Office Action received for U.S. Appl. No. 16/363,945, dated Apr. 24, 2020, 13 pages.
Non-Final Office Action received for U.S. Appl. No. 16/377,892, dated May 21, 2020, 9 pages.
Non-Final Office Action received for U.S. Appl. No. 16/378,136, dated Jun. 2, 2020, 8 pages.
Non-Final Office Action received for U.S. Appl. No. 16/389,722, dated Apr. 3, 2020, 15 pages.
Non-Final Office Action received for U.S. Appl. No. 16/407,590, dated Apr. 10, 2020, 12 pages.
Notice of Acceptance received for Australian Patent Application No. 201806772, dated Mar. 17, 2020, 3 pages.
Notice of Acceptance received for Australian Patent Application No. 2018206772, dated May 13, 2020, 3 pages.
Office Action received for Australian Patent Application No. 2018206772, dated Feb. 6, 2020, 4 pages.
Office Action received for Chinese Patent Application No. 201680008151.9, dated Apr. 20, 2020, 6 pages (3 pages of English Translations and 3 pages of Official Copy).
Office Action received for Chinese Patent Application No. 201680013193.1, dated Mar. 25, 2020, 21 pages (8 pages of English Translation and 13 pages of Official Copy).
Office Action received for Chinese Patent Application No. 201710439448.7, dated Mar. 27, 2020, 13 pages (7 pages of English Translation and 6 pages of Official Copy).
Office Action received for European Patent Application No. 18213157.3, dated May 15, 2020, 7 pages.
Office Action received for Korean Patent Application No. 10-2019-7038235, dated Mar. 9, 2020, 15 pages (7 pages of English Translation and 8 pages of Official Copy).

\* cited by examiner

RECORDING AND BROADCASTING APPLICATION VISUAL OUTPUT

This application claims priority to U.S. provisional patent application 62/349,041, entitled "RECORDING AND BROADCASTING APPLICATION VISUAL OUTPUT," filed Jun. 12, 2016, the content of which is hereby incorporated by reference in its entirety.

FIELD

The present disclosure relates generally to computer user interfaces, and more specifically to techniques for sharing application visual output.

BACKGROUND

Broadcasting and replying of video games and other live output of applications is a growing form of entertainment. Numerous websites support ecosystems for video game players to post previously recorded outputs of video games or to broadcast the output of a video game live. The popularity of these websites have only increased with the rise of e-sports leagues that hold competitions and tournaments for various applications.

BRIEF SUMMARY

Some techniques for sharing application visual output using electronic devices, however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for sharing application visual output. Such methods and interfaces optionally complement or replace other methods for sharing application visual output. Such methods and interfaces reduce the cognitive burden on a user and produce a more efficient human-machine interface.

In accordance with an embodiment, at a first electronic device with one or more processors, a communication interface, and memory, and that is in communication with a display, a first input is received corresponding to an affordance to start a task in an application executing on the one or more processors. In response to receiving the first input, the task is started. While the task is ongoing, visual output of the application is recorded as application task data. After the task has ceased, an affordance for sharing the application task data with a second electronic device that is associated with the first electronic device is caused to be displayed. While the affordance for sharing is displayed on the display, a second input is received that corresponds to selection of the affordance for sharing the application task data. In response to receiving the second input, the application task data is transmitted to the second electronic device over the communication interface.

In accordance with an embodiment, at a first electronic device with one or more processors, a communication interface, and memory, and that is in communication with a display, causing to display on the display a first affordance in an application. The first affordance is for broadcasting visual output of a task of the application. In response to receiving a first user input corresponding to selection of the first affordance and in accordance with a determination that multiple broadcast applications on the electronic device are capable of broadcasting visual output of the application while the task is ongoing: (1) a second affordance is caused to be displayed on the display, the second affordance is for selecting a broadcast application of the plurality of broadcast applications capable of broadcasting the visual output of the application and (2) while the second affordance is displayed on the display, second user input is received corresponding to selection of the second affordance. After receiving the second user input, the task is started and the visual output of the application is sent to the broadcast application for transmitting the visual output over the communication interface to a remote server.

An embodiment of a transitory computer readable storage medium stores one or more programs, the one or more programs comprising instructions, which when executed by one or more processors of an electronic device with a display and one or more input devices, cause the device to: cause to display on the display a first affordance in an application, wherein the first affordance is for broadcasting visual output of a task of the application; in response to receiving a first user input corresponding to selection of the first affordance: in accordance with a determination that multiple broadcast applications on the electronic device are capable of broadcasting visual output of the application while the task is ongoing: cause to display on the display a second affordance for selecting a broadcast application of the plurality of broadcast applications capable of broadcasting the visual output of the application; and while the second affordance is displayed on the display, receive second user input corresponding to selection of the second affordance; after receiving the second user input, start the task and sending the visual output of the application to the broadcast application for transmitting the visual output over the communication interface to a remote server.

An embodiment of a transitory computer readable storage medium stores one or more programs, the one or more programs comprising instructions, which when executed by one or more processors of an electronic device with a display and one or more input devices, cause the device to: receive a first input corresponding to an affordance to start a task in an application executing on the one or more processors; in response to receiving the first input, start the task; while the task is ongoing, record visual output of the application as application task data; after the task has ceased, causing to be displayed on the display an affordance for sharing the application task data with a second electronic device that is associated with the first electronic device; and while the affordance for sharing is displayed on the display, receive a second input that corresponds to selection of the affordance for sharing the application task data; and in response to receiving the second input, transmit the application task data to the second electronic device over the communication interface.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for sharing application visual output, thereby increasing the effectiveness, efficiency, and user satisfaction with such devices. Such methods and interfaces may complement or replace other methods for sharing application visual output.

DESCRIPTION OF THE FIGURES

For a better understanding of the various described embodiments, reference should be made to the Description of Embodiments below, in conjunction with the following drawings in which like reference numerals refer to corresponding parts throughout the figures.

DESCRIPTION OF EMBODIMENTS

Figure 1A:
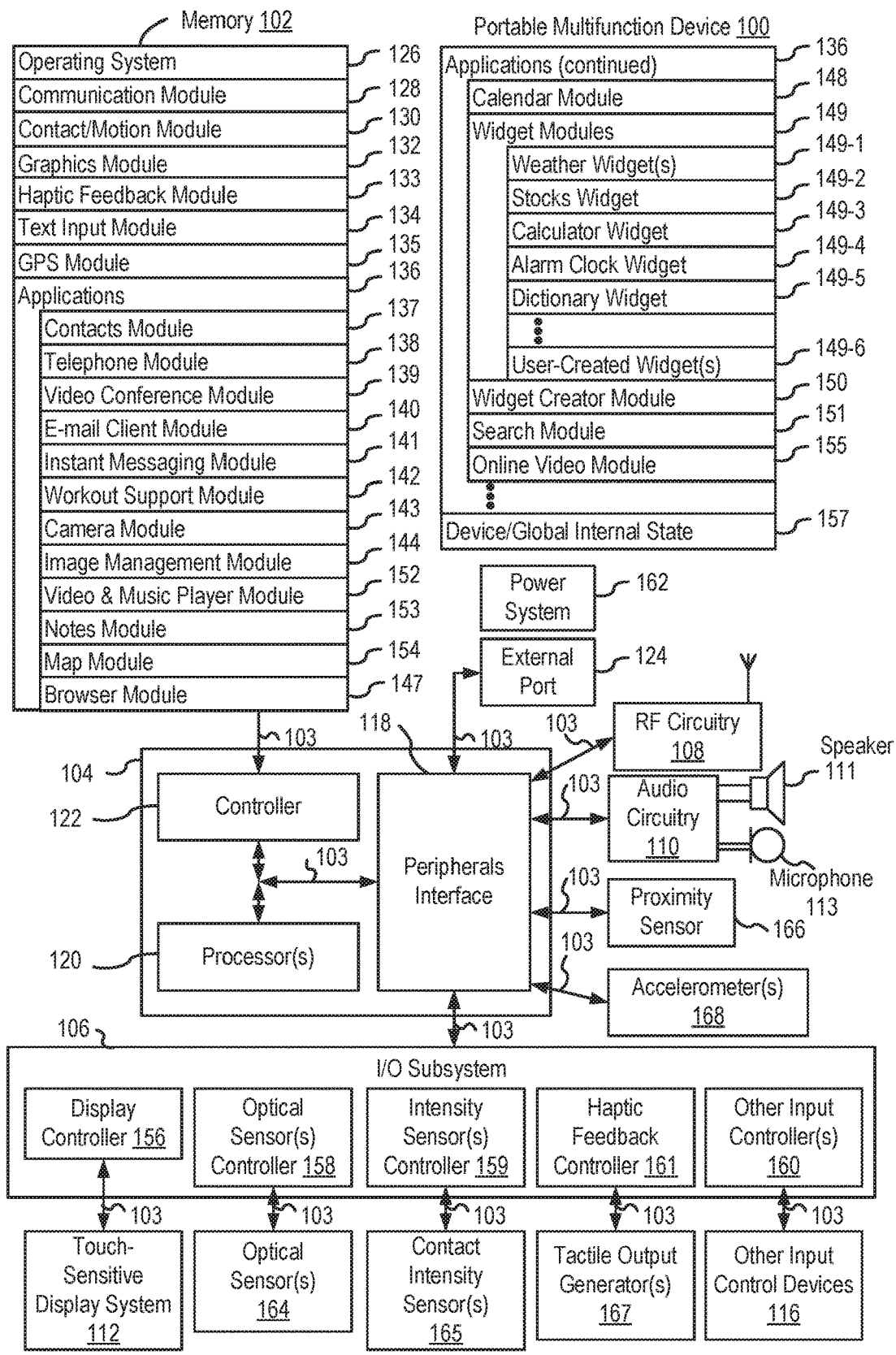
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for sharing application output. For example, video game broadcasts and replays are an increasingly popular form of entertainment. Such techniques can reduce the cognitive burden on a user who shares application visual output, thereby enhancing productivity. Further, such techniques can reduce processor and battery power otherwise wasted on redundant user inputs.

Below, FIGS. 1A-1B, 2, 3, 4A-4C, and 5A-5B provide a description of exemplary devices for performing the techniques for managing event notifications. FIGS. 6B-6K illustrate exemplary user interfaces for sharing application visual output. FIG. 7 is a flow diagram illustrating methods of sharing application visual output in accordance with some embodiments. The user interfaces in FIGS. 6B-6K are used to illustrate the processes described below, including the processes in FIG. 7.

FIGS. 9A-9F illustrate exemplary user interfaces for sharing application visual output. FIGS. 10A-10B is a flow diagram illustrating methods of sharing application visual output in accordance with some embodiments. The user interfaces in FIGS. 9A-9F are used to illustrate the processes described below, including the processes in FIGS. 10A-10B.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 200600B17692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
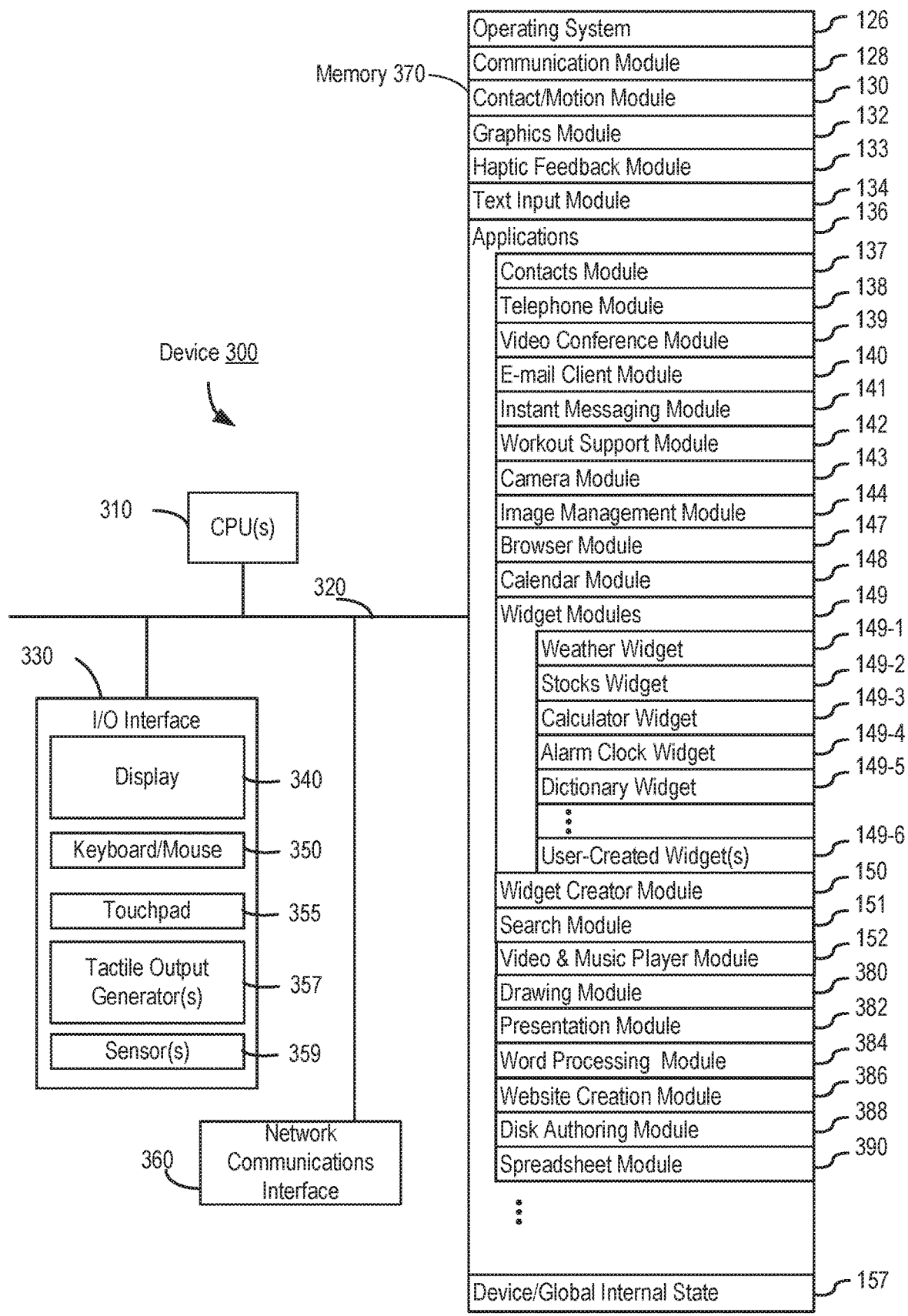
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts).

Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:
  Contacts module 137 (sometimes called an address book or contact list);
  Telephone module 138;
  Video conference module 139;
  E-mail client module 140;
  Instant messaging (IM) module 141;
  Workout support module 142;
  Camera module 143 for still and/or video images;
  Image management module 144;
  Video player module;
  Music player module;
  Browser module 147;
  Calendar module 148;
  Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
  Widget creator module 150 for making user-created widgets 149-6;
  Search module 151;
  Video and music player module 152, which merges video player module and music player module;
  Notes module 153;
  Map module 154; and/or
  Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
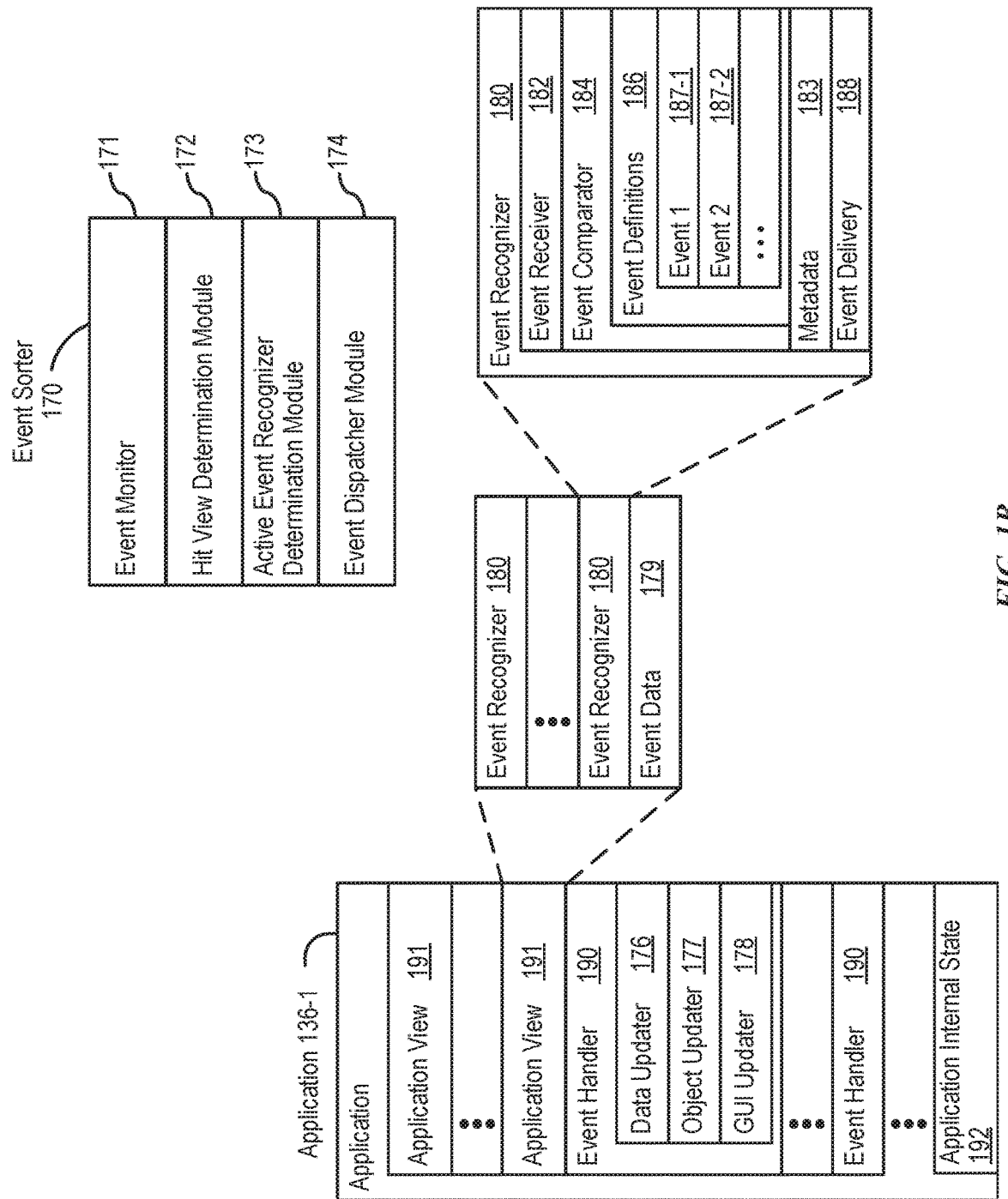
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
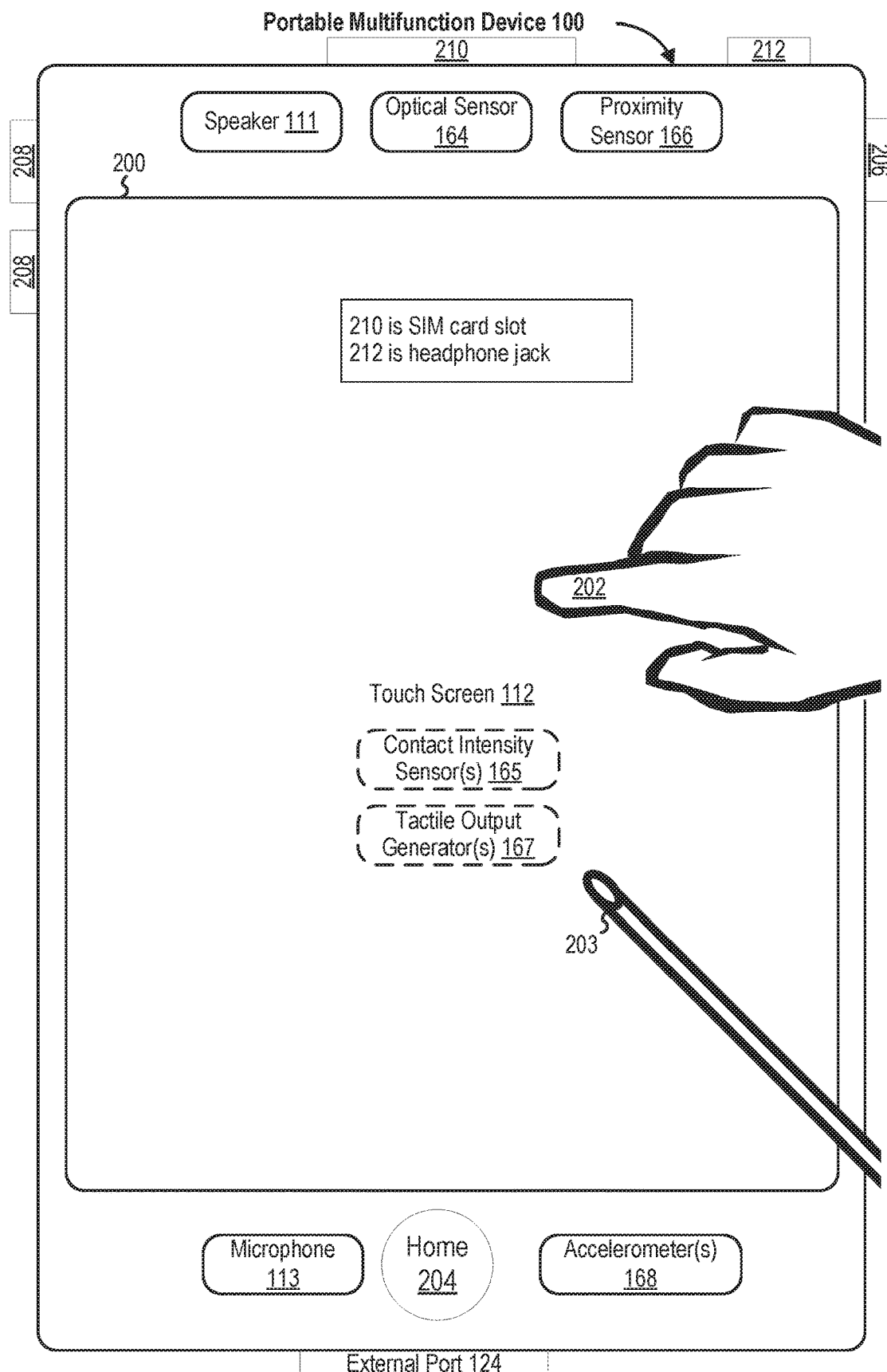
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
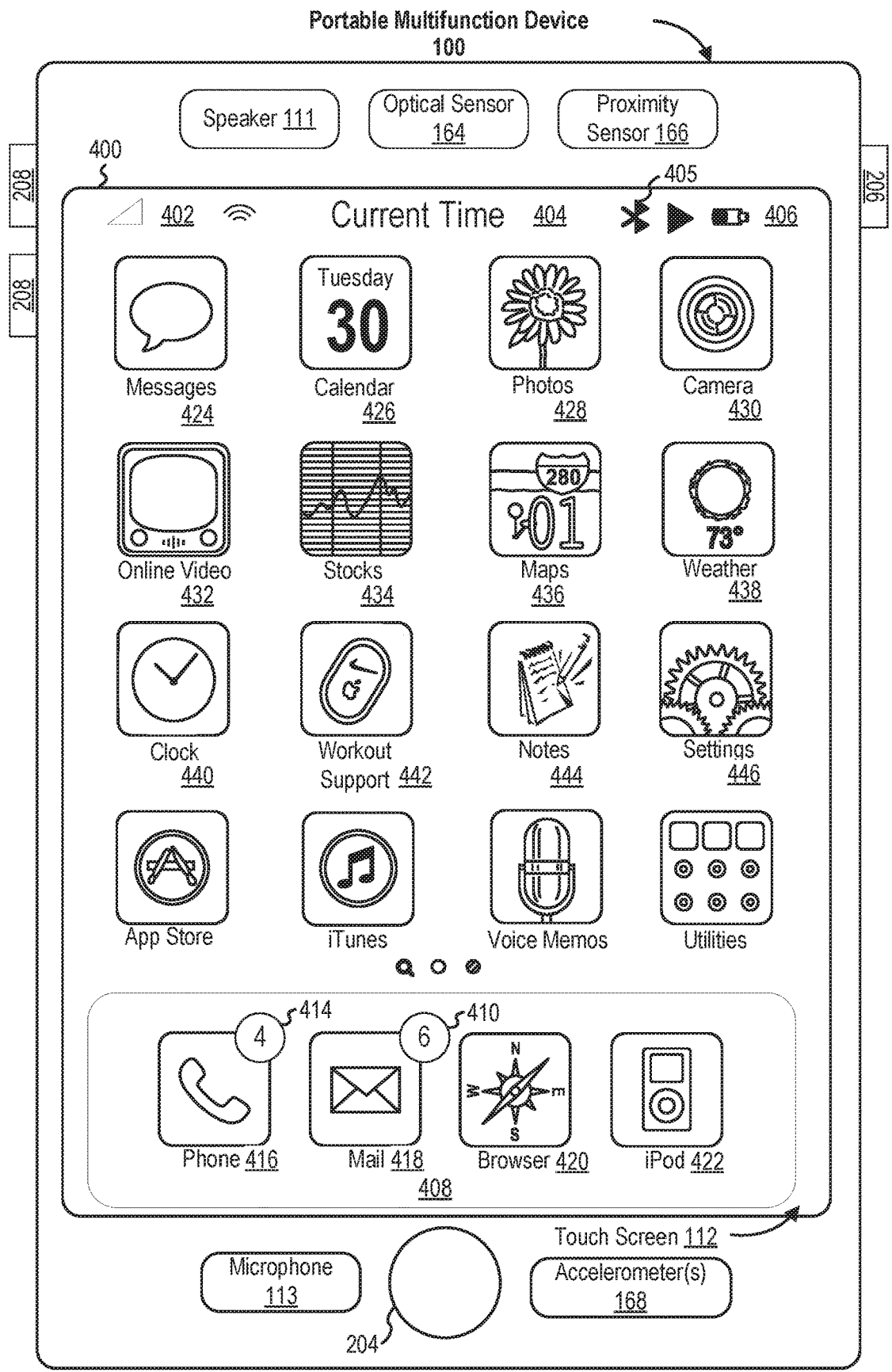
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;

Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 are labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
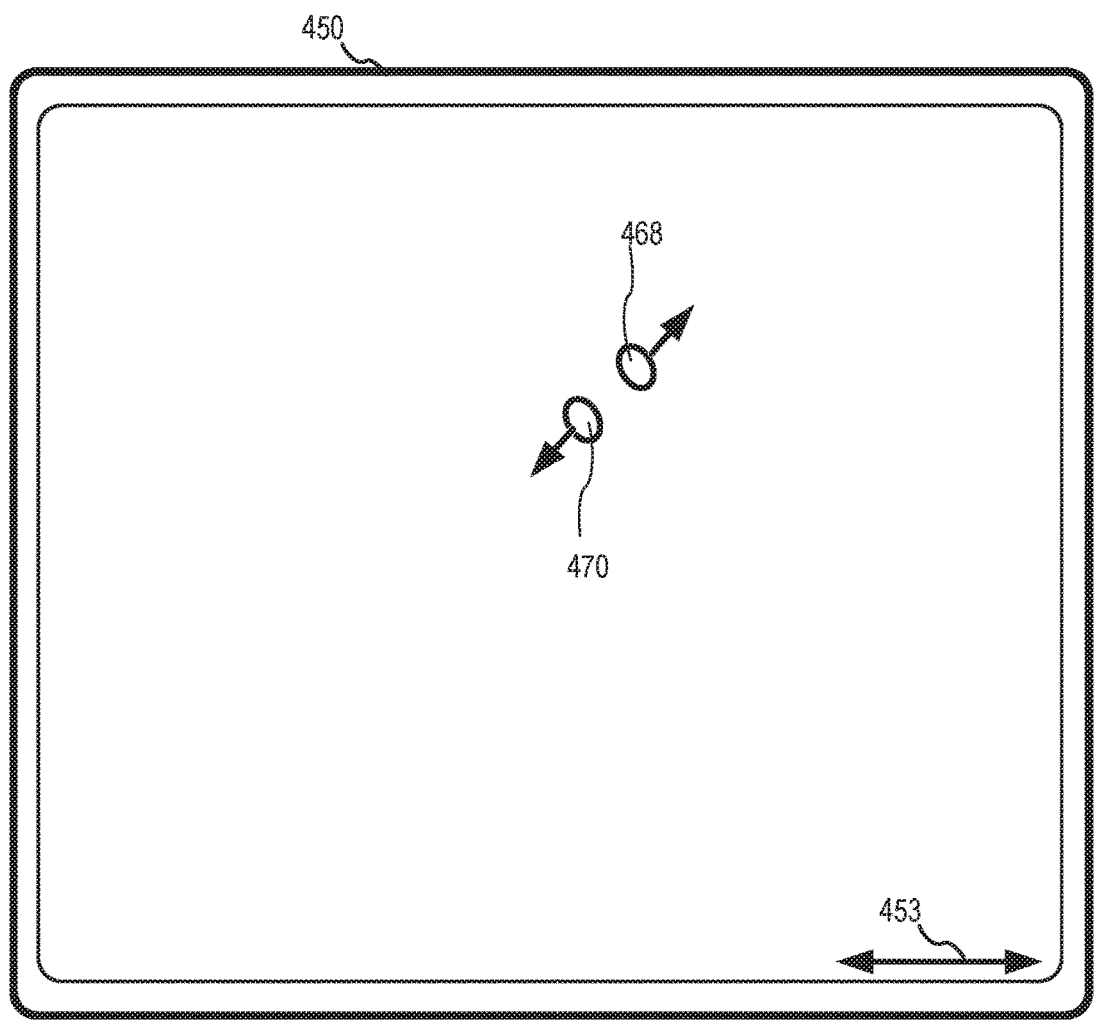
FIG. 4B illustrates an exemplary user interface for a multifunction device with a touch-sensitive surface that is separate from the display in accordance with some embodiments.
Figure 4B:
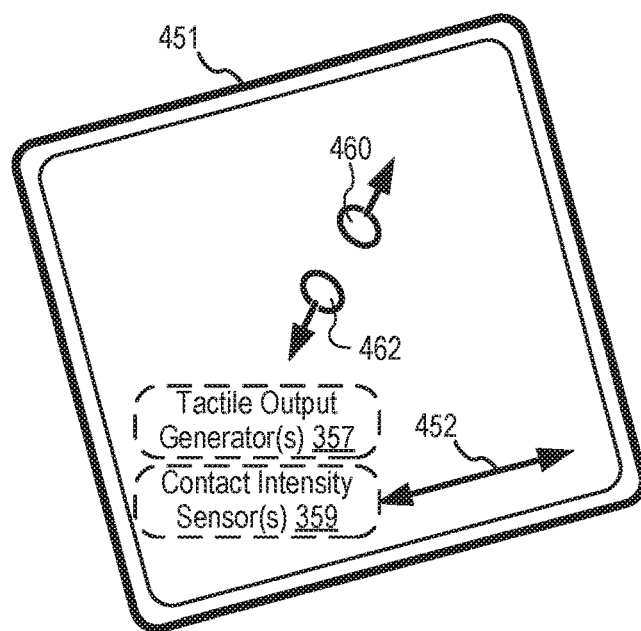

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Figure 4C:
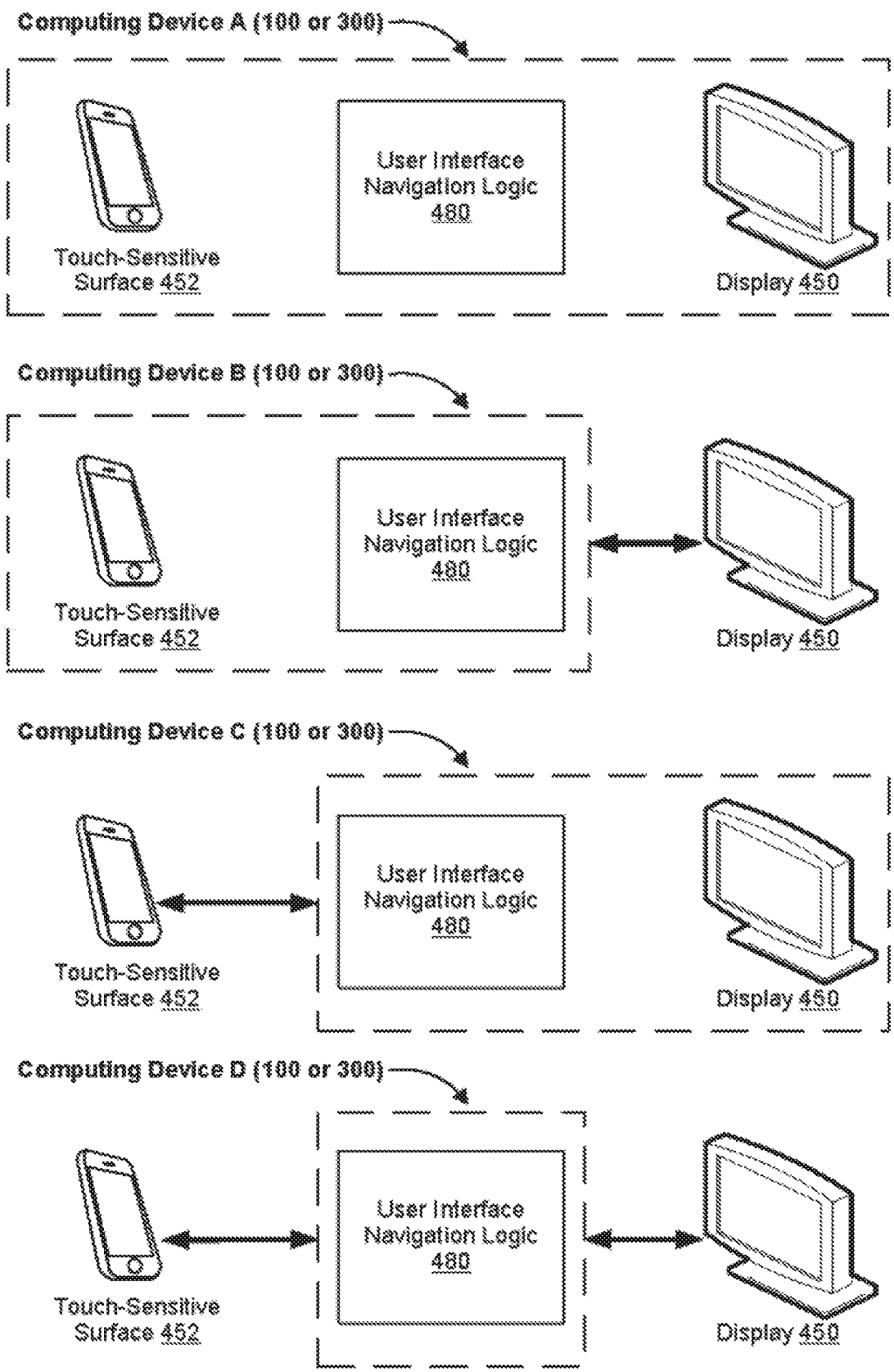
FIG. 4C illustrates exemplary electronic devices that are in communication with a display and touch-sensitive surface where, for at least a subset of the electronic devices the display and/or touch-sensitive surface is integrated into the electronic device in accordance with some embodiments.

FIG. 4C illustrates exemplary electronic devices that are in communication with a display 450 and touch-sensitive surface 452. For at least a subset of the computing devices, the display 450 and/or the touch-sensitive surface 452 is integrated into the computing device in accordance with some embodiments. While the examples described in greater detail below are described with reference to a touch-sensitive surface 451 and a display 450 that are in communication with a computing device (e.g., portable multifunction device 100 in FIGS. 1A-1B or device 300 in FIG. 3), it should be understood that in accordance with some embodiments, the touch-sensitive surface and/or the display are integrated with the computing device, while in other embodiments one or more of the touch-sensitive surface and the display are separate from the computing device. Additionally, in some embodiments the computing device has an integrated display and/or an integrated touch-sensitive surface and is in communication with one or more additional displays and/or touch-sensitive surfaces that are separate from the computing device.

In some embodiments, all of the operations described below with reference to FIGS. 6B-6K and 9A-9F are performed on a single computing device with user interface navigation logic 480 (e.g., Computing Device A described below with reference to FIG. 4C). However, it should be understood that frequently multiple different computing devices are linked together to perform the operations described below with reference to 6B-6K and 9A-9F (e.g., a computing device with user interface navigation logic 480 communicates with a separate computing device with a display 450 and/or a separate computing device with a touch-sensitive surface 451). In any of these embodiments, the computing device that is described below with reference to 6B-6K and 9A-9F is the computing device (or devices) that contain(s) the user interface navigation logic 480. Additionally, it should be understood that the user interface navigation logic 480 could be divided between a plurality of distinct modules or computing devices in various embodiments; however, for the purposes of the description herein, the user interface navigation logic 480 will be primarily referred to as residing in a single computing device so as not to unnecessarily obscure other aspects of the embodiments.

In some embodiments, the user interface navigation logic 480 includes one or more modules (e.g., one or more event handlers 190, including one or more object updaters 177 and one or more GUI updaters 178 as described in greater detail above with reference to FIG. 1B) that receive interpreted inputs and, in response to these interpreted inputs, generate instructions for updating a graphical user interface in accordance with the interpreted inputs which are subsequently used to update the graphical user interface on a display. In some embodiments, an interpreted input for an input that has been detected (e.g., by a contact motion module 130 in FIGS. 1A and 3), recognized (e.g., by an event recognizer 180 in FIG. 1B) and/or distributed (e.g., by event sorter 170 in FIG. 1B) is used to update the graphical user interface on the display. In some embodiments, the interpreted inputs are generated by modules at the computing device (e.g., the computing device receives raw contact input data so as to identify gestures from the raw contact input data). In some embodiments, some or all of the interpreted inputs are received by the computing device as interpreted inputs (e.g., a computing device that includes the touch-sensitive surface 451 processes raw contact input data so as to identify gestures from the raw contact input data and sends information indicative of the gestures to the computing device that includes the user interface navigation logic 480).

In some embodiments, both the display 450 and the touch-sensitive surface 451 are integrated with the computing device (e.g., Computing Device A in FIG. 4C) that contains the user interface navigation logic 480. For example, the computing device is optionally a desktop computer or laptop computer with an integrated display (e.g., 340 in FIG. 3) and touchpad (e.g., 355 in FIG. 3). In another example, the computing device is a portable multifunction device 100 (e.g., a smartphone, PDA, tablet computer, etc.) with a touch screen (e.g., 112 in FIG. 2).

In some embodiments, the touch-sensitive surface 451 is integrated with the computing device while the display 450 is not integrated with the computing device (e.g., Computing Device B in FIG. 4C) that contains the user interface navigation logic 480. For example, the computing device optionally is device 300 (e.g., a desktop computer or laptop computer) with an integrated touchpad (e.g., 355 in FIG. 3) connected (via wired or wireless connection) to a separate display (e.g., a computer monitor, television, etc.). As another example, the computing device optionally is a portable multifunction device 100 (e.g., a smartphone, PDA, tablet computer, etc.) with a touch screen (e.g., 112 in FIG. 2) connected (via wired or wireless connection) to a separate display (e.g., a computer monitor, television, etc.).

In some embodiments, the display 450 is integrated with the computing device while the touch-sensitive surface 451 is not integrated with the computing device (e.g., Computing Device C in FIG. 4C) that contains the user interface navigation logic 480. For example, the computing device optionally is device 300 (e.g., a desktop computer, laptop computer, television with integrated set-top box) with an integrated display (e.g., 340 in FIG. 3) connected (via wired or wireless connection) to a separate touch-sensitive surface (e.g., a remote touchpad, a portable multifunction device, etc.). In another example, the computing device is a portable multifunction device 100 (e.g., a smartphone, PDA, tablet computer, etc.) with a touch screen (e.g., 112 in FIG. 2) connected (via wired or wireless connection) to a separate touch-sensitive surface (e.g., a remote touchpad, another portable multifunction device with a touch screen serving as a remote touchpad, etc.).

In some embodiments, neither the display 450 nor the touch-sensitive surface 451 is integrated with the computing device (e.g., Computing Device D in FIG. 4C) that contains the user interface navigation logic 480. For example, the computing device optionally is stand-alone computing device 300 (e.g., a desktop computer, laptop computer, console, set-top box, etc.) connected (via wired or wireless connection) to a separate touch-sensitive surface (e.g., a remote touchpad, a portable multifunction device, etc.) and a separate display (e.g., a computer monitor, television, etc.). Ins another example, the computing device is a portable multifunction device 100 (e.g., a smartphone, PDA, tablet computer, etc.) with a touch screen (e.g., 112 in FIG. 2) connected (via wired or wireless connection) to a separate touch-sensitive surface (e.g., a remote touchpad, another portable multifunction device with a touch screen serving as a remote touchpad, etc.).

In some embodiments, the computing device has an integrated audio system. In some embodiments, the computing device is in communication with an audio system that is separate from the computing device. In some embodiments, the audio system (e.g., an audio system integrated in a television unit) is integrated with a separate display 450. In some embodiments, the audio system (e.g., a stereo system) is a stand-alone system that is separate from the computing device and the display 450.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
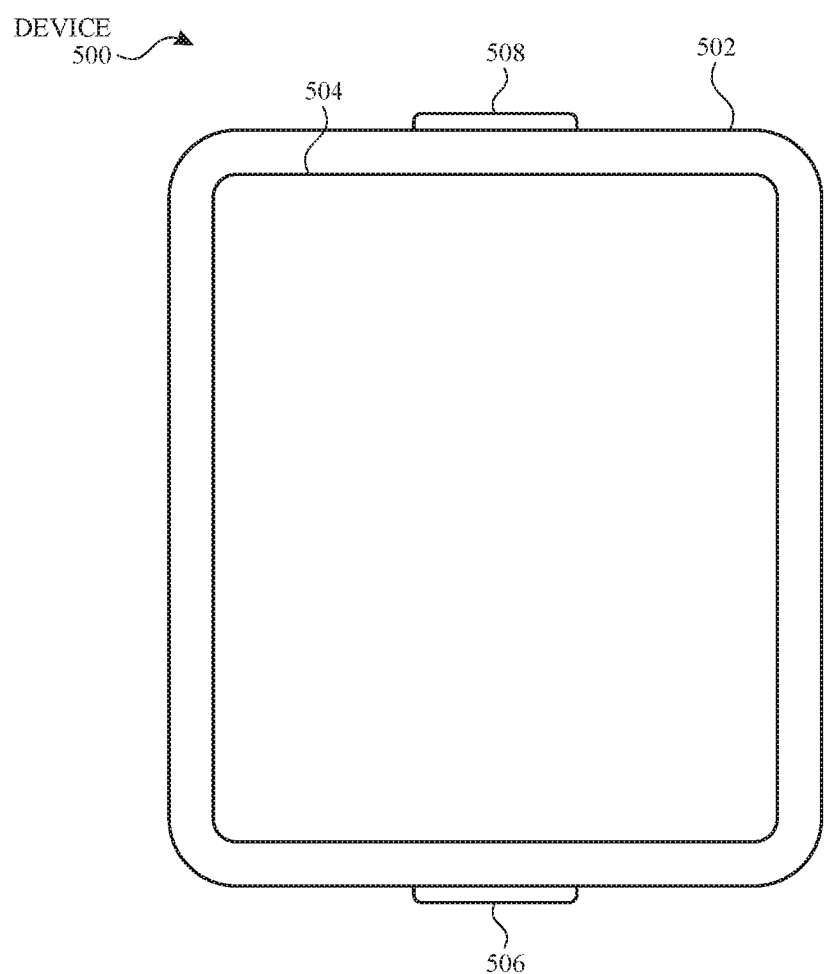
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
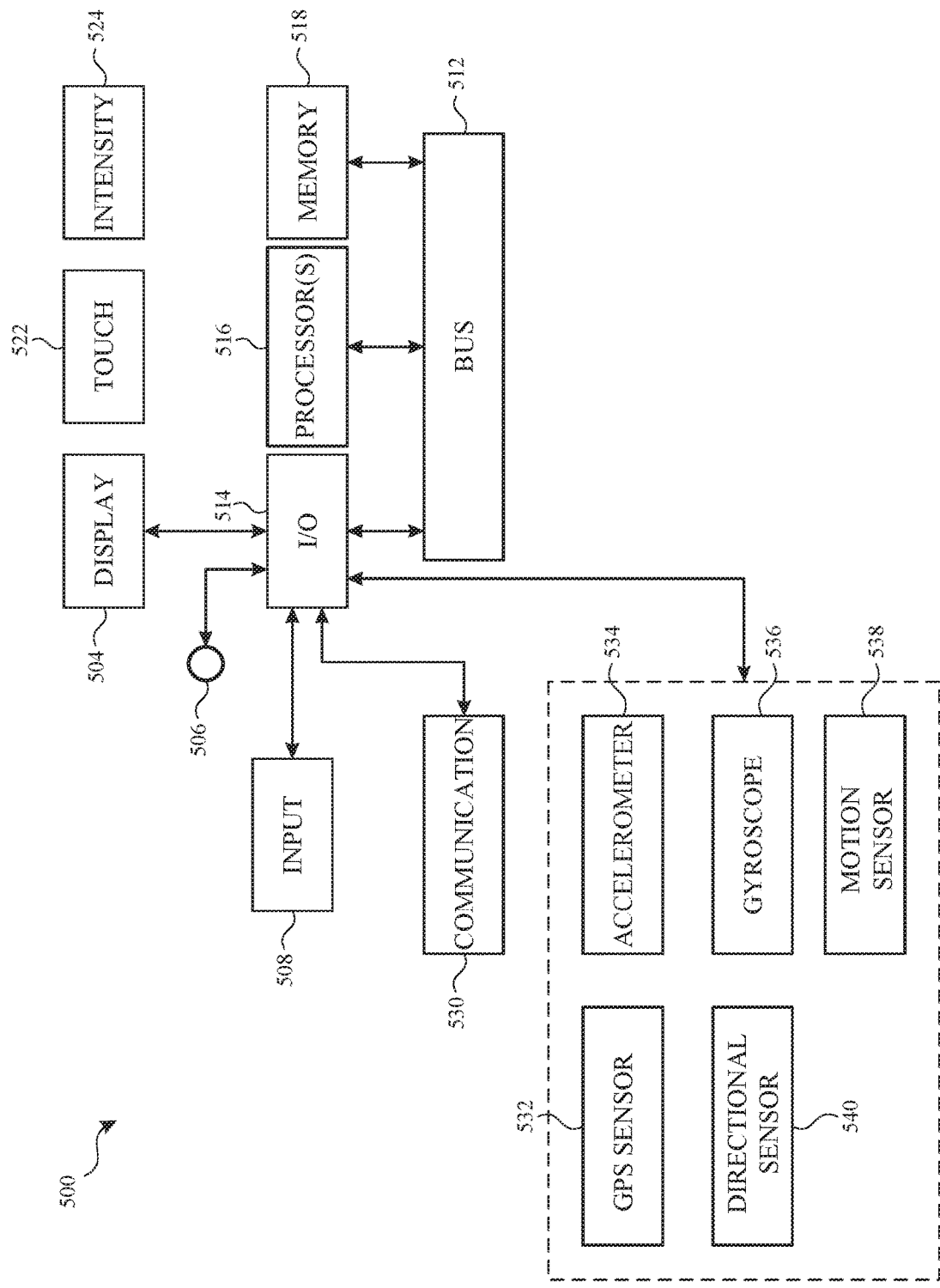
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700 (FIG. 7) and process 1000 (FIGS. 10A-10B). Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1, 3, and 5). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

Attention is now directed towards embodiments of user interfaces ("UI") and associated processes that are implemented on an electronic device, such as portable multifunction device 100, device 300, or device 500.

Attention is now directed towards embodiments of user interfaces ("UI") and associated processes that optionally are implemented with an electronic device that communicates with and/or includes a display and a touch-sensitive surface, such as one of Computing Devices A-D in FIG. 4C or an electronic device, such as portable multifunction device 100, device 300, or device 500.

Figure 6A:
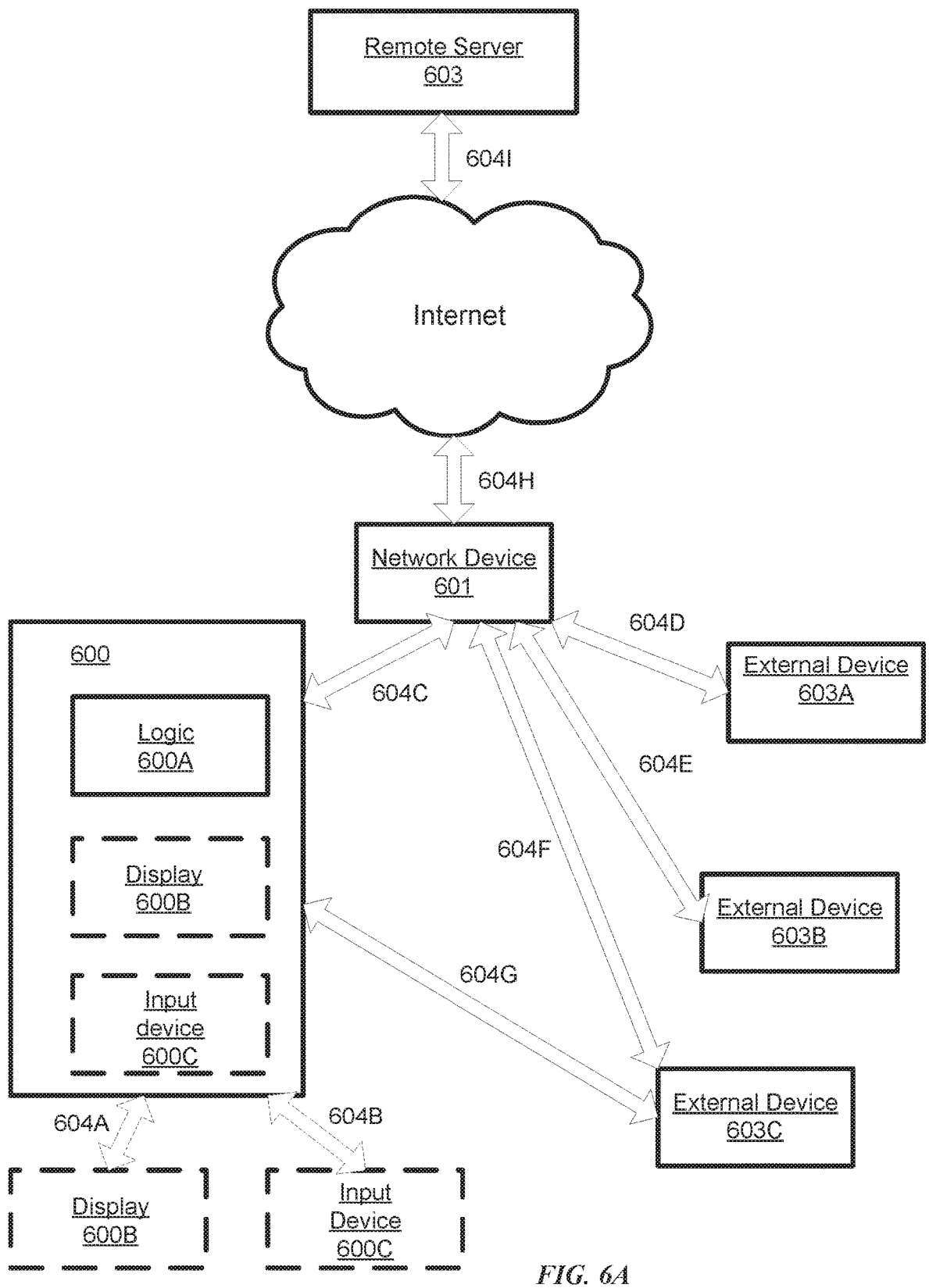
FIG. 6A illustrates exemplary devices connected via one or more communication channels to share application visual output in accordance with some embodiments.

FIG. 6A illustrates exemplary devices connected via one or more communication channels to share application visual output in accordance with some embodiments. Electronic device 600, in some cases, corresponds to any of Computing Devices A-D described with respect to FIG. 4C. Electronic device 600 includes user interface and navigation logic 600A, which, in some cases, corresponds to user interface navigation logic 480 of FIG. 4C. Electronic device 600 also optionally includes display 600B, which, in some cases, corresponds to display 450 of FIG. 4C. If electronic device 600 does not include display 600B, then display 600B is external to electronic device 600 and in communication with electronic device 600 via communications channel 604A. Electronic device 600 also optionally includes user input device 600C, which, in some cases, corresponds to touch-sensitive surface 452 of FIG. 4C. If electronic device 600 does not include input devices 600C, then input device 600C is external to electronic device 600 and in communication with electronic device 600 via communications channel 604B. Electronic device 600 can also include some or all of features of devices 100, 300, or 500.

In some cases electronic device 600 connects to network device 601 via communications channel 604C, which allows for connections to external devices 603A-C via communications channels 604D-F, respectively. In some cases electronic device 600 also directly connects to external device 603C via communications channel 604G. In some cases electronic device 600 also connects to remote server 603 via communications channel 604H, the Internet and communications channel 604I. Communications channels 604A-I are any form of communications channels, such as wired (e.g., Ethernet, USB, Lightning, Fiber) or wireless (e.g., WiFi, Bluetooth, IR) connections.

FIGS. 6B-6K illustrate exemplary user interfaces for navigating through media content in accordance with some embodiments. The user interfaces in these figures are used to illustrate the processes described below, including the processes in FIGS. 7 and 10A-10B. Although some of the examples which follow will be given with reference to inputs on a touch-sensitive surface 451 that is separate from the display 450, in some embodiments, the device detects inputs on a touch-screen display (where the touch-sensitive surface and the display are combined), as shown in FIG. 4A. Although some of the examples which will follow will be given with reference to inputs on a remote user input device (e.g., a remote control) that is separate from the device (e.g., device 600), in some embodiments, the device includes an integrated user input device (e.g., a trackpad).

Figure 6B:
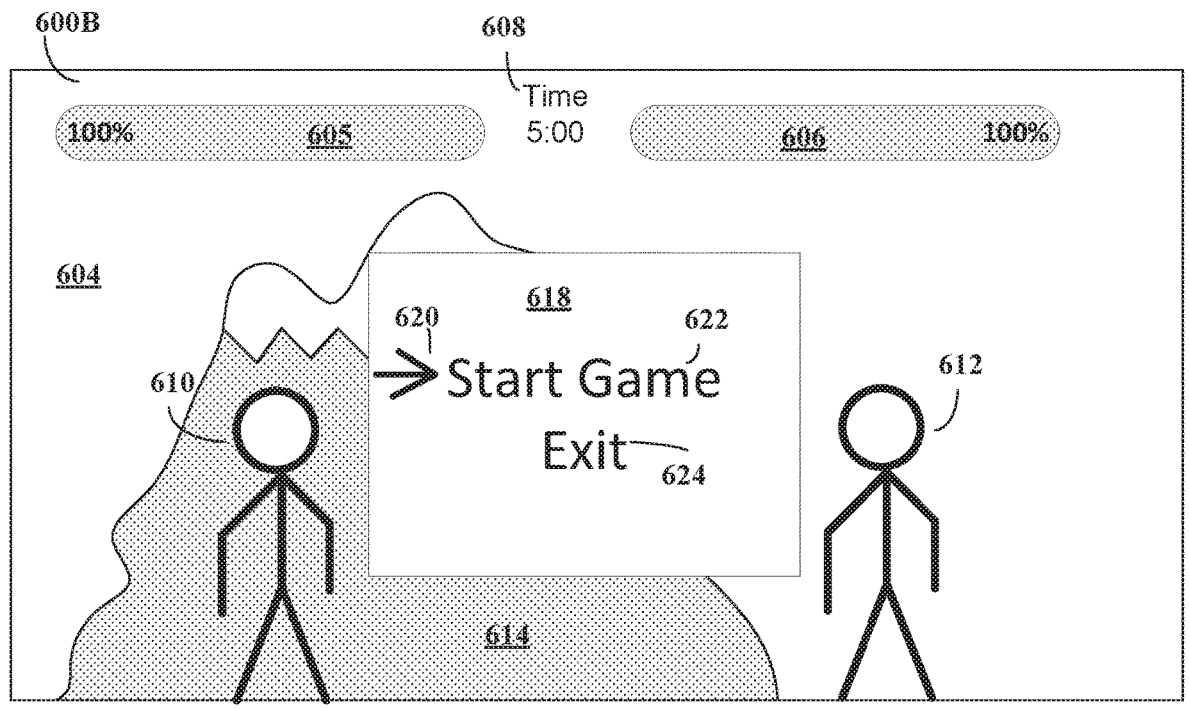
FIGS. 6B-6K illustrate exemplary user interfaces for sharing application visual output, in accordance with some embodiments.
Figure 7:
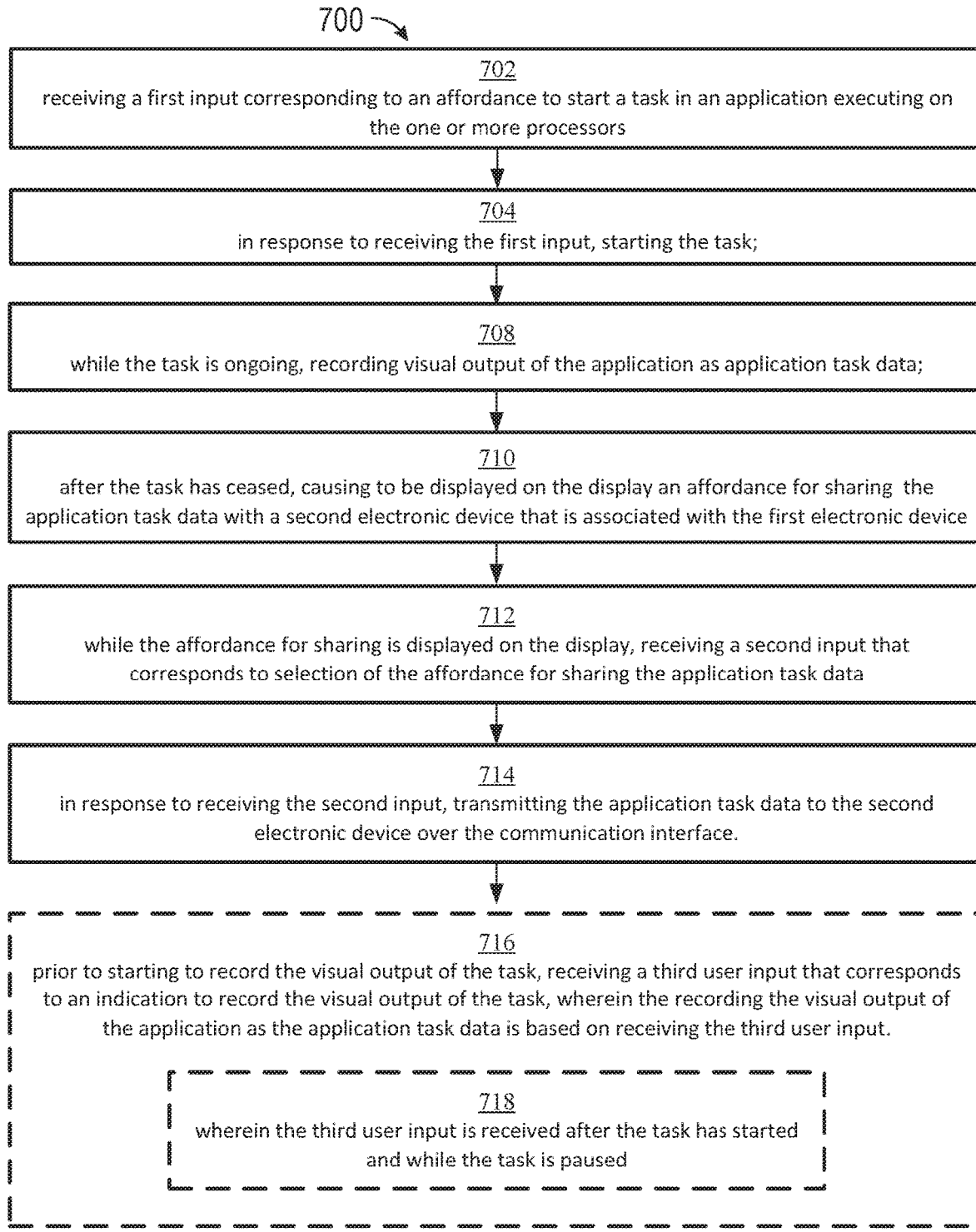
FIG. 7 is a flow diagram illustrating a method for sharing application visual output, in accordance with some embodiments.

FIG. 6B illustrates display 600B of FIG. 6A, which is, in some embodiments, display 450 (FIG. 4C) or the display of device 100, 300, or 500. Electronic device 600 causes display 600B to show visual output 604 of an application running on electronic device 600 in communication with display 600B. The application is a game application. Although some of the embodiments are described with respect to a gaming application, other types of applications could also be used. Visual output 604 includes health meter 605 for player 610 and health meter 606 for player 612. Visual output 604 also includes timer 608 and background image 614. Menu 618 is displayed and includes affordance 622 for starting the game, which can be considered starting a task of the gaming application. Menu 618 also includes affordance 624 for exiting the application. Indicator 620, which is not displayed in some embodiments, aids the user in selecting either of affordances 622 and 624. Menu 618 is an application user interface element as opposed to a system user interface element.

Figure 6C:
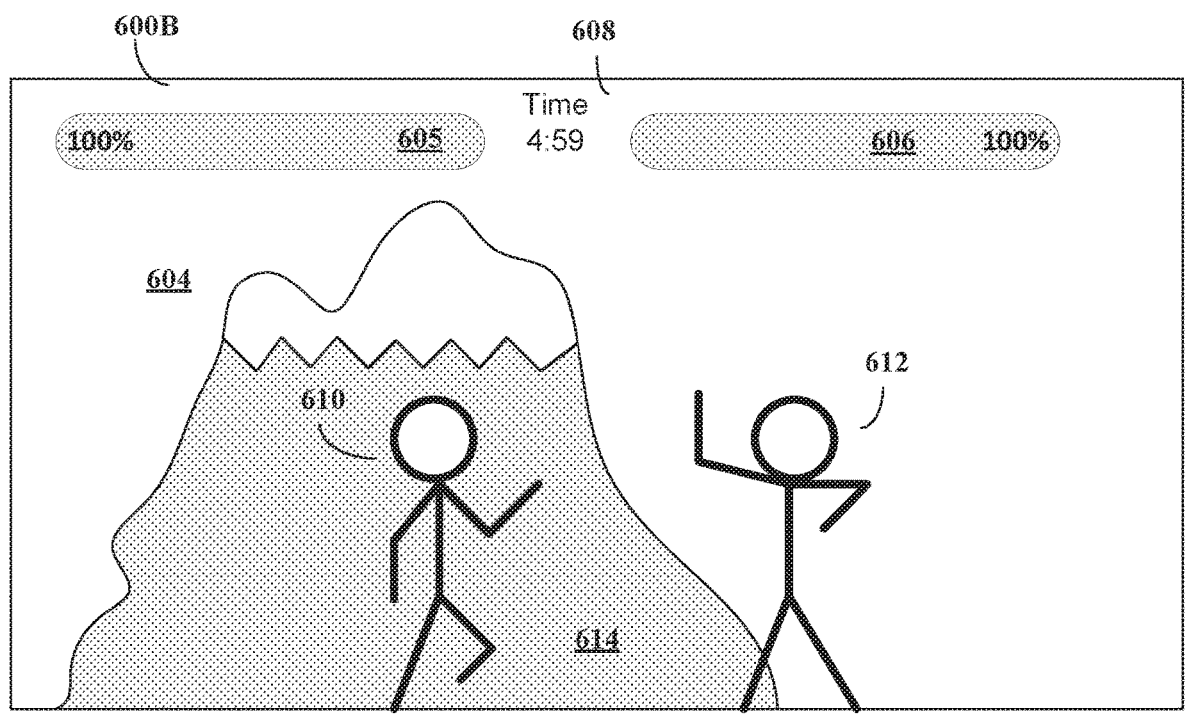

In response to receiving user input selecting affordance 622, electronic device 600 begins the gaming session and updates the visual output of the application to show the progress of the game, as depicted in FIG. 6C. In some embodiments, visual output 604 of the application task is recorded. In some cases, visual output 604 is record for every application task regardless of whether the user requested such a recording. In other cases, visual output 604 is only recorded in response to an express request (e.g., via user input) to do so from the user, as will be descried below.

Figure 6D:
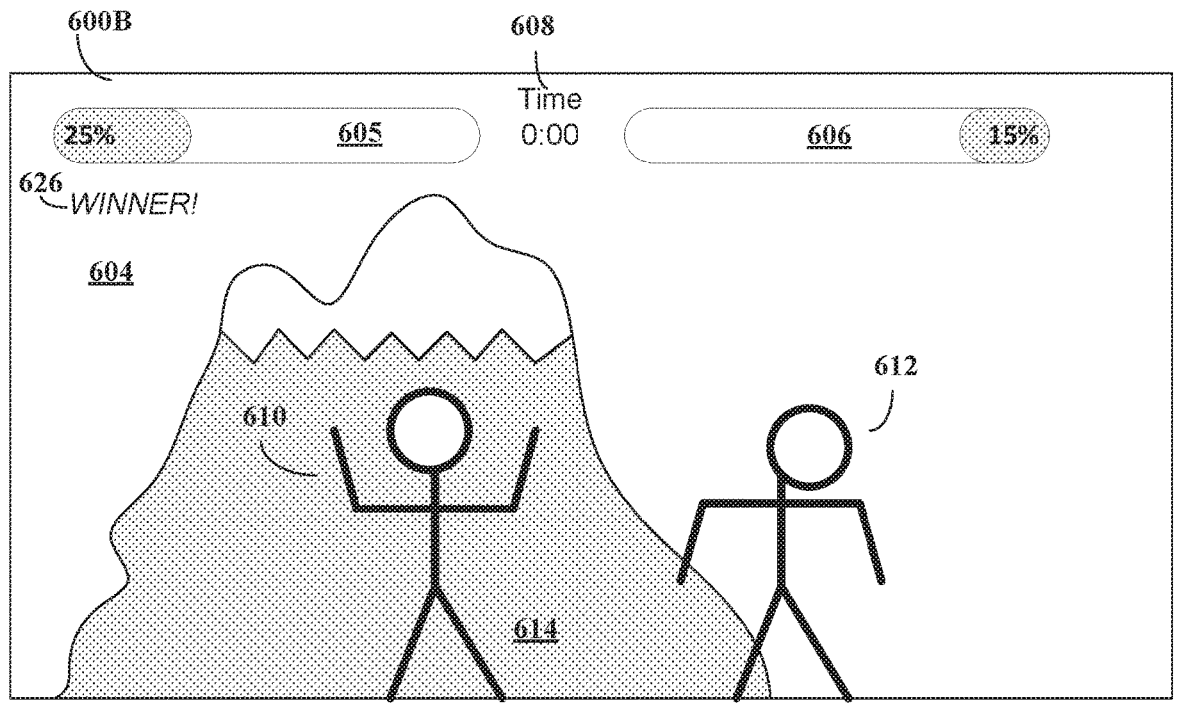

FIG. 6D depicts the game ending based on the time running out as indicated by timer 608. Because health meter 605 has more health than health meter 606, player 610 has won (as indicated by banner 626) and player 612 has lost. Once these results are shown, the application task ends in that an active session of the game is not on going. In some embodiments, in response to the end of the application task, the recording of visual output 604 is stopped.

Figure 6E:
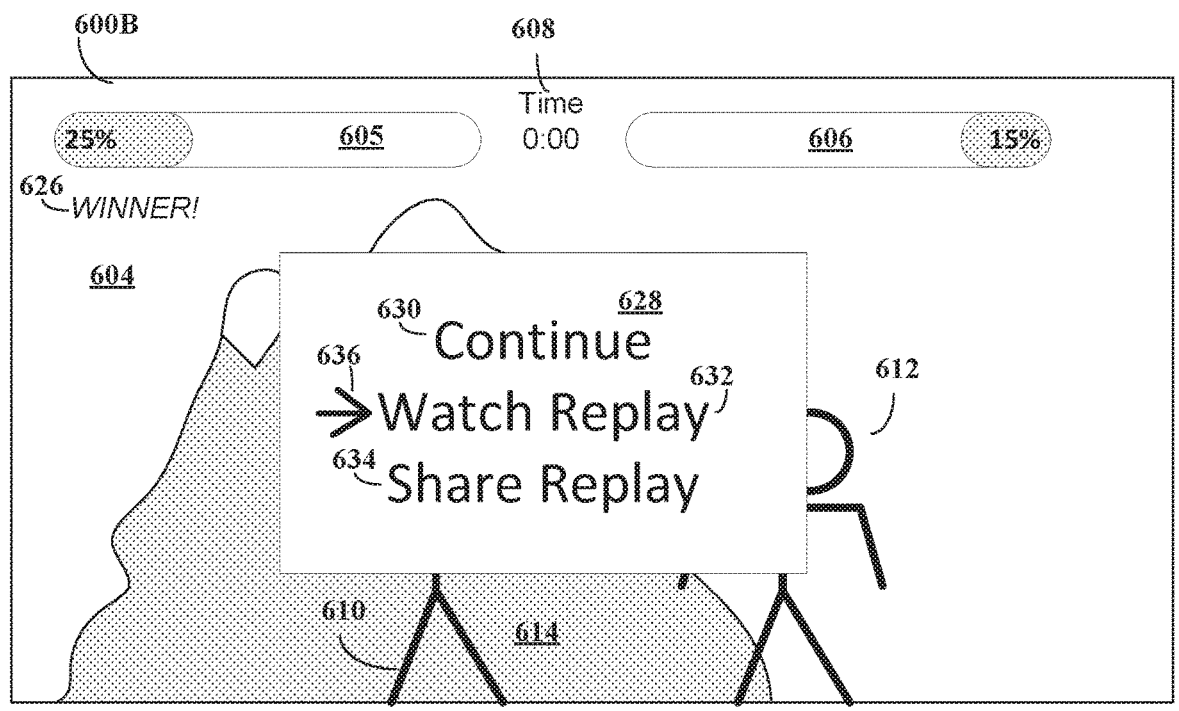

After the application task has ended, FIG. 6E depicts menu 628 being displayed, which includes three affordances. Affordance 630 allows the user to continue the games (for example, returning to the start screen in FIG. 6B). Affordance 632 starts a replay of the recorded visual output of the application task. The replay could be either with the active application or another application could be executed to play the recorded visual output. In some embodiments, the recorded visual output takes various forms (e.g., a video file, commands to recreate the application visual output, or other data sufficient to reproduce the visual output of the application task). Affordance 634 allows the recorded visual output to be shared with another electronic device that is associated with electronic device 600 in communication with display 600B. Indicator 636, which is not present in some embodiments, aides a user to select any of affordances 6630, 632, and 634.

Figure 6F:
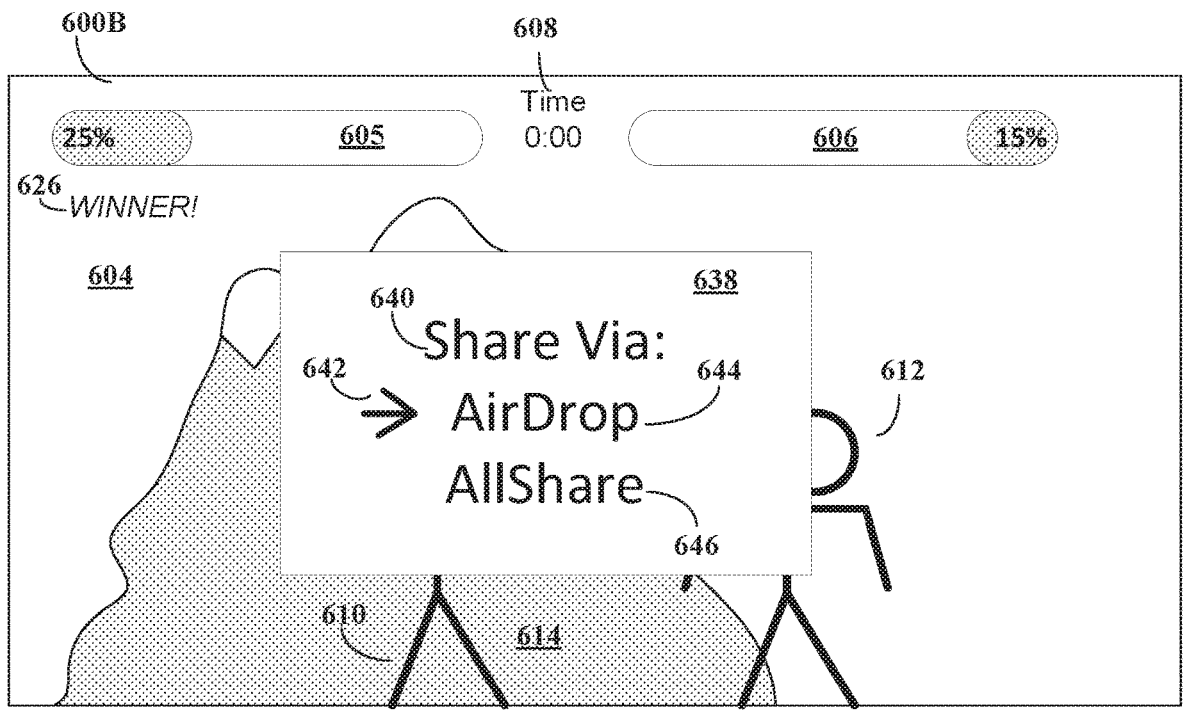

In response to receiving user input selecting affordance 634, electronic device 600 causes menu 638 to be displayed, as depicted in FIG. 6F. Menu 638 includes prompt 640 to selecting a sharing mechanism. Affordance 644 selects AirDrop to share the recorded visual output. Affordance 646 selects AllShare to share the recorded visual output. In some cases, there is only one mechanism to share the recorded visual output data. In this case, menu 638 is skipped. In other cases, there is not an available method for the recorded visual output to be shared. In this case, a menu is displayed prompting the user whether they would like to download/install an application that can share the recorded visual output. The menu can also include an affordance for opening an application store to search for such an application. An example of a similar type of menu is menu 916 of FIG. 9C, described below.

In some cases, menu 638 is displayed by the application based on data it received from the operating system of electronic device 600. In other cases, menu 638 is displayed by the operating system or other system components in response to a request from the application.

Figure 6G:
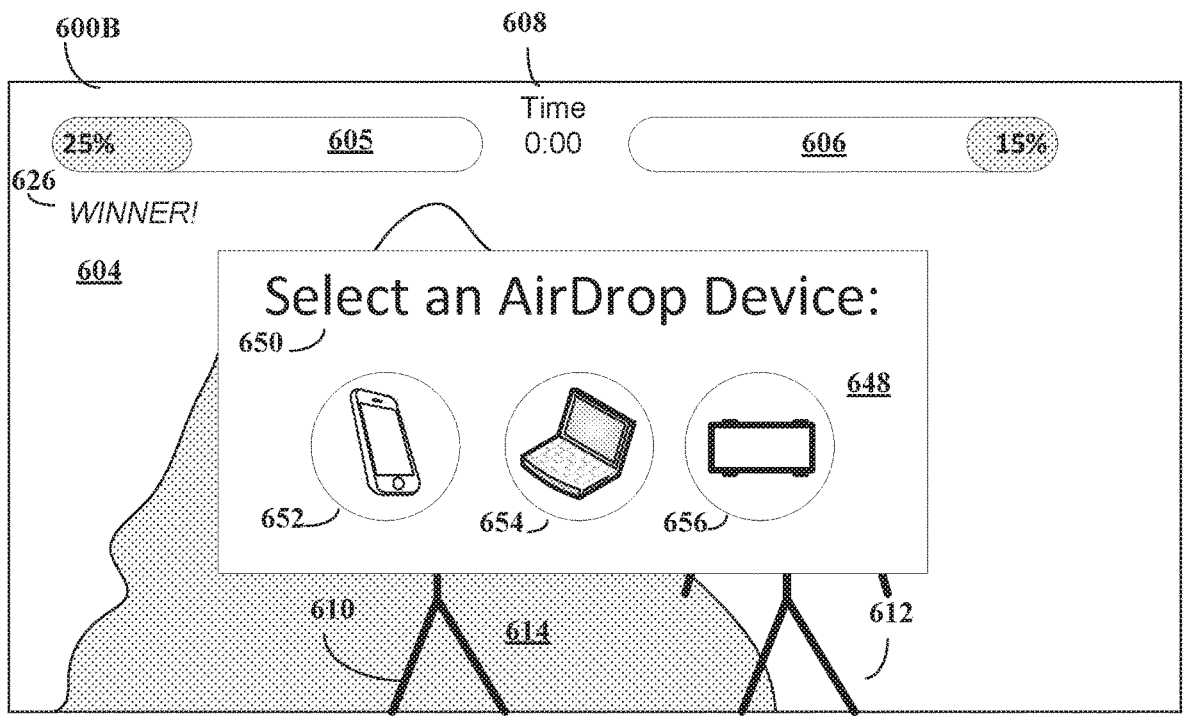

In response to user input selecting affordance 642 (or in the case where AirDrop is the only available way to share), device 600 causes menu 648 to be displayed, as depicted in FIG. 6G. Prompt 650 instructs the user to select affordances 652, 654, or 656 representing externals devices (e.g., external devices 603A-603C of FIG. 6A) with which the users wishes to share the recorded visual output. Affordance 652 represents a smartphone. Affordance 654 represents a laptop computer. Affordance 656 represents another electronics device, such as a tablet computer. In some embodiments, menu 648 is a system user interface element, as opposed to an application user interface element.

External devices 603A-603C corresponding to affordances 652, 654, and 656 are associated with electronic device 600 in some manner. In some embodiments, external devices 603A-603C are all within a threshold proximity of electronic device 600 (e.g., as indicated by Bluetooth communications); external devices 603A-603C are all associated with the user of electronic device 600 (e.g., the user has a common username on electronic device 600 and external devices 603A-603C or the user is signed on to electronic device 600 and external devices 603A-603C); or the devices are all only associated with the user of electronic device 600. In some cases electronic device 600 is associated with multiple users (e.g., electronic device 600 is a shared device such as a set top box that controls a user interface on a television which is a device that individual users do not typically sign on to using their personal communication or social accounts). In some cases external devices 603A-603C listed in menu 648 are used only with a single user (e.g., a device on which the user is signed on to one or more personal communication and social accounts so that the user can share the recorded visual output using the personal communication and/or social accounts).

In some embodiments, it is beneficial to share the recorded visual output with another device because electronic device 600 has limited applications or other means to share the recorded visual output (e.g., limited to sharing data to devices that are in close proximity and associated with the same user that is using electronic device 600) while one or more of external devices 603A-603C, in some embodiments, has many more applications or other means to share the recorded visual output (e.g., email, social networking, websites). In other words, in some cases, external devices 603A-603C in menu 648 have more ways to share the application task data than electronic device 600 that executed the application task. In addition to being able to use the additional resources of external devices 603A-603C listed in menu 648 to further share the recorded visual output, in some embodiments, it is be beneficial to share the recorded visual output with one or more of these devices because electronic device 600 has limited memory (e.g., non-volatile memory), such as 64 GB or less.

In response receiving user input selecting one of the affordances of menu 648, electronic device 600 will transmit the recorded visual output to the selected external device using any number of communications channels, such a WiFi, Bluetooth, or other communications protocols. In some cases, the transmission from electronic device 600 to the selected device (e.g., external device 603C) is direct in that the transmission does not pass through any intermediate servers or networking devices (e.g., via communications channel 604G of FIG. 6A).

Instead of recording visual output of the application automatically in response to the application starting, electronic device 600 can also record visual output of the application in response to a request form the user. For example, with reference to FIG. 6H, menu 658 depicts a pause menu as indicated by label 660. Menu 658 includes affordances 662, 664, 666, and 668. Indicator 670, which is not present in some embodiments, is used to aid the user in selecting an affordance. Affordance 662 causes the current game session to exit and the user to be returned to the home screen (e.g., FIG. 6B). Affordance 674 allows the user to request that the visual output of the game session be recorded. Affordance 666 allows the user to restart the current game session (e.g., from the start of the level). Affordance 668 allows the user to resume the current game session.

In some embodiments, in response to receiving user input selecting affordance 664, electronic device 600 starts (e.g., immediately) to record visual output. In some embodiments, electronic device 600 waits until the current game session is resumed (e.g, unpaused). In some embodiments, the game session resumes automatically in response to the selection of affordance 664. In some embodiments, the game session resumes only in response to the user subsequently providing user input selecting affordance 668. In any of these cases, the visual output of the game session is recorded in accordance with the user input selecting affordance 664.

Figure 6H:
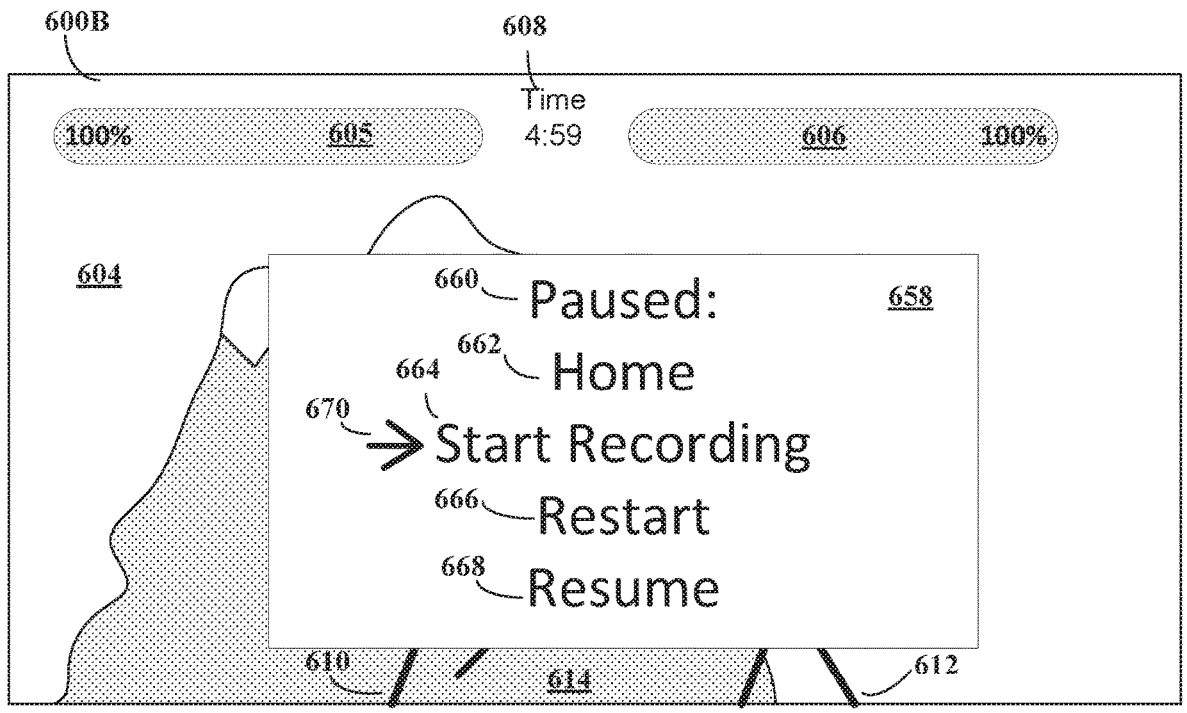
Figure 6I:
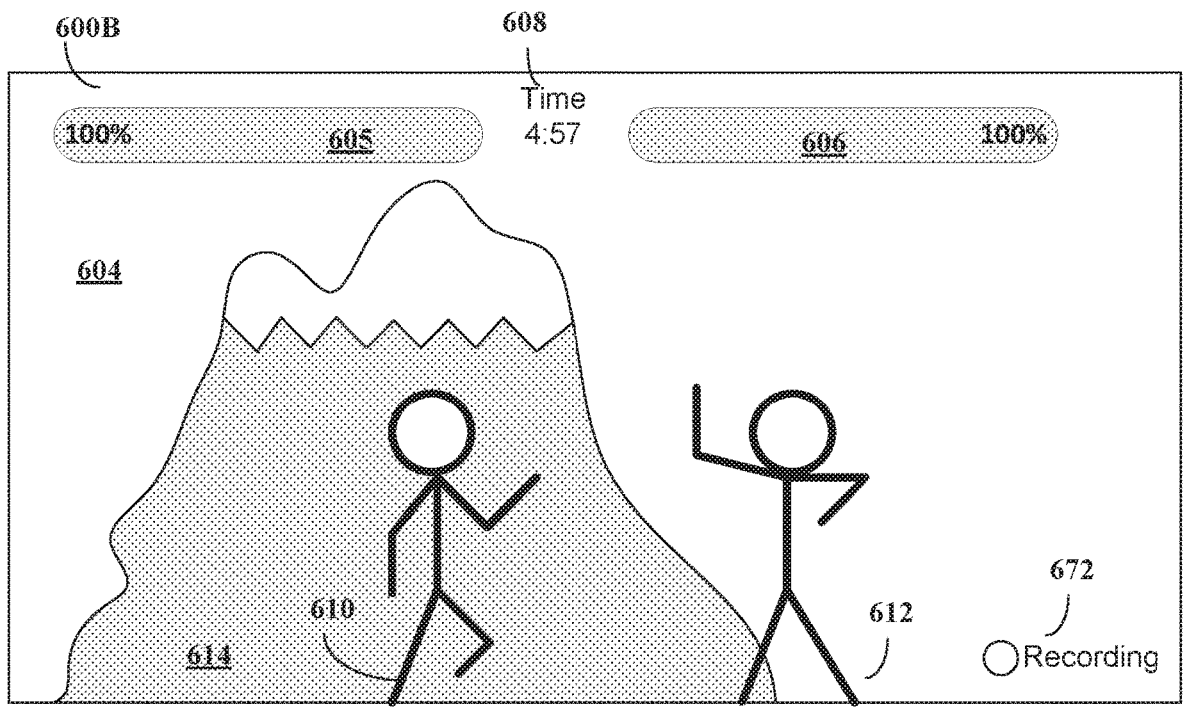

After the game session starts again (i.e., resumes), as depicted in FIG. 6I, indicator 672 is displayed, indicating that the visual output of the game session is being recorded. In some embodiments, the visual output is recorded until the game session is paused again, the game session is paused and the user provided input indicating the recording should be stopped, or the game session terminates (e.g., the level ends, the game is over, or the player dies in a single player game).

Figure 6J:
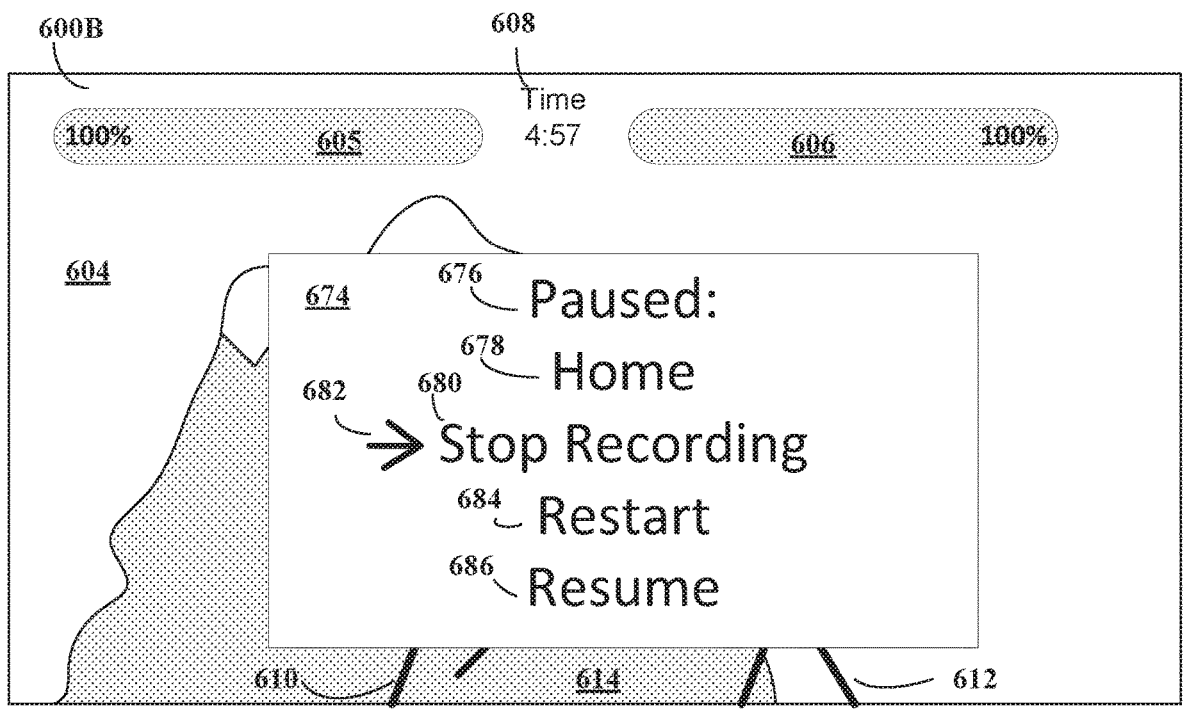
Figure 6K:
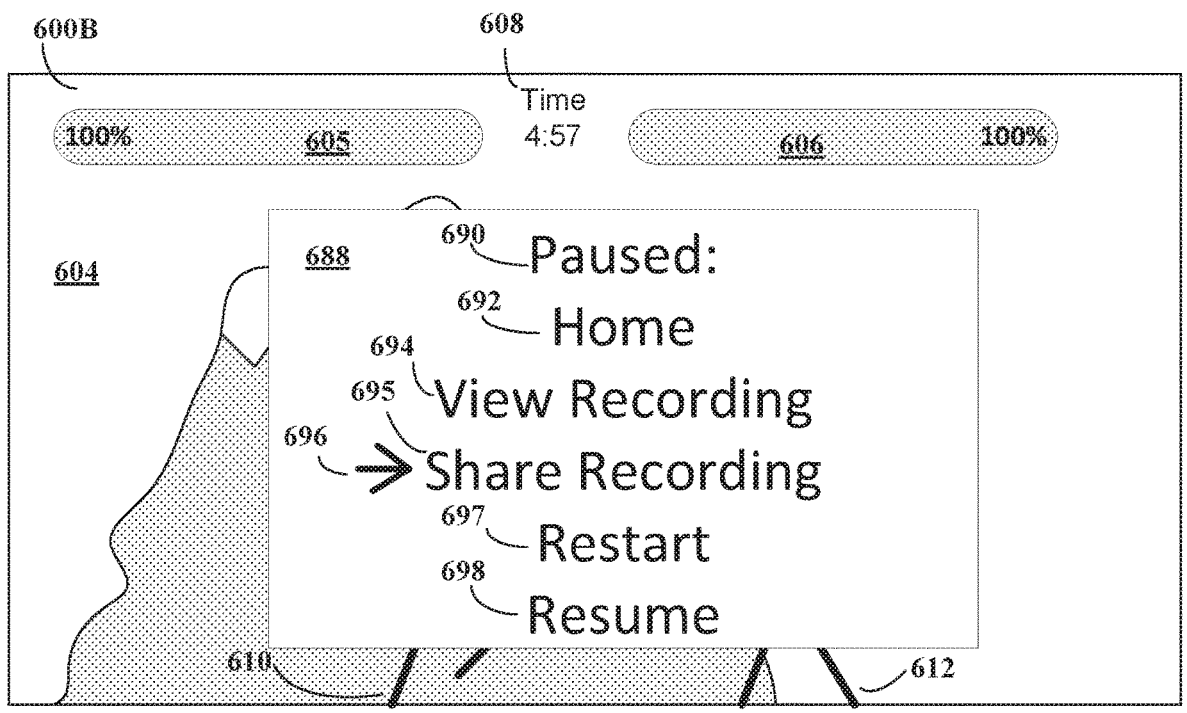

FIG. 6J depicts pause menu 674 after the visual output for the current game session has been set to record. Menu 674 indicates that the game is paused via label 676. Affordances 678, 684, and 686 present similar options as described previously with respect to affordances 662, 666, and 668, respectively, of FIG. 6H. Affordance 680 allows the user to request that the visual output no longer be recorded. Indicator 682 aids in the user's selection of one of the affordances. In response to receiving user input selecting affordance 680, pause menu 688 is displayed, as depicted in 6K. In some embodiments, further in response to receiving user input selecting affordance 680, previously recorded visual output is deleted. Menu 688 is similar to menu 674. Label 690 indicates that the current game session is paused and indicator 696 aids the user in selecting one of the displayed affordances. Affordances 692, 697, and 698 perform similar functions as described previously with respect to affordances 662, 666, and 668, respectively, of FIG. 6H. Affordances 694 and 696 provide for the same functionality as affordances 632 and 634 of FIG. 6E.

FIG. 7 is a flow diagram illustrating a method for sharing application visual output using an electronic device in accordance with some embodiments. Method 700 is performed, for example at electronic device 600. Some operations in method 700 are, optionally, combined, the order of some operations is, optionally, changed, and some operations are, optionally, omitted.

As described below, method 700 provides an intuitive way for sharing application visual output. The method reduces the cognitive burden on a user for sharing application visual output, thereby creating a more efficient human-machine interface. For battery-operated computing devices, enabling a user to share application visual output faster and more efficiently conserves power and increases the time between battery charges.

The first electronic device receives a first input (e.g., affordance selection via remote control or other device connected to the first electronic device) corresponding to an affordance to start a task (e.g., 622, 664, 668) (e.g., starting a game session or resuming a game session from the pause screen) in an application (e.g., a game application depicted in FIGS. 6B-6K) executing on the one or more processors. In response to the electronic device receiving the first input, the electronic device starts the task (e.g., a session of the game). While the task is ongoing, the first electronic device records visual output of the application as application task data (e.g., a video file). After the task has ceased, the first electronic device causes to be displayed on the display an affordance for sharing (e.g., 634, 644, 646, 695) (e.g., AirDrop sharing or a sharing application) the application task data with a second electronic device (e.g., a phone, tablet, or computer) that is associated with the first electronic device (e.g., the second electronic device has the same user or is in close proximity to the first electronic device). While the affordance for sharing (e.g., 634, 644, 646, 695) is displayed on the display, the first electronic device receives a second input that corresponds to selection of the affordance for sharing the application task data. In response to the first electronic device receiving the second input, the first electronic device transmits the application task data to the second electronic device (e.g., one of 603A-603C) over the communication interface. The above permits a user to control when application visual output is shared form within the application that is generating the output. This makes it more efficient and easier for the user to share content. By integrating the recording and sharing controls into the application, the user does not need to access or switch other applications.

In accordance with some embodiments, the third user input is received before the task starts (e.g., an affordance to turn on recording is displayed at a start screen of the task).

In accordance with some embodiments, the third user input is received after the task has started and while the task is paused (e.g., FIG. 6H).

In accordance with some embodiments, the application is a game application (e.g., the game application depicted in FIGS. 6B-6K).

In accordance with some embodiments, the application task is a game session (e.g., the game session depicted in FIGS. 6B-6E).

In accordance with some embodiments, prior to the first electronic device starting to record the visual output of the task, the first electronic device receives a third user input that corresponds to an indication to record the visual output of the task (e.g., 664), wherein the first electronic device recording the visual output of the application as the application task data is based on (e.g., in response to) receiving the third user input.

In accordance with some embodiments, the first electronic device receives a fourth user input that corresponds to selection of an affordance to request the recording of the visual output of the task to stop (e.g., 680). After the first electronic device receives the fourth user input, the first electronic device ceases the recording of the visual output of the task while the task is executing (and, optionally deleting previously recorded visual output of the task).

In accordance with some embodiments, the first electronic device receives the fourth user input while the task is paused (e.g., FIG. 6J).

In accordance with some embodiments, the first electronic device causing display of the affordance for sharing occurs in response to the cessation of the task (e.g., when the user has requested an end of the task by pausing or quitting a game, or when the task has ended automatically such as when the user loses a game or successfully completes a level). This simplifies the man-machine interface by automatically presenting an option to share the application task data in response to the task ending instead of having to switch applications to share the application task data.

In accordance with some embodiments, after the task has ceased, the first electronic device causes display of an affordance (e.g., 634) for providing an option to share the application task data on the display. The first electronic device receives fifth user input selecting the affordance for providing an option to share the application task data, wherein the display of the affordance for sharing (e.g., 644, 646, 652, 654, 656) occurs in response to receiving the fifth user input.

In accordance with some embodiments, the first electronic device detects the cessation of the task (e.g., the task is paused or terminated). In response to detecting the cessation of the task, the first electronic device ceases to record the visual output.

In accordance with some embodiments, the first electronic device detects the cessation of the task (e.g., the task is paused or terminated). In response to detecting the cessation of the task, the first electronic device causes display of an affordance (e.g., 632, 694) for viewing the application task data (e.g., providing the user with an option to review the video recording of the game when the game is paused, after successful completion of a level, and/or after losing the game). In response to the first electronic device receiving user input selecting the affordance for playing the application task data (e.g., 632, 694), the first electronic device causes display of the application task data.

In accordance with some embodiments, the second electronic device is a first external device (e.g., one of 603A-603C) of a plurality of external devices (e.g., 603A-603C). After the first electronic device receives the second user input selecting the affordance for sharing, the first electronic device causes display of one or more affordances (e.g., 652, 654, 656) associated the plurality of external devices (e.g., 603A-603C). The first electronic device receives sixth user input selecting an affordance corresponding to the first external device (e.g., one of 603A-603C). In response to the first electronic device receiving the sixth user input, the first electronic device designates the first external device as recipient of the transmission of the application task data.

In accordance with some embodiments, the one or more external devices (e.g., 603A-603C) are determined based on a proximity to the first electronic device.

In accordance with some embodiments, the second electronic device is associated with a user of the first electronic device (e.g., the first electronic device and the second electronic device are both associated or signed on with a same user account of a content synchronization or purchase sharing service such as a personal or family iCloud account).

In accordance with some embodiments, wherein the second electronic device is associated with only a user (e.g., an iPhone that only has a single user) of the first electronic device.

In accordance with some embodiments, the first electronic device is associated with multiple users (e.g., the first electronic device is a shared device such as a set top box that controls a user interface on a television which is a device that individual users do not typically sign on to their personal communication and social accounts) and the second electronic device is associated with a single user (e.g., a device on which the user is signed on to one or more personal communication and social accounts so that the user can share the recorded video using the personal communication and/or social accounts).

In accordance with some embodiments, the second electronic device is a smartphone or a tablet computer.

In accordance with some embodiments, the memory has a size of 64 GB or less.

In accordance with some embodiments, the application task data is a multimedia file.

In accordance with some embodiments, the application task data is transmitted directly (e.g., without going through intermediate servers or networking devices) to the second electronic device (e.g., 603C via 604G).

In accordance with some embodiments, the first electronic device includes a first set of one or more ways to share the application task data (e.g., FIG. 6F) (e.g., AirDrop, direct transfers) and wherein the second electronic device includes a second set of one or more ways to share the application task data (e.g., web, email, posting) different from the first set of one or more ways. In some examples, the second electronic device has more ways to share the application task data than the first electronic device.

In accordance with some embodiments, the affordance for sharing the application task data (e.g., 644, 646, 652, 654, 656) is a system user interface element and wherein the affordance to start the task (e.g., 622, 664, 668) and the affordance to stop the recording of the visual output (e.g., 680) are application user interface elements (e.g., user interface elements controlled by the application that invoke system protocols for recording the application task data).

In accordance with some embodiments, the second electronic device is configured to enable sharing via a plurality of different sharing services (e.g., email, social networks, video archives).

Note that details of the processes described above with respect to method 700 (e.g., FIG. 7) are also applicable in an analogous manner to the methods described below/above. For example, method 900 optionally includes one or more of the characteristics of the various methods described above with reference to method 700. For example, the use of a combination of system user interface objects and application interface objects to enable applications to rely on system capabilities described with respect to method 700 is also applicable to method 1000. For brevity, these details are not repeated below.

Figure 8:
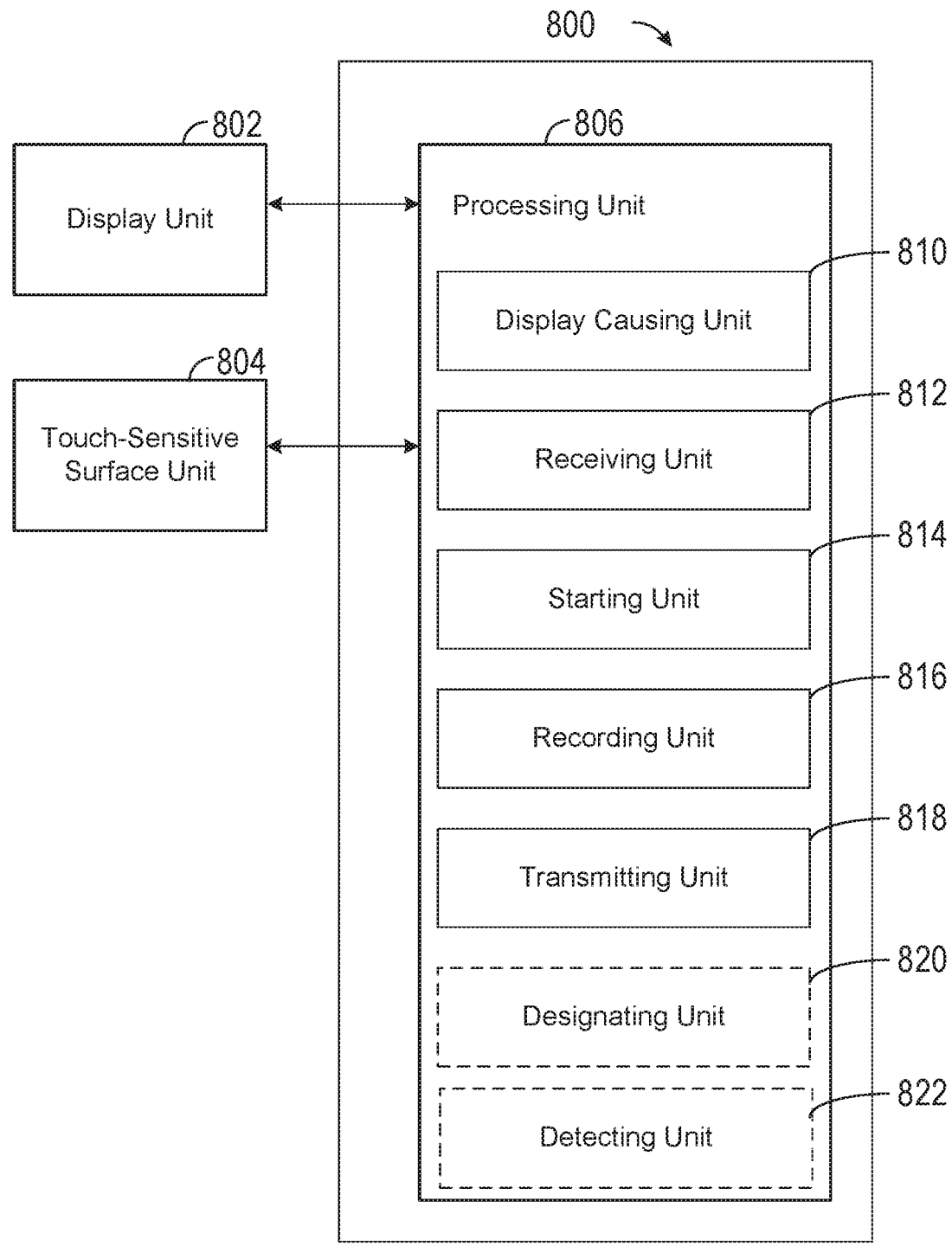
FIG. 8 is a functional block diagram, in accordance with some embodiments.

In accordance with some embodiments, FIG. 8 shows an exemplary functional block diagram of an electronic device 800 configured in accordance with the principles of the various described embodiments. In accordance with some embodiments, the functional blocks of electronic device 800 are configured to perform the techniques described above. The functional blocks of the device 800 are, optionally, implemented by hardware, software, or a combination of hardware and software to carry out the principles of the various described examples. It is understood by persons of skill in the art that the functional blocks described in FIG. 8 are, optionally, combined or separated into sub-blocks to implement the principles of the various described examples. Therefore, the description herein optionally supports any possible combination or separation or further definition of the functional blocks described herein.

As shown in FIG. 8, an electronic device 800 is in communication with a display unit 802 configured to display a graphic user interface and a touch-sensitive surface unit 804 configured to receive contacts and includes a processing unit 806. In some embodiments, the processing unit 806 includes a display causing unit 810, a receiving unit 812, a starting unit 814, a recording unit 816, and a transmitting unit 818, and, optionally, a designating unit 820 and a detecting unit 822.

The processing unit 806 is configured to: receive (e.g., with receiving unit 812) a first input corresponding to an affordance to start a task in an application executing on the one or more processors; in response to receiving the first input, start (e.g., with starting unit 814) the task; while the task is ongoing, record (e.g., with recording unit 816) visual output of the application as application task data; after the task has ceased, cause to be displayed (e.g., with display causing unit 810) on the display an affordance for sharing the application task data with a second electronic device that is associated with the first electronic device; and while the affordance for sharing is displayed on the display, receive (e.g., with receiving unit 812) a second input that corresponds to selection of the affordance for sharing the application task data; and in response to receiving the second input, transmit (e.g., with transmitting unit 818) the application task data to the second electronic device over the communication interface.

In some embodiments, the application is a game application.

In some embodiments, the application task is a game session.

In some embodiments, the processing unit 806 is further configured to, prior to starting to record the visual output of the task, receive (e.g., with receiving unit 812) a third user input that corresponds to an indication to record the visual output of the task, wherein the recording the visual output of the application as the application task data is based on receiving the third user input.

In some embodiments, the third user input is received before the task starts.

In some embodiments, the third user input is received after the task has started and while the task is paused.

In some embodiments, the processing unit 806 is further configured to receive (e.g., with receiving unit 812) a fourth user input that corresponds to selection of an affordance to request the recording of the visual output of the task to stop; and after receiving the fourth user input, cease the recording (e.g., with recording unit 816) of the visual output of the task while the task is executing.

In some embodiments, receiving the fourth user input is received while the task is paused.

In some embodiments, cause display (e.g., with display causing unit 810) of the affordance for sharing occurs in response to the cessation of the task.

In some embodiments, the processing unit 806 is further configured to, after the task has ceased, cause display (e.g., with display causing unit 810) of an affordance for providing an option to share the application task data on the display; and receive (e.g., with the receiving unit 812) fifth user input selecting the affordance for providing an option to share the application task data, wherein the display of the affordance for sharing occurs in response to receiving the fifth user input.

In some embodiments, the processing unit 806 is further configured to detect (e.g., with detecting unit 822) the cessation of the task; and in response to detecting the cessation of the task, cease recording (e.g., with recording unit 816) the visual output.

In some embodiments, the processing unit 806 is further configured to detect (e.g., with detecting unit 822) the cessation of the task; in response to detecting the cessation of the task, cause display (e.g., with display causing unit 810) of an affordance for viewing the application task data; and in response to receiving user input selecting the affordance for playing the application task data, cause display (e.g., with display causing unit 810) of the application task data.

In some embodiments, the second electronic device is a first external device of a plurality of external devices and the processing unit 806 is further configured to after receiving the second user input selecting the affordance for sharing, cause display (e.g., with display causing unit 812) of one or more affordances associating the plurality of external devices; receive (e.g., with receiving unit 812) sixth user input selecting an affordance corresponding to the first external device; and in response to receiving the sixth user input, designate (e.g., with designating unit 820) the first external device as recipient of the transmission of the application task data.

In some embodiments, the one or more external devices are determined based on a proximity to the first electronic device.

In some embodiments, wherein the second electronic device is associated with a user of the first electronic device.

In some embodiments, wherein the second electronic device is associated with only a user of the first electronic device.

In some embodiments, the first electronic device is associated with multiple users and the second electronic device is associated with a single user.

In some embodiments, the second electronic device is a smartphone or a tablet computer.

In some embodiments, the memory has a size of 64 GB or less.

In some embodiments, the application task data is a multimedia file.

In some embodiments, the application task data is transmitted directly to the second electronic device.

In some embodiments, the first electronic device includes a first set of one or more ways to share the application task data and the second electronic includes a second set of one or more ways to share the application task data different from the first set of one or more ways.

In some embodiments, the affordance for sharing the application task data is a system user interface element and the affordance to start the task and the affordance to stop the recording of the visual output are application user interface elements.

In some embodiments, the second electronic device is configured to enable sharing via a plurality of different sharing services.

The operations described above with reference to FIG. 7 are, optionally, implemented by components depicted in FIGS. 1A-1B or FIG. 8. For example, receiving operations 712 and 716 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 9A:
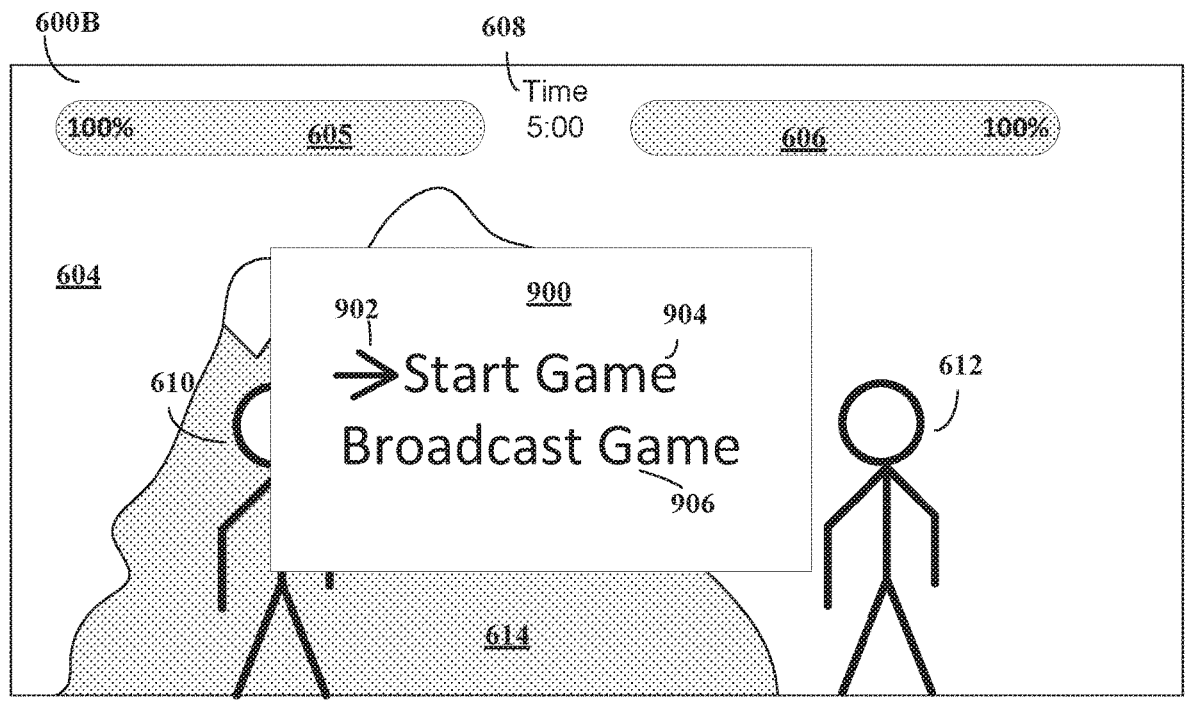
FIGS. 9A-9F illustrate exemplary user interfaces for broadcasting application visual output, in accordance with some embodiments.
Figure 9B:
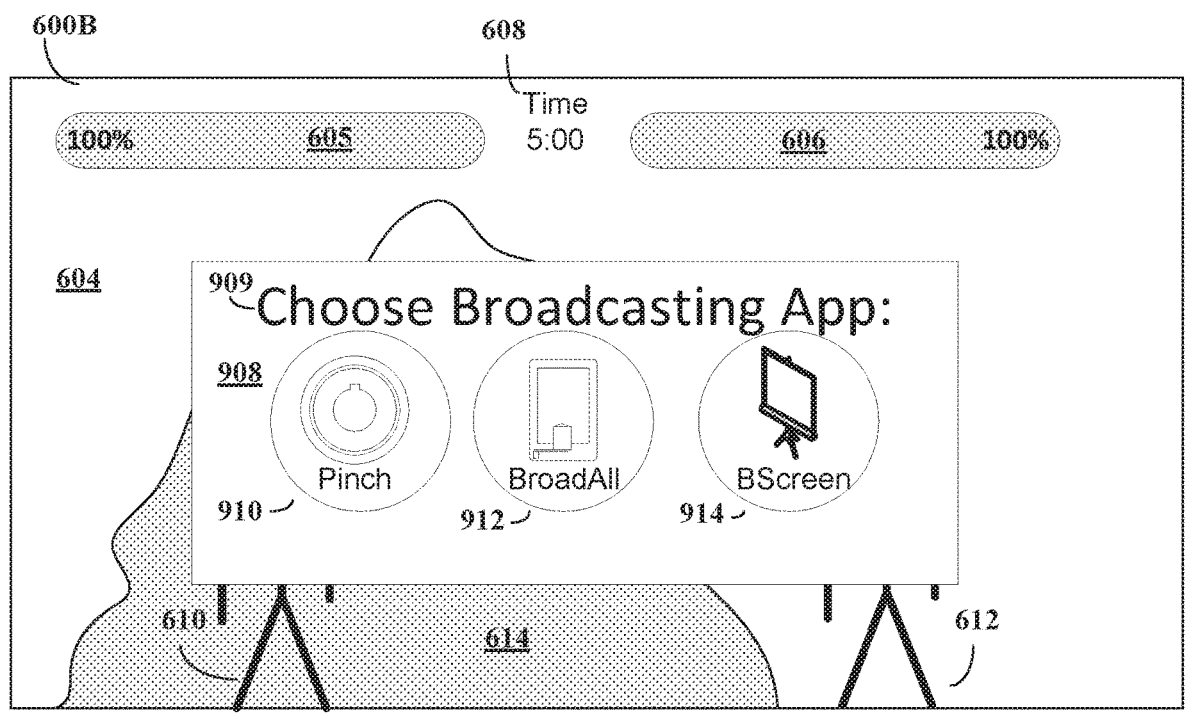

FIGS. 9A-9F depict user interfaces and menus similar to those of FIGS. 6B-6K, except that the user interfaces and menus of FIGS. 9A-9F enable a user to broadcast the visual output of an application task, such as a game session, instead of recording the visual output. Referring to FIG. 9A, menu 900 includes affordances 904 and 906 and indicator 902 that aids the user in selecting one of the affordances. In response electronic device 600 receiving user input selecting affordance 904, the game session would start without broadcasting or recording the visual output. In response to electronic device 600 receiving user input selecting affordance 906, menu 908 of FIG. 9B is displayed. Menu 908 includes affordance 910, 912, and 914 for three different broadcast applications installed on electronic device 600. By selecting one of the affordances, electronic device 600 will send the visual output of the application task (when the task starts) to the selected broadcast application for broadcasting.

In some embodiments, the list of broadcast applications in menu 908 is determined using various techniques, including an API call for the operating system of electronic device 600, querying a database, checking configuration data, or other sources data about installed applications. In some embodiments, broadcast applications are applications that receive or generate a live stream of the visual output of an application (e.g., video game output) and send the visual output for broadcasting and viewing by remote users. In some embodiments, in accordance with a determination that multiple broadcast applications are available, menu 908 is displayed to allow the user to select one of the broadcast applications. In some embodiments, in accordance with a determination that only one broadcast application is available, electronic device 600 skips causing display of menu 908.

Figure 9C:
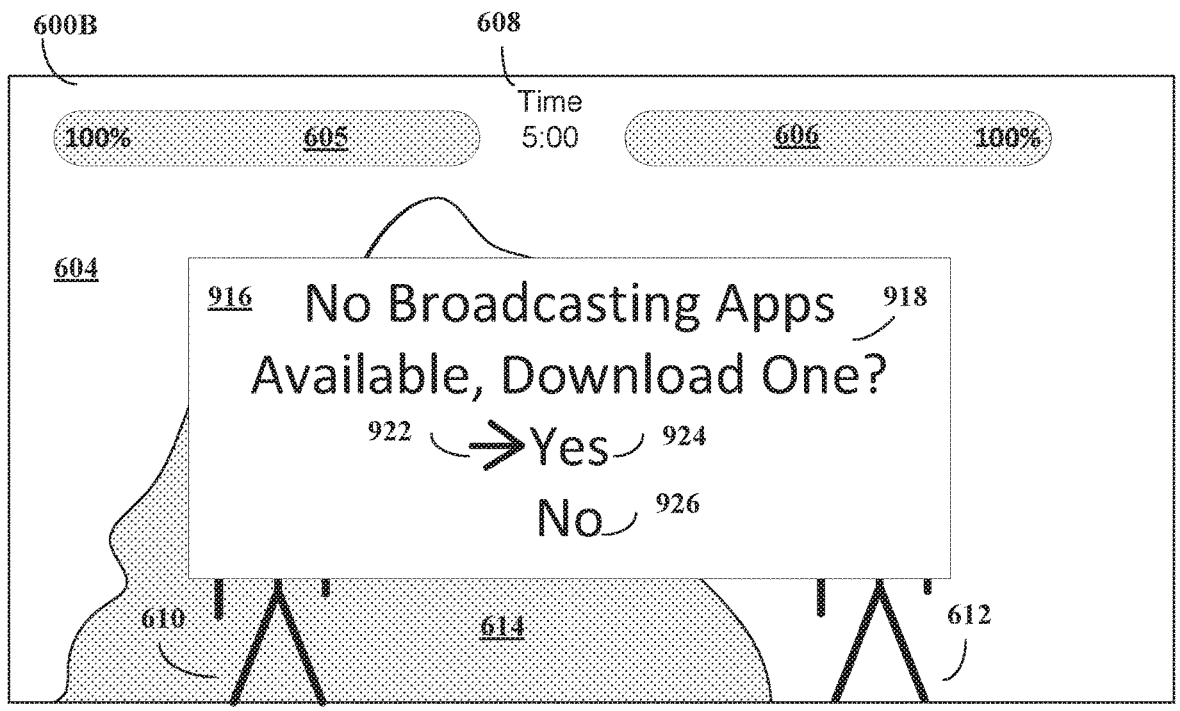
Figure 9D:
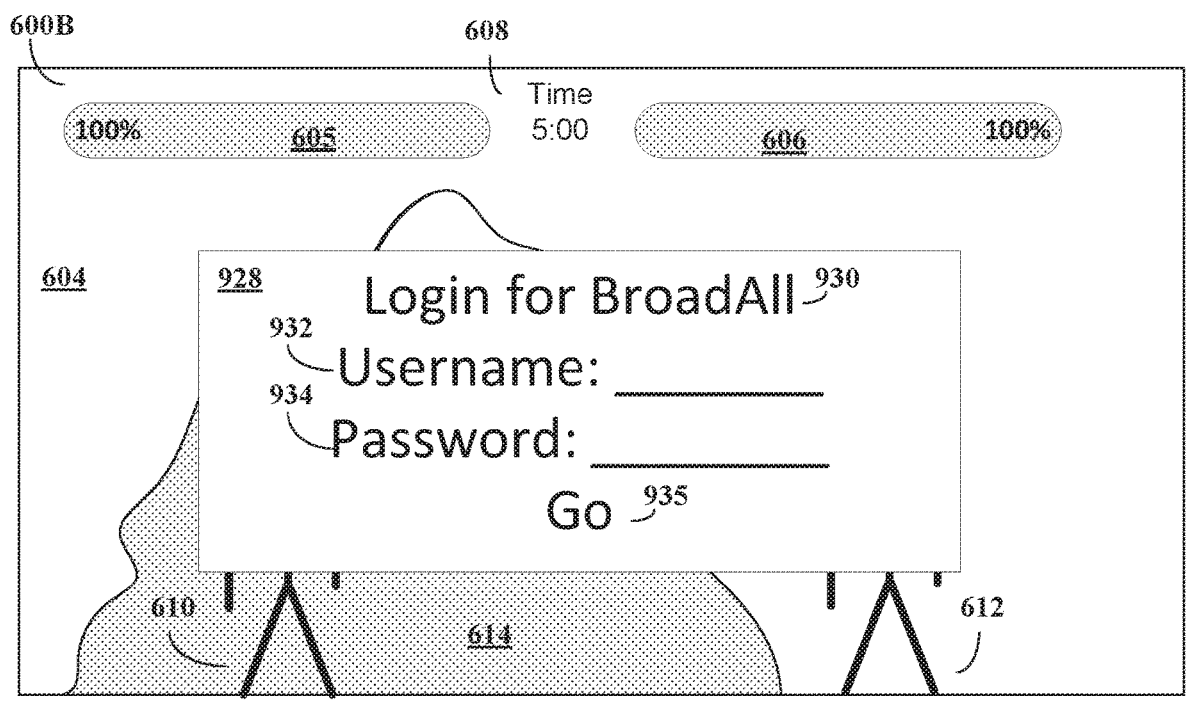
Figure 10A:
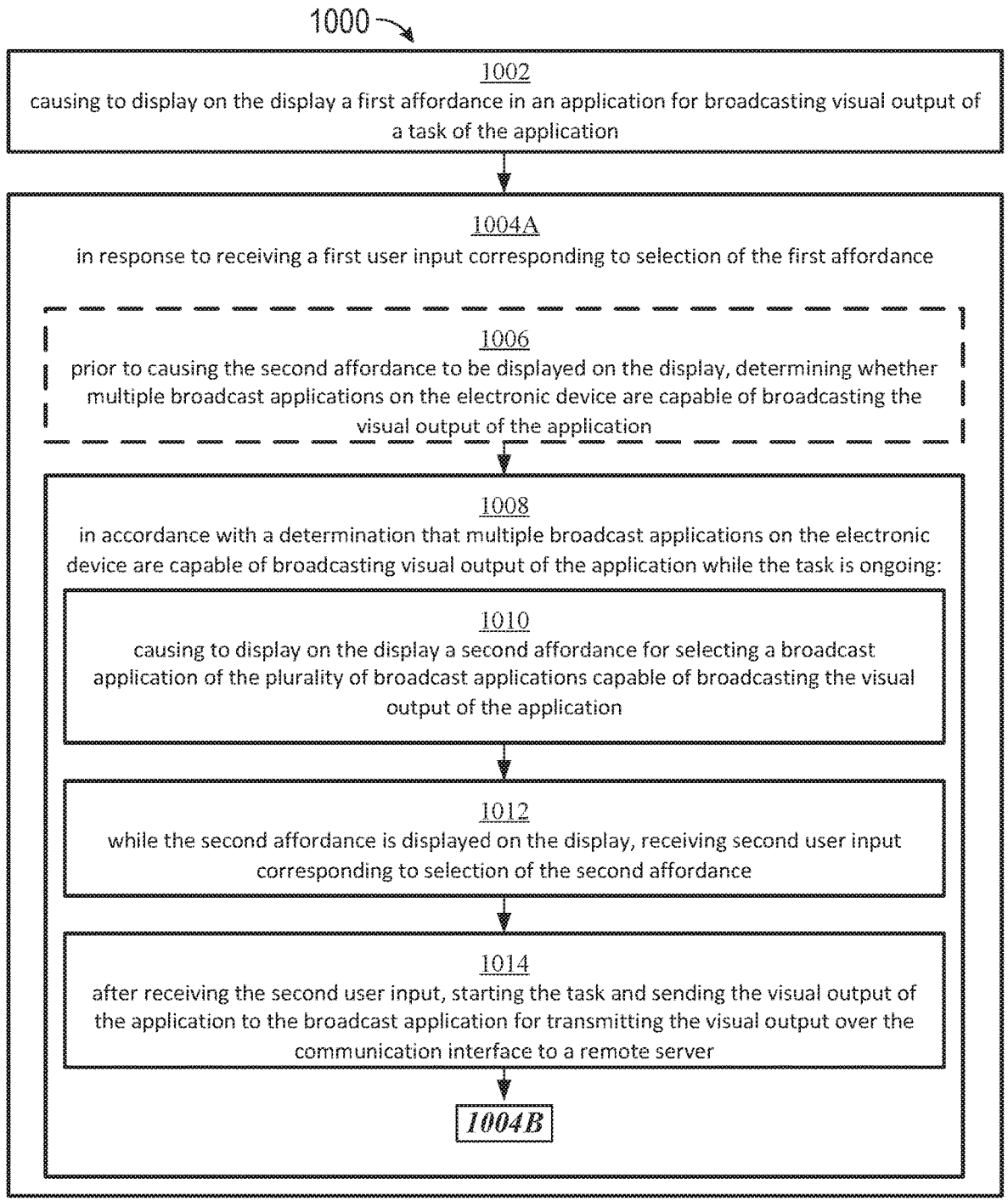
FIGS. 10A-10B is a flow diagram illustrating a method for broadcasting application visual output, in accordance with some embodiments.
Figure 10B:
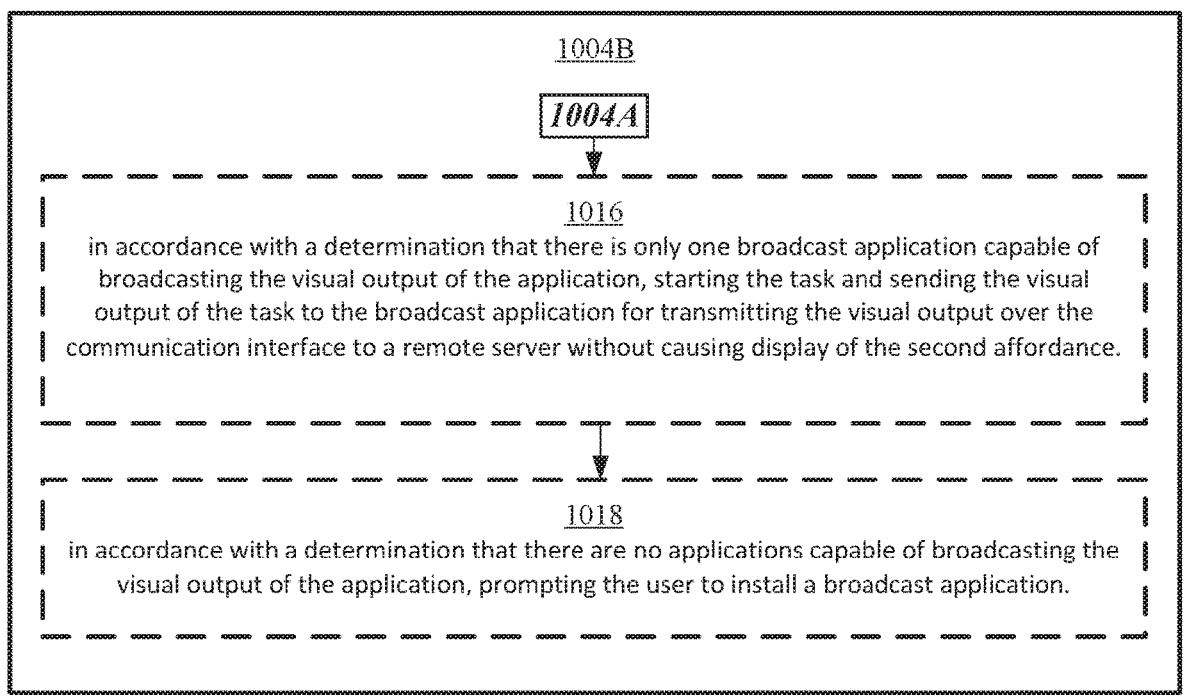

In some embodiments, in accordance with a determination that no broadcast applications are available on electronic device 600, electronic device 600 causes display of menu 916 of FIG. 9C, which includes prompt 918 for the user the download/install a broadcast application. In some embodiments, the a displayed menu includes a selectable option to display an app store user interface that is, optionally, linked to the display of a section of the app store that is reserved for applications that are capable of broadcasting the visual output of the application. In some embodiments, a displayed menu also provides one or more selectable affordances for purchasing and/or downloading applications that are capable of broadcasting the visual output without displaying the app store user interface.

Menu 916 includes indicator 922 that aids the user in selecting affordance 924 or 926. In some cases, in response to user input selecting affordance 924, electronic device causes to be display an application store interface displaying one or more broadcast applications that be downloaded and installed on electronic device 600. In other cases, in response to user input selecting affordance 924, electronic device 600 causes to be displayed one or more links to broadcast applications that can be downloaded and installed on electronic device.

In some embodiments, in response to user input selecting affordance 926, electronic device 600 returns display 600B to the initial display, as depicted in FIG. 9A, except that affordance 906 in menu 900 is removed based on a determination that no broadcast applications being installed. A user would have to restart the application or install a broadcast application independently in order for the affordance to reappear.

In some embodiments, if user input is received selecting affordance 912 (corresponding to the BroadAll application) or if only one broadcast application is installed, a determination is made as to whether electronic device 600 has access to broadcast services through the corresponding application. In some embodiments, electronic device 600 determines whether a user is logged into or needs to log into the broadcast application or the service associated with the broadcast application. If either the application or the service requires the user to login and the user has not logged in yet, menu 928 is displayed to prompt the user to enter their login information for the application indicated by instructions 930. Affordance 932 allows for the user to input a username. Affordance 934 allows for the user to input a password. Once a username and password are entered, user input selecting affordance 935 results in the username and password being passed to the broadcast application for authentication. In some embodiments, the broadcast application authenticates the login information either locally or sends it to a remote server for authentication. As opposed to a user interface of the gaming application, menu 928 could instead be a menu of the broadcast application so that the login information is being directly entered into the broadcast application. As another option, instead of menu 928, electronic device 600 could switch to the broadcast application to enable the user to enter login information directly into the broadcast application.

Figure 9E:
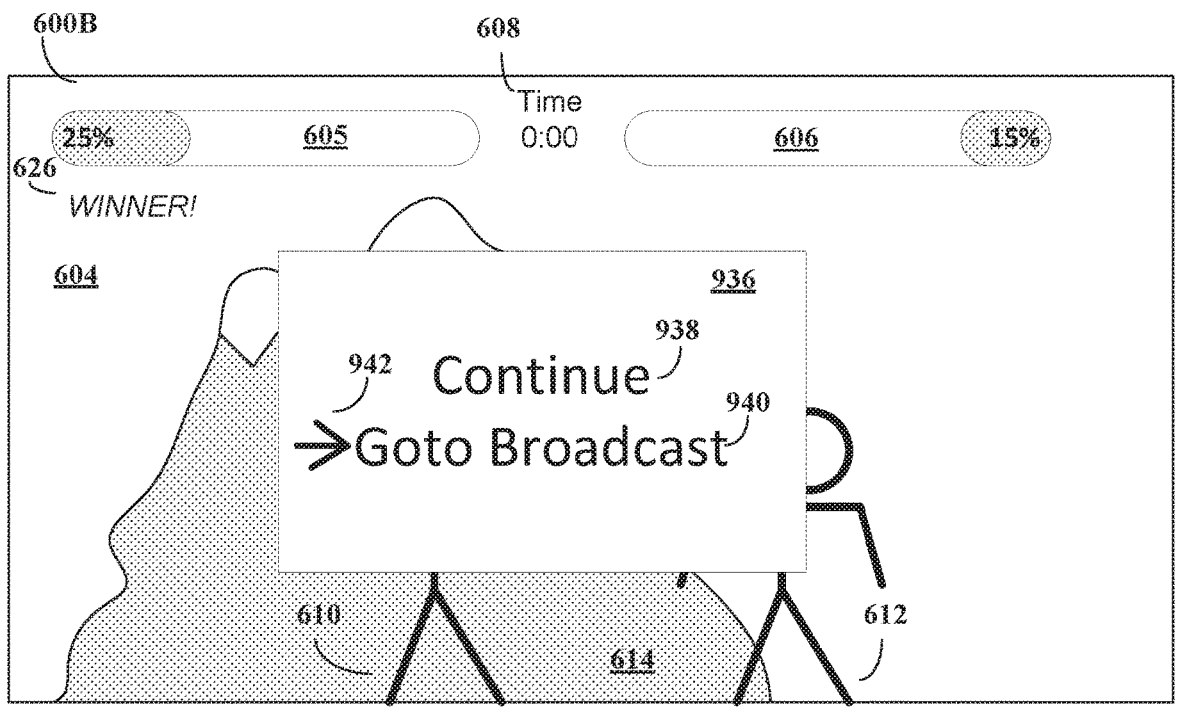
Figure 9F:
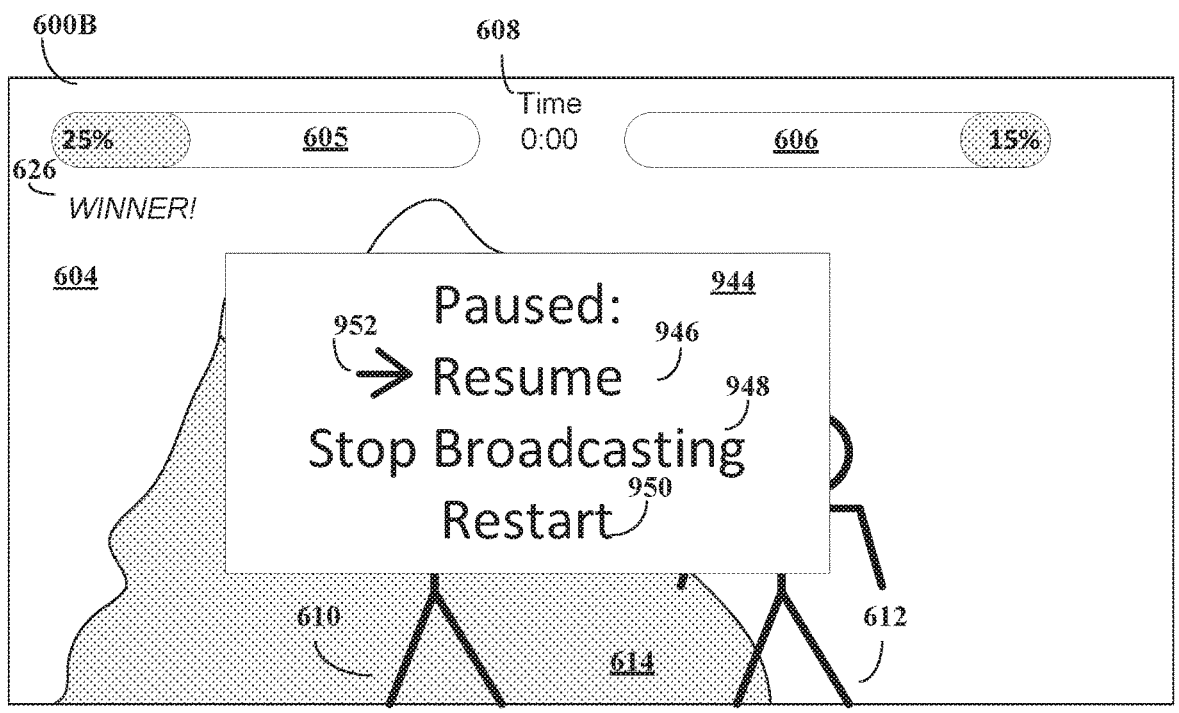

In some embodiments, in response to the login information being successfully authenticated, or the user already being logged, or a login not being necessary, the application task (e.g., a session of a game application) begins. While the application task is executing, the visual output of the application task is sent to the broadcast application. The broadcast application then sends the visual output to a remote server (e.g., remote server 603 of FIG. 6A) for broadcast. After the application task has ended, as depicted in FIG. 9E, menu 926 is displayed. Menu 936 includes indicator 942 that aids the user selecting affordance 938 or 940. Selection of affordance 938 causes electronic device 600 to return the user to the start screen for the application, as depicted, for example, in FIG. 9A. Affordance 940 causes electronic device 600 to switch to the broadcast application interface.

In some embodiments, pause menu 944 is displayed in response to electronic device 600 receiving user input requesting the game session to be paused. Pause menu includes affordance 946 for resuming the game session, affordance 948 for stopping the broadcast of the games session, and affordance 950 for restarting the game session. Indicator 952, which is not present in some embodiments, is used to aid the user in selecting an affordance.

FIGS. 10A-10B depict a flow diagram illustrating a method for sharing application visual output using an electronic device in accordance with some embodiments. Method 1000 is performed at an electronic device, such as electronic device 600, that is in communication with a display. Some operations in method 1000 are, optionally, combined, the order of some operations is, optionally, changed, and some operations are, optionally, omitted.

As described below, method 1000 provides an intuitive way for sharing application visual output. The method reduces the cognitive burden on a user for sharing application visual output, thereby creating a more efficient human-machine interface. For battery-operated computing devices, enabling a user to share application visual output faster and more efficiently conserves power and increases the time between battery charges.

The first electronic device causes to display (1002) on the display a first affordance (e.g., 906) (e.g., on the start screen of the application) in an application (e.g., a game application) for broadcasting (e.g., sending for near-live distribution to an audience) visual output of a task (e.g., a game session) of the application.

In response to the first electronic device receiving a first user input (e.g., using a remote control or other input device in communication with the first electronic device) corresponding to selection of the first affordance (e.g., 906) and in accordance with the first electronic device determining that multiple broadcast applications on the first electronic device are capable of broadcasting visual output of the application while the task is ongoing: [a] the first electronic device causes to display (1006) on the display a second affordance (e.g., one of 910, 912, 914) for selecting a broadcast application of the plurality of broadcast applications (e.g., Pinch, BroadAll, BScreen) capable of broadcasting the visual output of the application; and [b] while the second affordance (e.g., one of 910, 912, 914) is displayed on the display, the first electronic device receives (1012) second user input corresponding to selection of the second affordance (e.g., one of 910, 912, 914). After (e.g., in response to or later in time) the first electronic device receives the second user input (e.g., after the user has selected an application and after potentially selected the type of game to start), the first electronic device starts (1014) the task and sends the visual output of the application to the broadcast application for transmitting the visual output over the communication interface (e.g., over communication channel 604C and 604H) to a remote server (e.g., 603) (e.g., the broadcasting server).

In accordance with some embodiments, prior to the first electronic device causing the second affordance to be displayed on the display, the first electronic device determines (1006) whether multiple broadcast applications (e.g., Twitch, YouTube, XBox) on the electronic device are capable of broadcasting (e.g., sending for near-live distribution to an audience) the visual output of the application.

In accordance with some embodiments, further in response to the first electronic device receiving the first user input (e.g., using remote control or other user input device) corresponding to a selection of the first affordance (e.g., 904) and in accordance with the first electronic device determining that there is only one broadcast application capable of broadcasting the visual output of the application, the first electronic device starts (1016) the task and sends the visual output of the task to the broadcast application (e.g., the installed broadcast application) for transmitting the visual output over the communication interface to a remote server (e.g., 603) (e.g., the broadcasting server) without causing display of the second affordance (e.g., any of 910, 921, 914).

In accordance with some embodiments, further in response to the first electronic device receiving the first user input (e.g., using remote control) corresponding to a selection of the first affordance. In accordance with the first electronic device determining that there are no applications capable of broadcasting the visual output of the application, the first electronic device prompts (1018) the user to install a broadcast application (e.g., FIG. 9C) (e.g., providing a selectable option to display an app store user interface that is, optionally, linked to the display of a section of the app store that is reserved for applications that are capable of broadcasting the visual output of the application, or providing one or more selectable affordances for purchasing and/or downloading applications that are capable of broadcasting the visual output without displaying the app store user interface). The above permits a user to control when application visual output is broadcast from within the application that is generating the visual output. This makes it more efficient and easier for the user to broadcast content. By integrating the broadcasting controls into the application, the user does not need to access or switch other applications.

In accordance with some embodiments, the application is a game application and the task is a session of the game application.

In accordance with some embodiments, the first electronic device causes to display on the display a third affordance (e.g., 906) with the first affordance (e.g., 904), wherein the third affordance corresponds to a request to start the task without broadcasting the visual output of the application. In response to receiving the user input selecting the third affordance, the first electronic device starts the task without sending the visual output of the application (e.g., to a broadcast application) for broadcasting.

In accordance with some embodiments, in accordance with the first electronic device determining that there are no applications capable of broadcasting the visual output of the application, the first electronic device forgoes the display of the first affordance (e.g., 906).

In accordance with some embodiments, the first electronic device receives a third user input (e.g., user input selecting affordance 948 via menu 944) indicating that sending the visual output of the application to the broadcast application should be ceased (e.g., selecting an affordance on a pause screen to stop broadcasting). In response to the first electronic device receiving the third user input, the first electronic device ceases to send the visual output of the task to the broadcast application.

In accordance with some embodiments, the electronic device sends the visual output of the application to the broadcast application occurs while the task is executing on the electronic device (e.g., a live stream of the visual output of the video game is being sent to the broadcast application, which is then broadcasting the content for viewing by remote users).

In accordance with some embodiments, the visual output of the application is a video recording of the application output (e.g., the output of the video game of FIGS. 9A-9F).

In accordance with some embodiments, the first electronic device transmits, via the broadcast application, the visual output over the communication interface to the remote server (e.g., 603) (e.g., for retransmission to remote users who are watching the live stream of the video game). By using the broadcast application, the design of the application producing the visual output can be simplified because instead of the application having to integrate broadcast functionality, the application need only pass on its visual out to the a different application.

In accordance with some embodiments, in response to the first electronic device receiving the second user input the first electronic device determines whether a user is logged into the broadcast application. In accordance with the first electronic device determining that the user is logged into the broadcast application, the first electronic device starts the task and sending the visual output of the application to the broadcast application. In accordance with the first electronic device determining that the user is not logged into the broadcast application, the first electronic device causes to display, on the display, a login window (e.g., 928) of the broadcast application.

In accordance with some embodiment, the login window (e.g., 928) is generated by the broadcast application user interface and is concurrently displayed with at least a portion of the application user interface (e.g., so that the application does not get access to the login credentials of the broadcast application).

In accordance with some embodiments, the first affordance (e.g., 904) is associated with the application user interface and wherein the second affordance (e.g., 910, 921, or 914) for selecting the broadcast application is associated with a system user interface.

Figure 11:
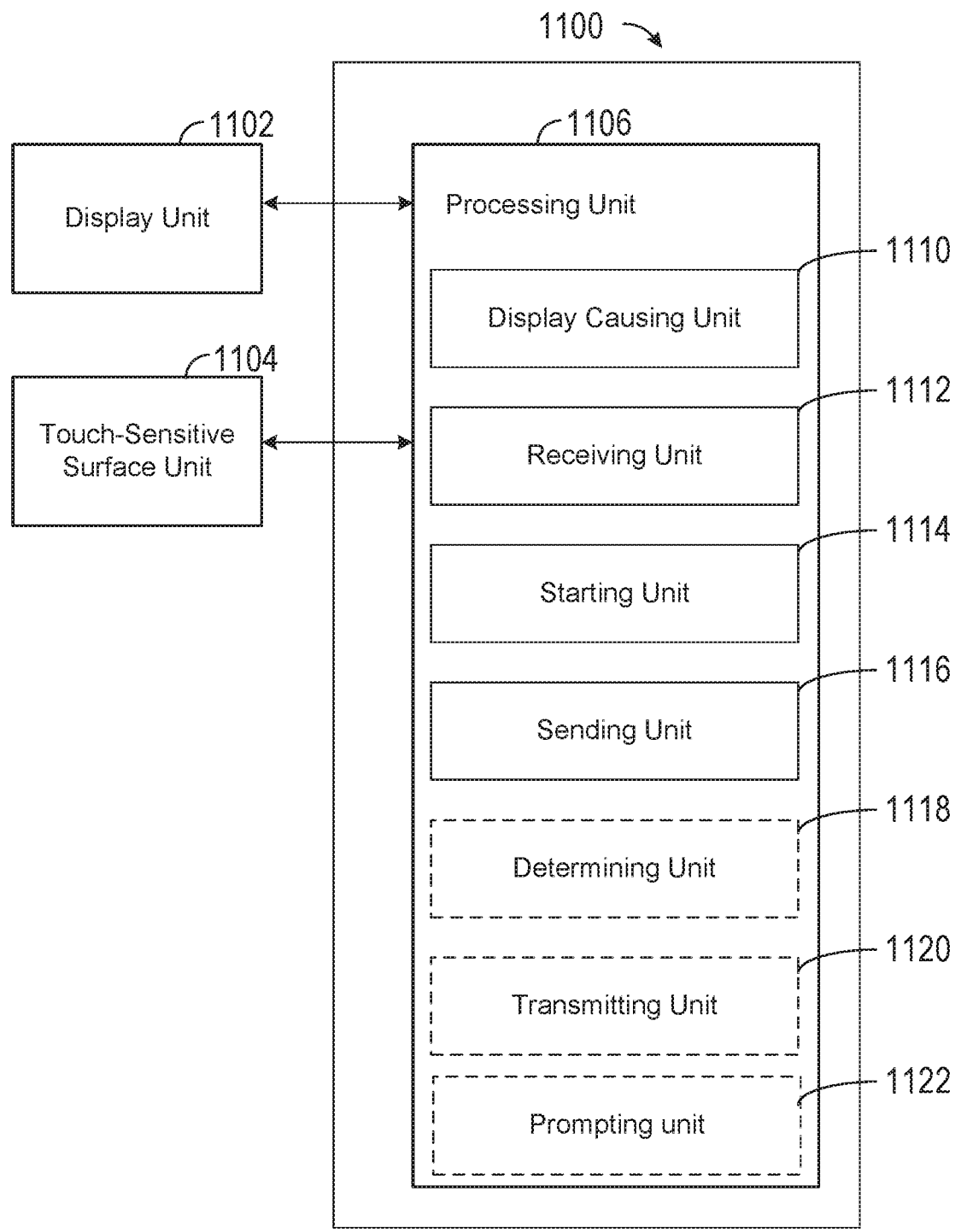
FIG. 11 is a functional block diagram, in accordance with some embodiments.

In accordance with some embodiments, FIG. 11 shows an exemplary functional block diagram of an electronic device 1100 configured in accordance with the principles of the various described embodiments. In accordance with some embodiments, the functional blocks of electronic device 1100 are configured to perform the techniques described above. The functional blocks of the device 1100 are, optionally, implemented by hardware, software, or a combination of hardware and software to carry out the principles of the various described examples. It is understood by persons of skill in the art that the functional blocks described in FIG. 11 are, optionally, combined or separated into sub-blocks to implement the principles of the various described examples. Therefore, the description herein optionally supports any possible combination or separation or further definition of the functional blocks described herein.

As shown in FIG. 11, an electronic device 1100 is in communication with a display unit 1102 configured to display a graphic user interface and a touch-sensitive surface unit 1104 configured to receive contacts and includes a processing unit 1106. In some embodiments, the processing unit 806 includes a display causing unit 1110, a receiving unit 1112, a starting unit 1114, and a sending unit 1116, and, optionally, a determining unit 1118, a transmitting unit 1120 and a prompting unit 1122.

The processing unit 1106 is configured to: cause to display (e.g. with display causing unit 1110) on the display a first affordance in an application for broadcasting visual output of a task of the application; in response to receiving a first user input corresponding to selection of the first affordance and in accordance with a determination that multiple broadcast applications on the electronic device are capable of broadcasting visual output of the application while the task is ongoing: cause to display (e.g. with display causing unit 1110) on the display a second affordance for selecting a broadcast application of the plurality of broadcast applications capable of broadcasting the visual output of the application; and while the second affordance is displayed on the display, receive (e.g., with receiving unit 1112) second user input corresponding to selection of the second affordance; and after receiving the second user input, start (e.g., with starting unit 1114) the task and send (e.g., with sending unit 1116) the visual output of the application to the broadcast application for transmitting the visual output over the communication interface to a remote server.

In some embodiments, the processing unit 1106 is further configured to, prior to causing the second affordance to be displayed on the display, determine (e.g., with determining unit 1118) whether multiple broadcast applications on the electronic device are capable of broadcasting the visual output of the application.

In some embodiments, the application is a game application and the task is a session of the game application.

In some embodiments, the processing unit 1106 is further configured to: cause to display (e.g. with display causing unit 1110) on the display a third affordance with the first affordance, wherein the third affordance corresponds to a request to start the task without broadcasting the visual output of the application; and in response to receiving the user input selecting the third affordance, start (e.g., with starting unit 1114) the task without sending the visual output of the application for broadcasting.

In some embodiments, the processing unit 1106 is further configured to, further in response to receiving the first user input corresponding to a selection of the first affordance and in accordance with a determination that there is only one broadcast application capable of broadcasting the visual output of the application, start (e.g., with starting unit 1114) the task and send (e.g., with sending unit 1116) the visual output of the task to the broadcast application for transmitting the visual output over the communication interface to a remote server without causing display of the second affordance.

In some embodiments, the processing unit 1106 is further configured to, further in response to receiving the first user input corresponding to a selection of the first affordance and in accordance with a determination that there are no applications capable of broadcasting the visual output of the application, prompt (e.g., with prompting unit 1122) the user to install a broadcast application.

In some embodiments, the processing unit 1106 is further configured to in accordance with a determination that there are no applications capable of broadcasting the visual output of the application, forgo the causing of display (e.g., with display causing unit 1110) of the first affordance.

In some embodiments, the processing unit 1106 is further configured to receive (e.g., with receiving unit 1112) a third user input indicating that send (e.g., with sending unit 1116) the visual output of the application to the broadcast application should be ceased; and in response to receiving the third user input, ceasing to send the visual output of the task to the broadcast application.

In some embodiments, sending the visual output of the application to the broadcast application occurs while the task is executing.

In some embodiments, the visual output of the application is a video recording of the application output.

In some embodiments, the processing unit 1106 is further configured to, transmit (e.g., with transmitting unit 1120), by the broadcast application, the visual output over the communication interface to the remote server.

In some embodiments, the processing unit 1106 is further configured to, in response to receiving the second user input, determine (e.g., using determining unit 118) whether a user is logged into the broadcast application; in accordance with a determination that the user is logged into the broadcast application, start (e.g., with starting unit 1114) the task and send (e.g., with sending unit 1116) the visual output of the application to the broadcast application; and in accordance with a determination that the user is not logged into the broadcast application, cause to display (e.g. with display causing unit 1110), on the display, a login window of the broadcast application.

In some embodiments, the login window is generated by the broadcast application user interface and is concurrently displayed with at least a portion of the application user interface.

In some embodiments, the first affordance is associated with the application user interface and wherein the second affordance for selecting the broadcast application is associated with a system user interface.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

What is claimed is:

1. A method comprising:
   at a first electronic device with one or more processors, a communication interface, and memory,
   wherein the first electronic device is in communication with a display:
   receiving a first input corresponding to an affordance to start a task in an application executing on the one or more processors;
   in response to receiving the first input, starting the task in the application;
   while the task is ongoing, recording visual output of the application as application task data;
   after the task has ceased, causing to be displayed on the display a first affordance for sharing the application task data;
   while the first affordance is displayed, receiving a second input corresponding to selection of the first affordance;
   in response to receiving the second input, displaying at least one affordance for sharing the application task data with devices within a threshold distance from the first electronic device, wherein the devices include a second electronic device, and wherein the at least one affordance includes a second affordance corresponding to the second electronic device;
   while the second affordance is displayed, receiving third input including input corresponding to selection of the second affordance; and
   in response to receiving the third input, and without further user input, transmitting the application task data to the second electronic device over the communication interface.

2. The method of claim 1, wherein the application is a game application.

3. The method of claim 1, wherein the application task is a game session.

4. The method of claim 1, further comprising:
   prior to starting to record the visual output of the task, receiving a fourth user input that corresponds to an indication to record the visual output of the task, wherein the recording the visual output of the application as the application task data is based on receiving the fourth user input, and wherein the fourth user input is received before the task starts.

5. The method of claim 1, further comprising:
   prior to starting to record the visual output of the task, receiving a fourth user input that corresponds to an indication to record the visual output of the task, wherein the recording the visual output of the application as the application task data is based on receiving the fourth user input, and wherein the fourth user input is received after the task has started and while the task is paused.

6. The method of claim 1 further comprising:
receiving a fifth user input that corresponds to selection of an affordance to request the recording of the visual output of the task to stop, wherein the receiving the fifth user input is received while the task is paused; and
after receiving the fifth user input, ceasing the recording of the visual output of the task while the task is executing.

7. The method of claim 1, wherein causing display of the first affordance occurs in response to a cessation of the task.

8. The method of claim 1 further comprising:
detecting a cessation of the task; and
in response to detecting the cessation of the task, ceasing to record the visual output.

9. The method of claim 1 further comprising:
detecting a cessation of the task;
in response to detecting the cessation of the task, causing display of an affordance for viewing the application task data; and
in response to receiving user input selecting the affordance for viewing the application task data, causing display of the application task data.

10. The method of claim 1, wherein the second electronic device is a first external device of a plurality of external devices, the method further comprising:
after receiving the second user input selecting the first affordance, causing display of one or more affordances associating the plurality of external devices;
receiving sixth user input selecting an affordance corresponding to the first external device; and
in response to receiving the sixth user input, designating the first external device as recipient of the transmission of the application task data.

11. The method of claim 1, wherein the second electronic device is associated with a user of the first electronic device or the second electronic device is associated with only the user of the first electronic device.

12. The method of claim 1 wherein the first electronic device is associated with multiple users and the second electronic device is associated with a single user.

13. The method of claim 1, wherein the first electronic device includes a first set of one or more ways to share the application task data, and wherein the second electronic device includes a second set of one or more ways to share the application task data different from the first set of one or more ways.

14. The method of claim 1, wherein the first affordance is a system user interface element, and wherein the affordance to start the task is an application user interface element.

15. The method of claim 1, wherein the second electronic device is configured to enable sharing via a plurality of different sharing services.

16. The method of claim 1, wherein the second affordance is for selecting a first sharing mechanism for sharing the application task data, the method further comprising:
in response to receiving the second input, displaying, concurrently with the second affordance, a third affordance for selecting a second sharing mechanism, different from the first sharing mechanism, for sharing the application task data;
while the second affordance and the third affordance are displayed, receiving fourth input including input corresponding to selection of the third affordance; and
in response to receiving the fourth input, initiating a process to share the application task data via the second sharing mechanism.

17. A first electronic device, comprising:
a display;
one or more processors;
one or more input devices;
a memory;
a communication interface, wherein the electronic device is in communication with the display, and
one or more programs, wherein the one or more programs are stored in memory and configured to be executed by the one or more processors, the one or more programs including instructions for:
receiving a first input corresponding to an affordance to start a task in an application executing on the one or more processors;
in response to receiving the first input, starting the task in the application;
while the task is ongoing, recording visual output of the application as application task data;
after the task has ceased, causing to be displayed on the display a first affordance for sharing the application task data;
while the first affordance is displayed, receiving a second input corresponding to selection of the first affordance;
in response to receiving the second input, displaying at least one affordance for sharing the application task data with devices within a threshold distance from the first electronic device, wherein the devices include a second electronic device, and wherein the at least one affordance includes a second affordance corresponding to the second electronic device;
while the second affordance is displayed, receiving third input including input corresponding to selection of the second affordance; and
in response to receiving the third input, and without further user input, transmitting the application task data to the second electronic device over the communication interface.

18. The first electronic device of claim 17, wherein the application is a game application.

19. The first electronic device of claim 17, wherein the application task is a game session.

20. The first electronic device of claim 17, wherein the one or more programs further including instructions for:
prior to starting to record the visual output of the task, receiving a fourth user input that corresponds to an indication to record the visual output of the task, wherein the recording the visual output of the application as the application task data is based on receiving the fourth user input, and wherein the fourth user input is received before the task starts.

21. The first electronic device of claim 17, wherein the one or more programs further including instructions for:
prior to starting to record the visual output of the task, receiving a fourth user input that corresponds to an indication to record the visual output of the task, wherein the recording the visual output of the application as the application task data is based on receiving the fourth user input, and wherein the fourth user input is received after the task has started and while the task is paused.

22. The first electronic device of claim 17, wherein the one or more programs further including instructions for:

receiving a fifth user input that corresponds to selection of an affordance to request the recording of the visual output of the task to stop, wherein the receiving the fifth user input is received while the task is paused; and after receiving the fifth user input, ceasing the recording of the visual output of the task while the task is executing.

23. The first electronic device of claim 17, wherein causing display of the first affordance occurs in response to a cessation of the task.

24. The first electronic device of claim 17, wherein the one or more programs further including instructions for:
  detecting a cessation of the task; and
  in response to detecting the cessation of the task, ceasing to record the visual output.

25. The first electronic device of claim 17, wherein the one or more programs further including instructions for:
  detecting a cessation of the task;
  in response to detecting the cessation of the task, causing display of an affordance for viewing the application task data; and
  in response to receiving user input selecting the affordance for viewing the application task data, causing display of the application task data.

26. The first electronic device of claim 17, wherein the second electronic device is a first external device of a plurality of external devices, the one or more programs further including instructions for:
  after receiving the second user input selecting the first affordance, causing display of one or more affordances associating the plurality of external devices;
  receiving sixth user input selecting an affordance corresponding to the first external device; and
  in response to receiving the sixth user input, designating the first external device as recipient of the transmission of the application task data.

27. The first electronic device of claim 17, wherein the second electronic device is associated with a user of the first electronic device or the second electronic device is associated with only the user of the first electronic device.

28. The first electronic device of claim 17, wherein the first electronic device is associated with multiple users and the second electronic device is associated with a single user.

29. The first electronic device of claim 17, wherein the first electronic device includes a first set of one or more ways to share the application task data, and wherein the second electronic device includes a second set of one or more ways to share the application task data different from the first set of one or more ways.

30. The first electronic device of claim 17, wherein the first affordance is a system user interface element, and wherein the affordance to start the task is an application user interface element.

31. The first electronic device of claim 17, wherein the second electronic device is configured to enable sharing via a plurality of different sharing services.

32. The first electronic device of claim 17, wherein the second affordance is for selecting a first sharing mechanism for sharing the application task data, the one or more programs further including instructions for:
  in response to receiving the second input, displaying, concurrently with the second affordance, a third affordance for selecting a second sharing mechanism, different from the first sharing mechanism, for sharing the application task data;
  while the second affordance and the third affordance are displayed, receiving fourth input including input corresponding to selection of the third affordance; and
  in response to receiving the fourth input, initiating a process to share the application task data via the second sharing mechanism.

33. A non-transitory computer readable storage medium storing one or more programs, the one or more programs comprising instructions, which when executed by one or more processors of a first electronic device with a display and one or more input devices, cause the first electronic device to:
  receive a first input corresponding to an affordance to start a task in an application executing on the one or more processors;
  in response to receiving the first input, start the task in the application;
  while the task is ongoing, record visual output of the application as application task data;
  after the task has ceased, causing to be displayed on the display a first affordance for sharing the application task data;
  while the first affordance is displayed, receive a second input corresponding to selection of the first affordance; and
  in response to receiving the second input, display at least one affordance for sharing the application task data with devices within a threshold distance from the first electronic device, wherein the devices include a second electronic device, and wherein the at least one affordance includes a second affordance corresponding to the second electronic device;
  while the second affordance is displayed, receive third input including input corresponding to selection of the second affordance; and
  in response to receiving the third input, and without further user input, transmit the application task data to the second electronic device over the communication interface.

34. The non-transitory computer readable storage medium of claim 33, wherein the application is a game application.

35. The non-transitory computer readable storage medium of claim 33, wherein the application task is a game session.

36. The non-transitory computer readable storage medium of claim 33, wherein the one or more programs further including instructions for:
  prior to starting to record the visual output of the task, receiving a fourth user input that corresponds to an indication to record the visual output of the task, wherein the recording the visual output of the application as the application task data is based on receiving the fourth user input, and wherein the fourth user input is received before the task starts.

37. The non-transitory computer readable storage medium of claim 33, wherein the one or more programs further including instructions for:
  prior to starting to record the visual output of the task, receiving a fourth user input that corresponds to an indication to record the visual output of the task, wherein the recording the visual output of the application as the application task data is based on receiving the fourth user input, and wherein the fourth user input is received after the task has started and while the task is paused.

38. The non-transitory computer readable storage medium of claim 33, wherein the one or more programs further including instructions for:
  receiving a fifth user input that corresponds to selection of an affordance to request the recording of the visual output of the task to stop, wherein the receiving the fifth user input is received while the task is paused; and after receiving the fifth user input, ceasing the recording of the visual output of the task while the task is executing.

39. The non-transitory computer readable storage medium of claim 33, wherein causing display of the first affordance occurs in response to a cessation of the task.

40. The non-transitory computer readable storage medium of claim 33, wherein the one or more programs further including instructions for:

detecting a cessation of the task; and in response to detecting the cessation of the task, ceasing to record the visual output.

41. The non-transitory computer readable storage medium of claim 33, wherein the one or more programs further including instructions for:

detecting a cessation of the task;

in response to detecting the cessation of the task, causing display of an affordance for viewing the application task data; and in response to receiving user input selecting the affordance for viewing the application task data, causing display of the application task data.

42. The non-transitory computer readable storage medium of claim 33, wherein the second electronic device is a first external device of a plurality of external devices, the one or more programs further including instructions for:

after receiving the second user input selecting the first affordance, causing display of one or more affordances associating the plurality of external devices;

receiving sixth user input selecting an affordance corresponding to the first external device; and in response to receiving the sixth user input, designating the first external device as recipient of the transmission of the application task data.

43. The non-transitory computer readable storage medium of claim 33, wherein the second electronic device is associated with a user of the first electronic device or the second electronic device is associated with only the user of the first electronic device.

44. The non-transitory computer readable storage medium of claim 33, wherein the first electronic device is associated with multiple users and the second electronic device is associated with a single user.

45. The non-transitory computer readable storage medium of claim 33, wherein the first electronic device includes a first set of one or more ways to share the application task data, and wherein the second electronic device includes a second set of one or more ways to share the application task data different from the first set of one or more ways.

46. The non-transitory computer readable storage medium of claim 33, wherein the first affordance is a system user interface element, and wherein the affordance to start the task is an application user interface element.

47. The non-transitory computer readable storage medium of claim 33, wherein the second electronic device is configured to enable sharing via a plurality of different sharing services.

48. The non-transitory computer readable storage medium of claim 33, wherein the second affordance is for selecting a first sharing mechanism for sharing the application task data, the one or more programs further including instructions for:

in response to receiving the second input, displaying, concurrently with the second affordance, a third affordance for selecting a second sharing mechanism, different from the first sharing mechanism, for sharing the application task data;

while the second affordance and the third affordance are displayed, receiving fourth input including input corresponding to selection of the third affordance; and in response to receiving the fourth input, initiating a process to share the application task data via the second sharing mechanism.

* * * * *